(12) United States Patent
Vossoughi et al.

(10) Patent No.: US 9,118,750 B2
(45) Date of Patent: Aug. 25, 2015

(54) CUSTOMIZABLE MODULAR MULTI-FUNCTION COMMUNICATION DEVICE

(75) Inventors: Sohrab Vossoughi, Portland, OR (US); David Randall Knaub, Portland, OR (US); Dave Sayler, Portland, OR (US); Felix Ballerstedt, Portland, OR (US); Thomas Crisp, Portland, OR (US)

(73) Assignee: Ziba Labs LLC, Portland, OR (US)

( * ) Notice: Subject to any disclaimer, the term of this patent is extended or adjusted under 35 U.S.C. 154(b) by 2 days.

(21) Appl. No.: 12/833,663

(22) Filed: Jul. 9, 2010

(65) Prior Publication Data

US 2010/0321899 A1     Dec. 23, 2010

Related U.S. Application Data

(63) Continuation of application No. PCT/US2009/030500, filed on Jan. 8, 2009.

(60) Provisional application No. 61/020,299, filed on Jan. 10, 2008, provisional application No. 61/047,711, filed on Apr. 24, 2008, provisional application No. 61/099,467, filed on Sep. 23, 2008.

(51) Int. Cl.
    *H04M 1/02*           (2006.01)
    *B60R 11/02*          (2006.01)

(52) U.S. Cl.
    CPC ............ *H04M 1/0256* (2013.01); *B60R 11/02* (2013.01); *H04M 1/0254* (2013.01); *B60R 2011/0288* (2013.01); *B60R 2011/0294* (2013.01)

(58) Field of Classification Search
    CPC .................. H04M 1/72519; H04M 1/72583; H04M 1/23
    USPC .......... 455/566, 575.1–575.5; 436/29, 37, 46, 436/47; D14/401, 240
    See application file for complete search history.

(56) References Cited

U.S. PATENT DOCUMENTS

| | | | | |
|---|---|---|---|---|
| 4,969,647 | A | * | 11/1990 | Mical et al. ..................... 463/31 |
| 5,716,730 | A | * | 2/1998 | Deguchi ......................... 429/97 |

(Continued)

FOREIGN PATENT DOCUMENTS

| | | |
|---|---|---|
| CN | 1363870 | 8/2002 |
| CN | 1500312 | 5/2004 |

(Continued)

OTHER PUBLICATIONS

International Search Report and Written Opinion, PCT/US2009/030500, Mar. 9, 2009.

(Continued)

*Primary Examiner* — Marisol Figueroa
(74) *Attorney, Agent, or Firm* — Stoel Rives LLP

(57) ABSTRACT

A configurable modular communication device is composed of an information delivery module and an information input module that are matable to each other. The information delivery module is a single base unit that can work with a touch-screen keypad or a number of modular keypad or other information input attachments. The information input module enables a user to change the look of the modular communication device according to personal taste and enhances its functionality to fit the exact occasion and mode of use. The information delivery module acts on its own as the navigation key and provides on its display screen menu (including an on-screen touch sensing keypad) user access to all functionality including telephone, PDA (personal digital assistant), camera, clock, GPS, and MP3 music player. User-controlled navigation takes place on or in the vicinity of the display screen, whether by hard or soft key actuation.

20 Claims, 50 Drawing Sheets

(56) References Cited

U.S. PATENT DOCUMENTS

| | | | |
|---|---|---|---|
| 5,848,152 A | 12/1998 | Slipy et al. | |
| 5,854,984 A | 12/1998 | Buhrmann et al. | |
| 5,924,044 A | 7/1999 | Vannatta et al. | |
| 6,077,164 A * | 6/2000 | Liu | 463/36 |
| 6,188,917 B1 * | 2/2001 | Laureanti | 455/573 |
| 6,341,218 B1 | 1/2002 | Poplawsky et al. | |
| 6,530,838 B2 * | 3/2003 | Ha et al. | 463/36 |
| 6,742,685 B2 | 6/2004 | Williams | |
| 6,744,890 B1 * | 6/2004 | Le et al. | 379/433.07 |
| 6,801,787 B1 | 10/2004 | Page et al. | |
| 7,420,615 B2 | 9/2008 | Tsai et al. | |
| 7,529,155 B2 | 5/2009 | Fasciano | |
| 7,627,343 B2 | 12/2009 | Fadell et al. | |
| 7,692,667 B2 | 4/2010 | Nguyen et al. | |
| 2003/0017839 A1 * | 1/2003 | Mager | 455/550 |
| 2003/0038786 A1 | 2/2003 | Nguyen et al. | |
| 2003/0068034 A1 | 4/2003 | Silvester | |
| 2003/0071791 A1 | 4/2003 | Hanson et al. | |
| 2004/0057578 A1 | 3/2004 | Brewer | |
| 2004/0097276 A1 | 5/2004 | Harmon | |
| 2004/0132492 A1 | 7/2004 | Engstrom et al. | |
| 2004/0137983 A1 * | 7/2004 | Kerr et al. | 463/29 |
| 2004/0224638 A1 | 11/2004 | Fadell et al. | |
| 2005/0116334 A1 | 6/2005 | Buehler | |
| 2005/0271200 A1 | 12/2005 | Hu et al. | |
| 2006/0044134 A1 | 3/2006 | Elliott | |
| 2006/0099995 A1 | 5/2006 | Kim et al. | |
| 2006/0244728 A1 | 11/2006 | Finke-Anlauff et al. | |
| 2007/0004446 A1 | 1/2007 | Moran et al. | |
| 2009/0163241 A1 | 6/2009 | Vossoughi et al. | |
| 2010/0193583 A1 * | 8/2010 | Tartavull et al. | 235/375 |

FOREIGN PATENT DOCUMENTS

| | | |
|---|---|---|
| EP | 0 829 992 A2 | 3/1998 |
| EP | 1 489 821 A1 | 12/2004 |
| JP | 04-117848 | 4/1992 |
| JP | 07-143550 | 6/1995 |
| JP | 08-335968 | 12/1996 |
| JP | 10-243441 | 9/1998 |
| JP | 11-017790 | 1/1999 |
| JP | 11-215217 | 8/1999 |
| JP | 2001-506827 | 5/2001 |
| JP | 2001-309027 | 11/2001 |
| JP | 2003032344 | 1/2003 |
| JP | 2003-058278 | 2/2003 |
| JP | 2003-087368 | 3/2003 |
| JP | 2003-209603 | 7/2003 |
| JP | 2004-172654 | 6/2004 |
| JP | 2005-159399 | 6/2005 |
| TW | 365720 | 8/1999 |
| WO | WO03/053026 | 6/2003 |
| WO | WO2004098079 | 11/2004 |

OTHER PUBLICATIONS

International Search Report and Written Opinion, PCT/US2007/073178, Feb. 1, 2008.

Tuteja, Modular Linux Phone Revealed, available at www.realrealgeek.com/modular-linux-phone-revealed/, Jun. 30, 2009, visited Oct. 14, 2010.

Patent Filed for PDA with Detachable Mobile Phone, available at http://www.mobilewhack.com/patent-filed-for-pda-with-detachable-mobile-phone/, Apr. 12, 2007; visited Oct. 14, 2010.

Will COM WP004 Modular Phone, available at http://www.slashphone.com/111/6955/html, visited Oct. 14, 2010.

Modu., available at www.modumobile.com/, visited Oct. 14, 2010.

Informal comments, PCT/US2009/030500, Apr. 2, 2009.

Extended European Search Report, Application No. EP 07 79 9462, Mar. 2, 2011.

U.S. Appl. No. 12/350,818, filed Jan. 8, 2009.

Office action, U.S. Appl. No. 12/350,818, mailed Jan. 27, 2012.

Office Action, U.S. Appl. No. 13/922,082, mailed Nov. 20, 2013.

Supplementary European Search Report, EP09701192, Dec. 18, 2013.

* cited by examiner

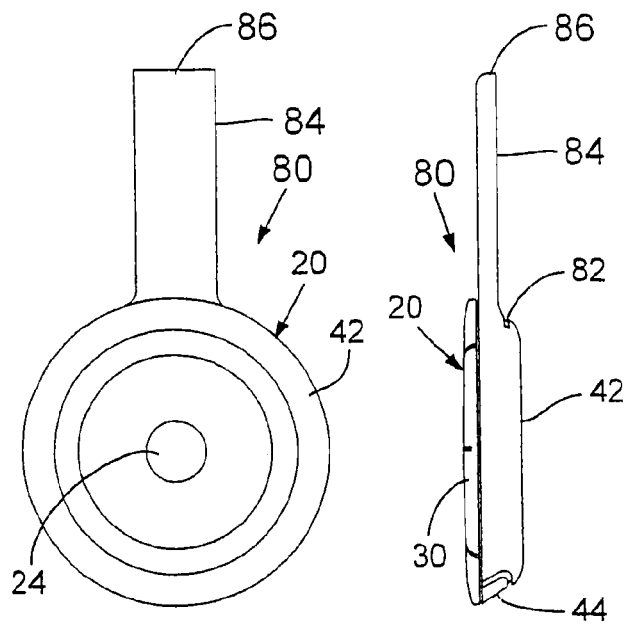
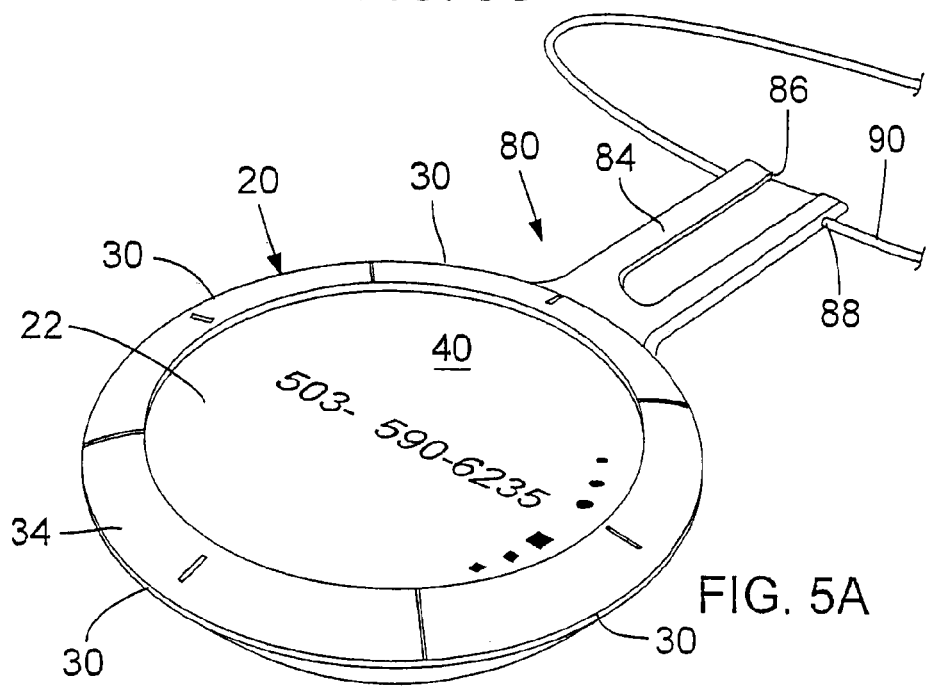
FIG. 5B  FIG. 5C
FIG. 5A

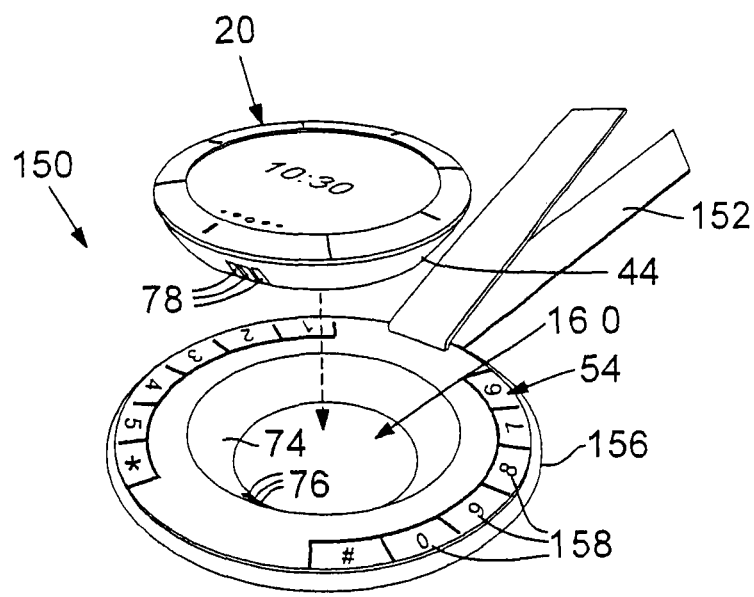
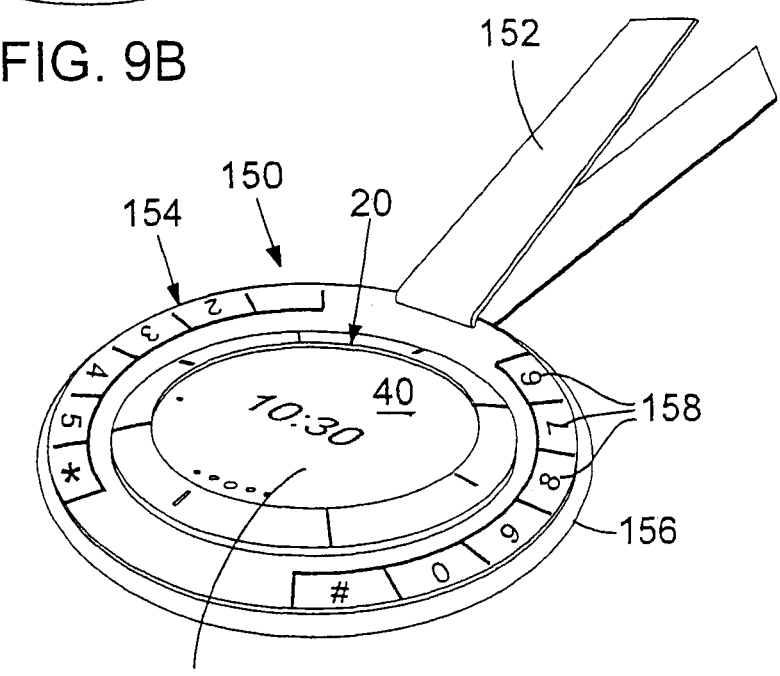

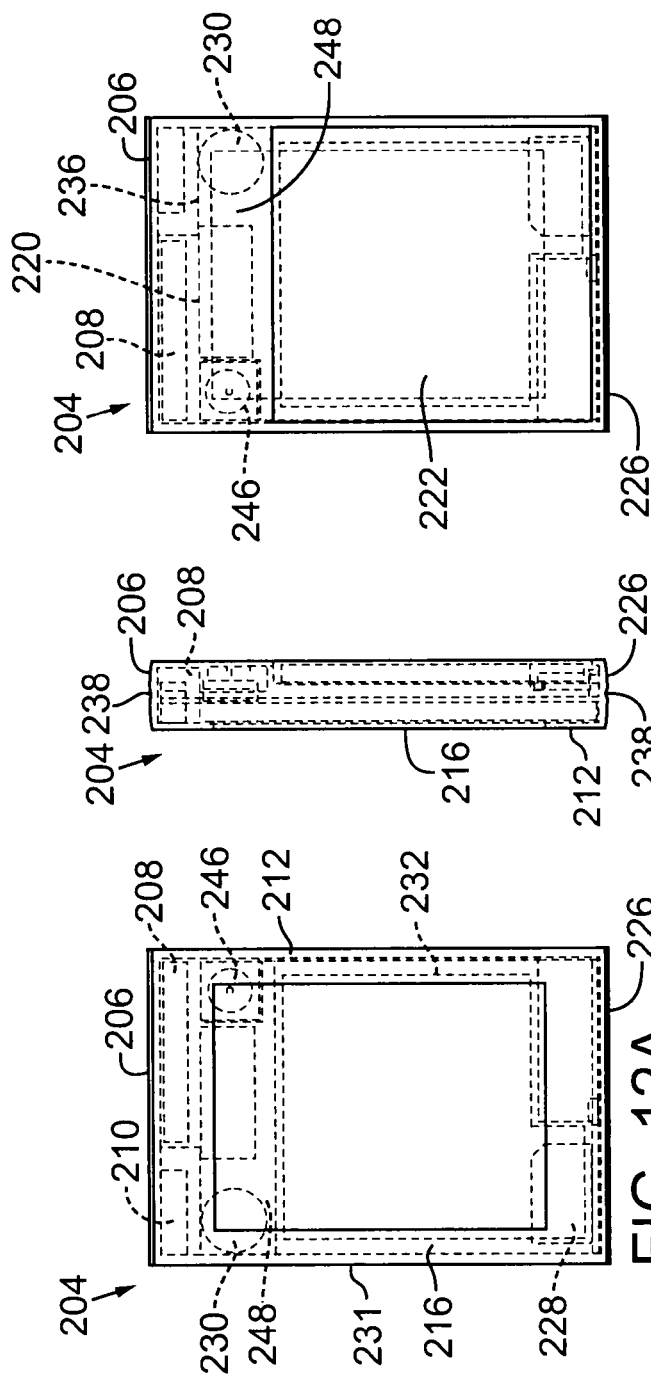
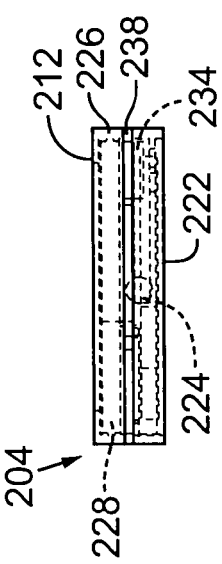
FIG. 12A  FIG. 12B  FIG. 12C  FIG. 12D

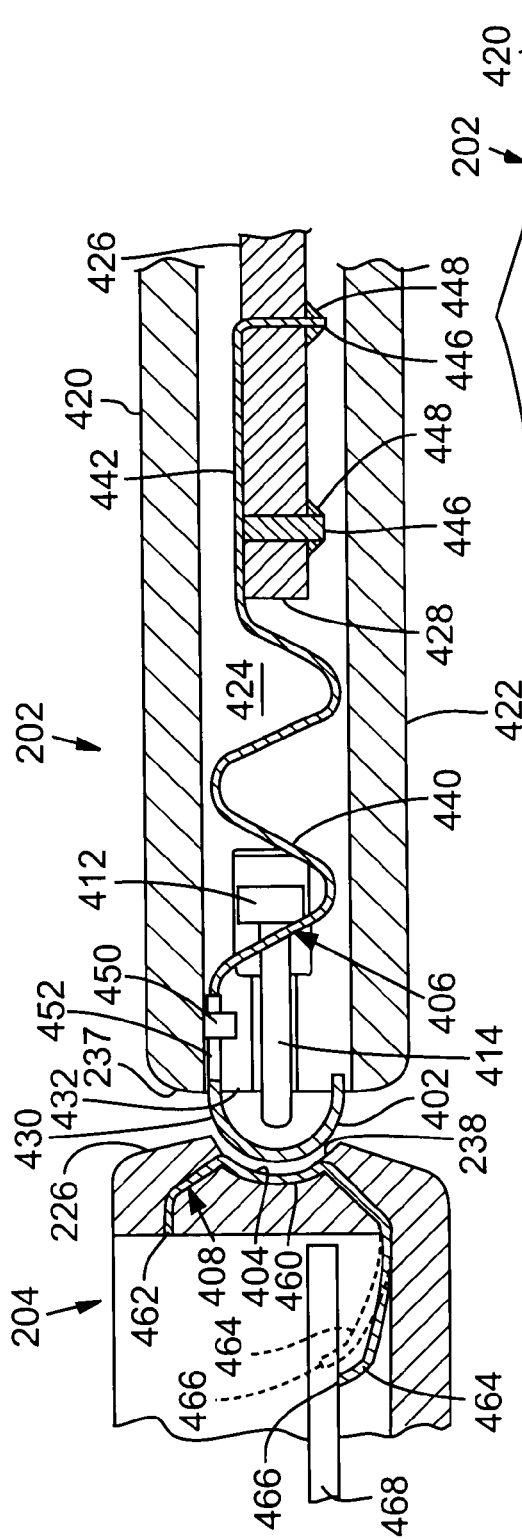
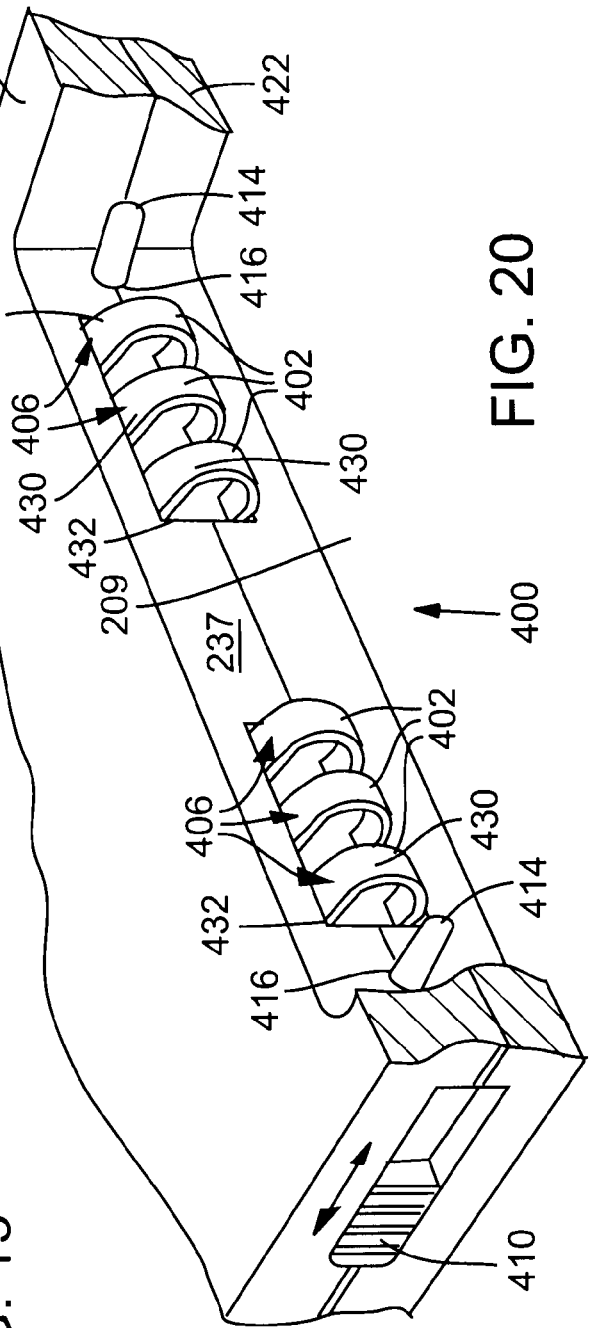
FIG. 19
FIG. 20

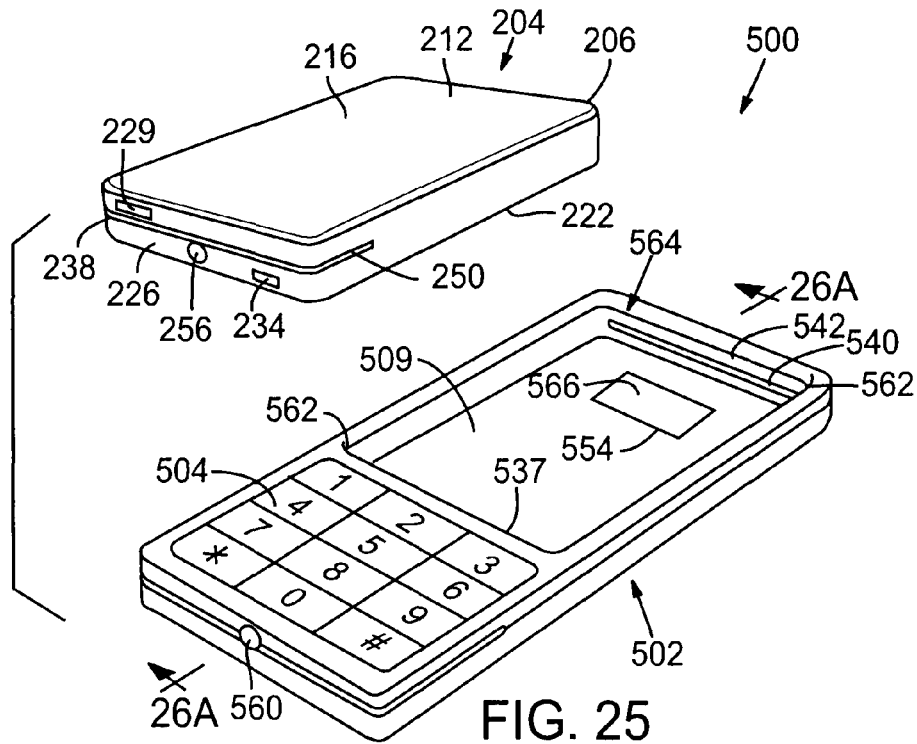
FIG. 25
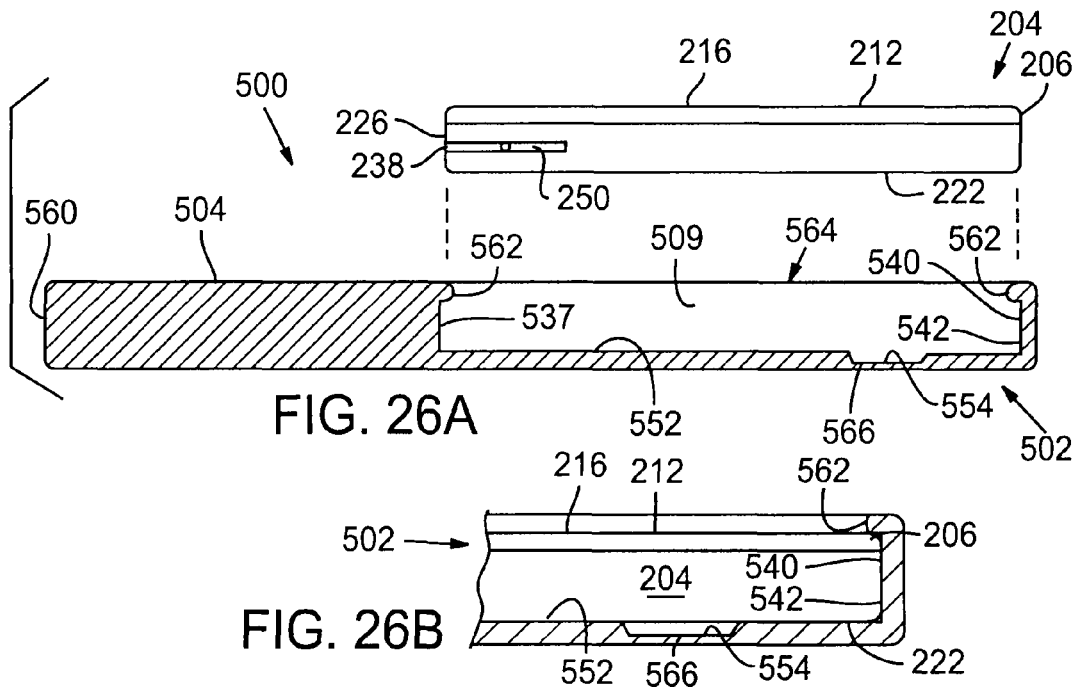
FIG. 26A
FIG. 26B

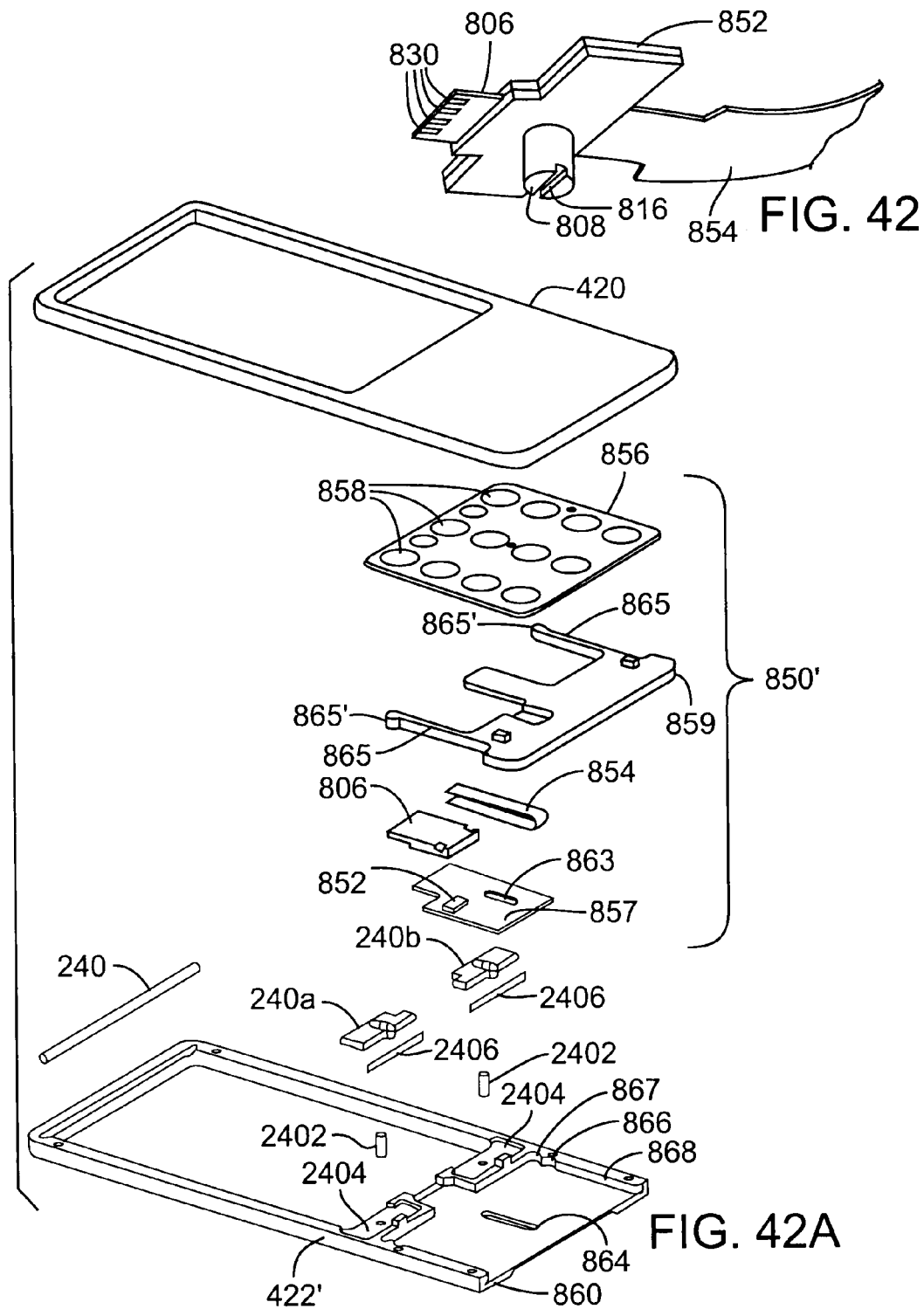

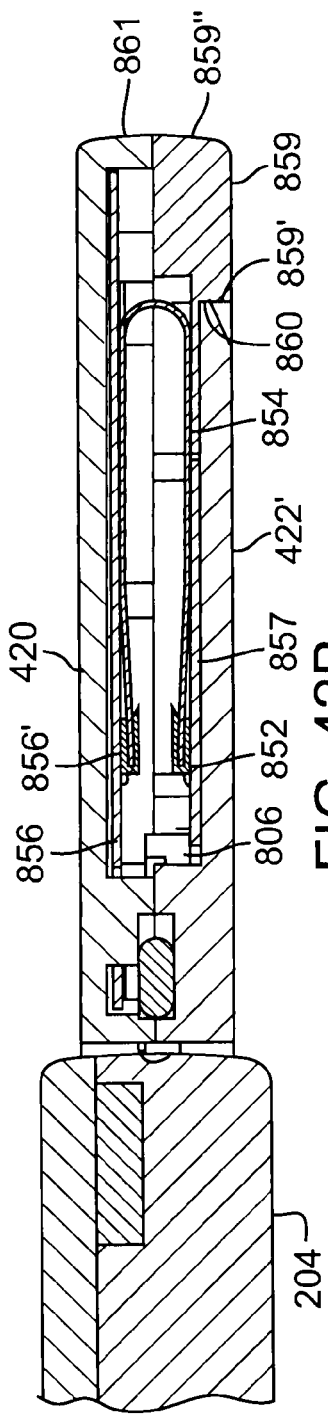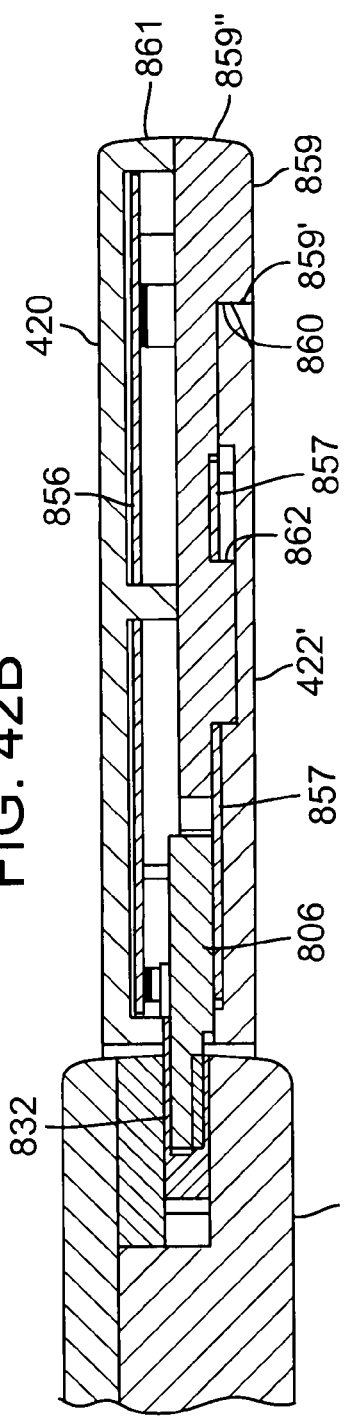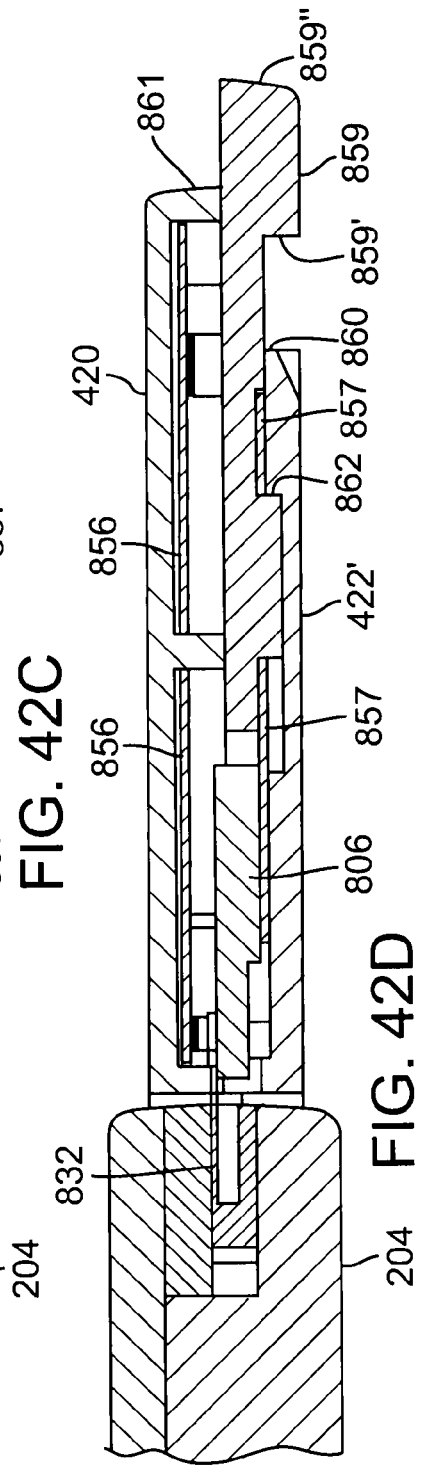

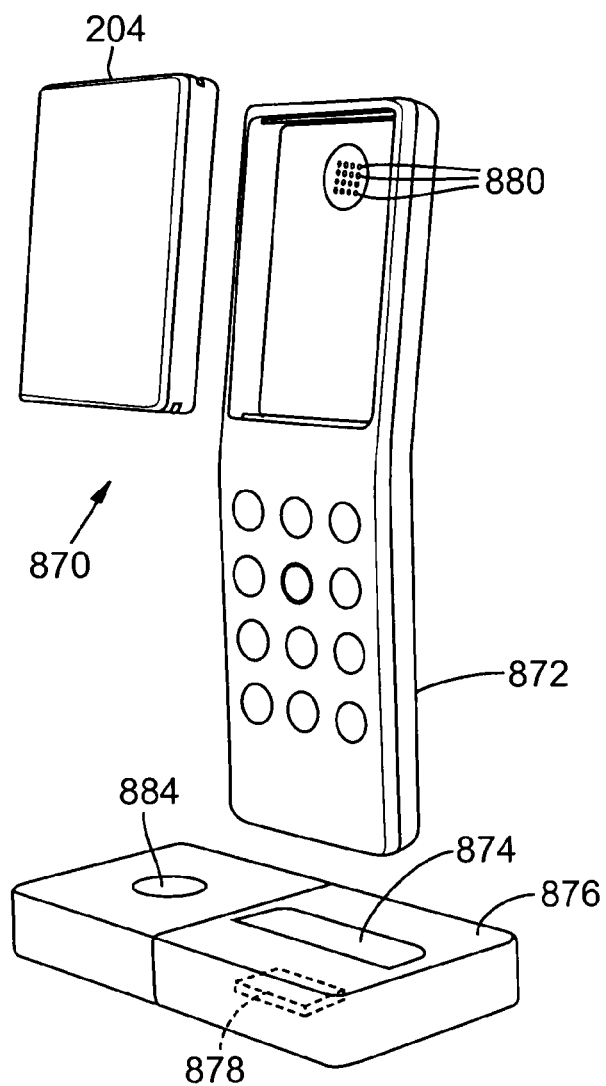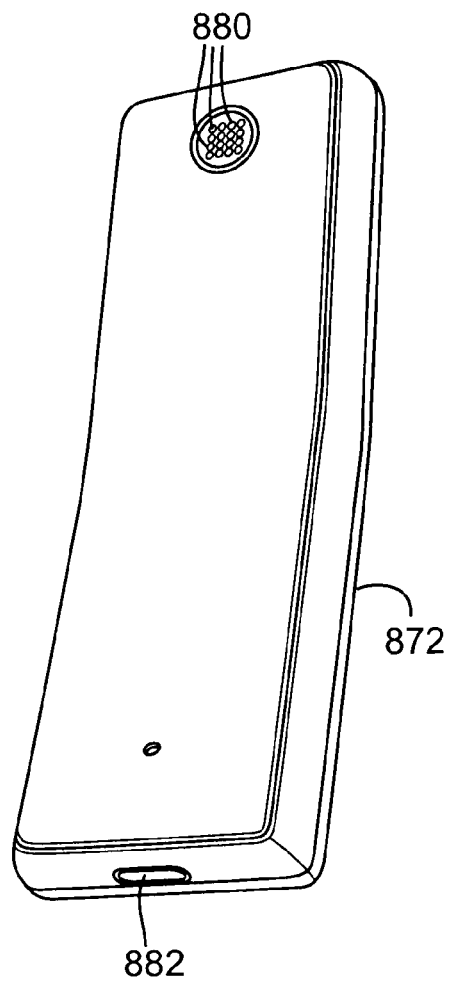
FIG. 43
FIG. 44

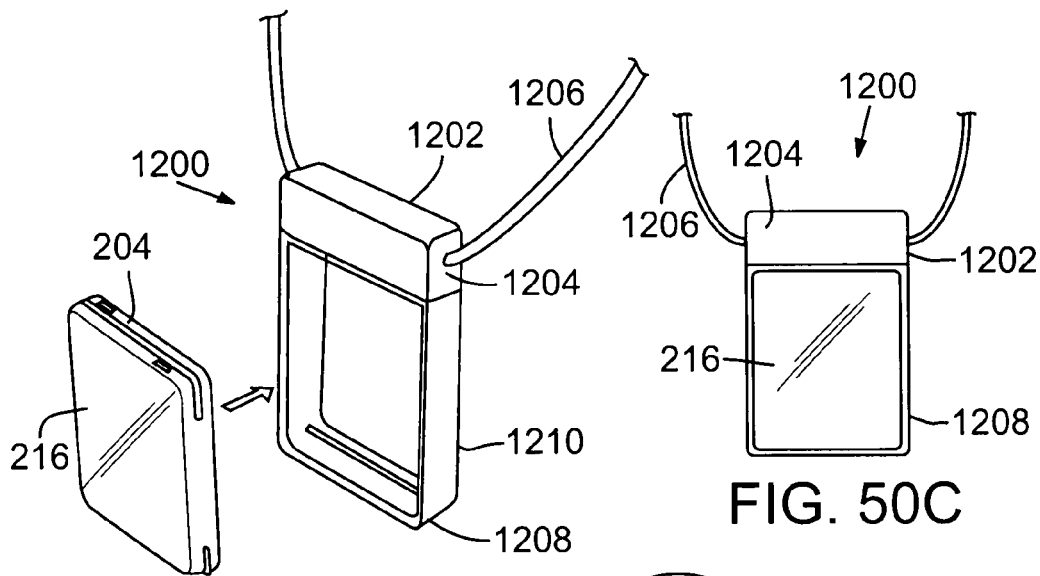
FIG. 50A
FIG. 50C
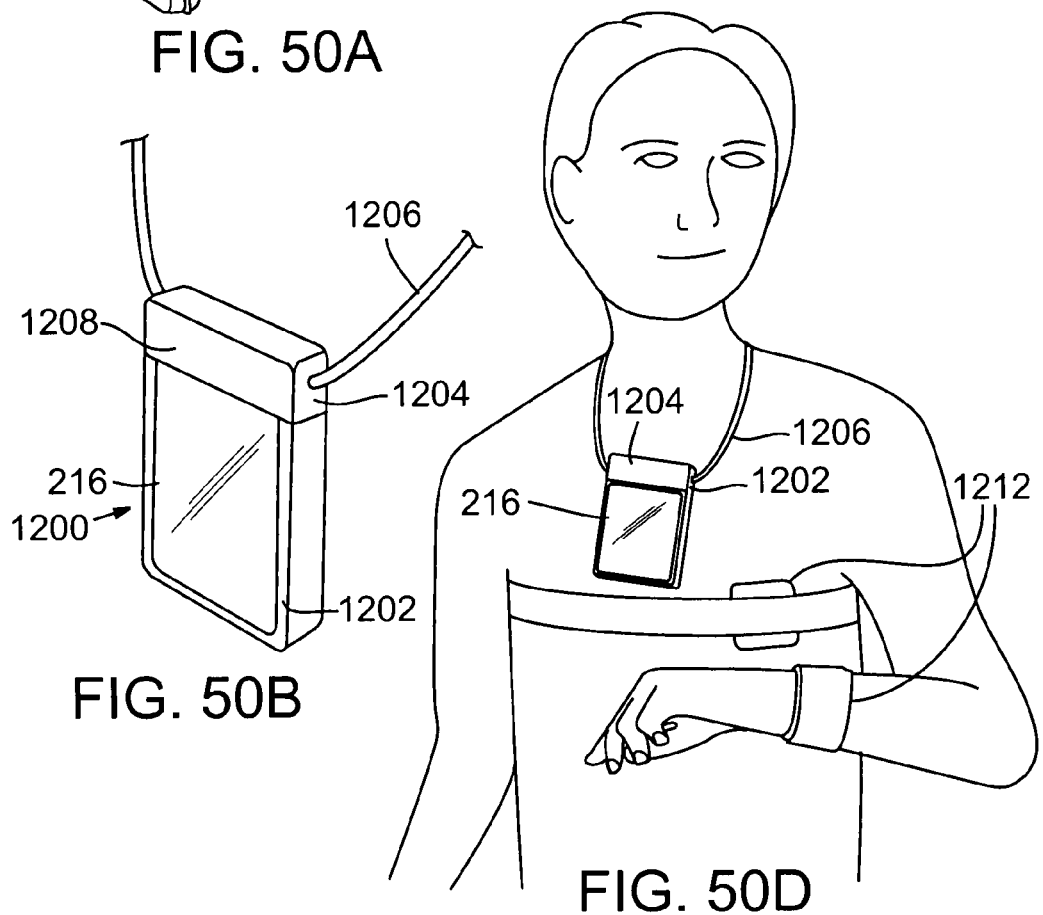
FIG. 50B
FIG. 50D

CUSTOMIZABLE MODULAR MULTI-FUNCTION COMMUNICATION DEVICE

This application is a continuation of International Application No. PCT/US2009/030500, filed Jan. 8, 2009, which claims benefit of U.S. Provisional Application No. 61/020,299, filed Jan. 10, 2008; U.S. Provisional Application No. 61/047,711, filed Apr. 24, 2008; and U.S. Provisional Application No. 61/099,467, filed Sep. 23, 2008.

TECHNICAL FIELD

The present disclosure relates to mobile communication devices and, in particular, to a modular, configurable, multi-function mobile communication device that can be fully customized to users' personal tastes and desired modes of use.

BACKGROUND INFORMATION

The increasing worldwide popularity of mobile or cellular telephones has transformed the way people live and work, while reshaping the cultural landscape. The proliferation of thousands of models and styles of mobile telephones has turned this one-time marvel of technology into a commodity product. Over 500 million sleek, colorful new mobile telephone sets are sold annually and used to send text and e-mail messages, browse the World Wide Web, play video games, keep track of personal information, take photographs, and store and play music in many different situations, modes, and capacities. The mobile telephone has rapidly become the centerpoint of digital life, as well as a personal fashion statement.

SUMMARY OF THE DISCLOSURE

Preferred embodiments pertain to a modular multi-functional communication device that is customizable and configurable in aesthetic appearance, operational function, or both, by selectable substitution of modular components. The communication device includes a portable information delivery module that has a display screen and associated electronic circuitry to provide at least partly without user stimulus signals for delivery of information to present on the display screen for observation by a user. The information delivery module has a peripheral side margin and an electrical conductor carrying signals to which the electronic circuitry in the information delivery module is responsive. The communication device includes an information input module having an input device that is operable in response to user-produced command signals to which the information delivery module responds to transmit information determined by the user. The information input module includes a housing having opposing major surfaces of at least one of which includes an opening that is sized to accept placement of the information delivery module for releasable electrical and mechanical connections. The opening is defined by an inner boundary that encompasses the peripheral side margin of the information delivery module when it is placed in the opening of the information input module. The communication device includes a connecting member positioned in the information input module along its inner boundary to provide a releasable snap fit for the information delivery module when it is placed in the opening of the information input module. The communication device has matable members associated with the information input module and the information delivery module. The matable members are configured to cooperate with each other such that, when the information delivery module is placed in the opening of the information input module, the matable members are spatially aligned and, in response to a securing force, assume a mated condition in which the information delivery module is secured in place relative to the information input module.

Additional aspects and advantages will be apparent from the following detailed description of preferred embodiments, which proceeds with reference to the accompanying drawings.

BRIEF DESCRIPTION OF THE DRAWINGS

FIGS. 5A, 5B, and 5C are, respectively, perspective, front elevation, and side elevation views of an information delivery module of a modular multi-function communication device, which module is embodied as a necklace pendant.

FIGS. 9A, 9B, and 9C are perspective views of a modular multi-function communication device shown, respectively, completely assembled, partly exploded to illustrate a telephone input module embodied as a hand-held medallion in the form of an annular keypad having a circular, depthwise tapered central opening sized to receive the information delivery module of FIGS. 1A-1D, and held in the palm of a user's right hand and secured by a strap around the user's wrist.

FIGS. 12A, 12B, 12C, and 12D are, respectively, front, side elevation, rear, and bottom plan views of the information delivery module of FIG. 11.

FIG. 19 is a cross-sectional view of the information input module and puck of FIG. 11, shown with alternative electrical contact members in the confronting relationship they assume when information input module and puck 204 are mated together.

FIGS. 20 and 21 are fragmentary isometric views of, respectively, the information input module and puck of FIG. 19, showing spring-biased contact members of the information input module and concave contact members of the puck.

FIG. 25 is a partly exploded perspective view of a hand-held modular communication device that includes an information input module made of elastomeric material that provides a hermetically sealed environment for an embedded numerical pad and a sealed container for the puck when it is installed.

FIG. 26A is a sectional view of the information input module taken along lines 26A-26A of FIG. 25, showing the puck in position for insertion into the information input module.

FIG. 26B is an enlarged, fragmentary cross-sectional view of a portion of the information input module of FIG. 25 holding the puck in place against a floor and in sealing relationship with the information input module.

FIG. 42 is a fragmentary view of a flex circuit holder, which is the slidable part of the circuit board assembly of FIG. 41, and a flex circuit ribbon that electrically interconnects the flex circuit holder to a main circuit board, which is the stationary part of the circuit board assembly.

FIG. 42A is an exploded isometric view of an information input module implemented with a second alternative slidable printed circuit board assembly.

FIGS. 42B and 42C are cross-sectional views of the information input module of FIG. 42A showing a slider switch in a locking position.

FIG. 42D is a cross-sectional view of the information input module of FIG. 42A showing the slider switch in an unlocking position.

FIG. 43 is a partly exploded perspective view of a handheld modular communication device in the form of a telephone handset that includes an information input module configured to rest in a dock opening in a charging station and equipped to receive updated information for storage in solid state memory residing in the charging station.

FIG. 44 is a rear perspective view of the information input module of FIG. 43 having in its bottom surface sound emission holes that pass sound emitted by an audio speaker in the puck and in its bottom side margin an IR link window that provides an information download communication link to the solid state memory in the charging station.

FIGS. 50A, 50B, and 50C are, respectively, partly exploded perspective, perspective, and frontal views of an information input module in the form of a health module configured to receive an information delivery module of a type similar to that of FIGS. 12A-12D; and FIG. 50D is a frontal view of the health module worn around a user's neck.

DETAILED DESCRIPTION OF PREFERRED EMBODIMENTS

Figure 1A:
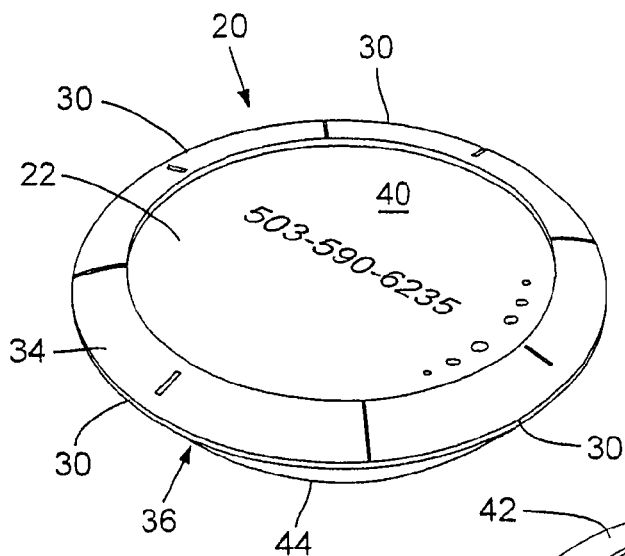
FIGS. 1A, 1B, 1C, and 1D are, respectively, front perspective, rear perspective, front elevation, and side elevation views of a preferred information delivery module (or "puck") configured to fit into a depthwise tapered opening in, and achieve matable connection with, any one of a number of information input modules to create a variety of embodiments of a modular multi-function communication device.

Preferred embodiments of a mobile communication device combine the latest in communication technology with established patterns of human behavior. Several of the preferred embodiments of the communication device specifically described are those of a mobile telephone. By framing the opportunity within the context of a market that had become greatly commodified and was rapidly fragmenting, applicant identified an opportunity to move away from developing yet another multi-function mobile telephone. The design of the modular multi-function mobile telephone embodies definitions of several user profiles, along with potential use scenarios that range from individuals wanting to stay in touch at all times in a familiar way, to business professionals seeking to easily connect to the Internet and send and receive e-mail messages, and to teenagers wanting to customize in an instant their telephones to a desired look.

Applicants' conceptual exploration of technology, communication, and human behavior revealed certain interesting findings. Although mobile telephones are becoming increasingly smaller, human fingers are not. As a matter of simple practicality, the keypad has remained the largest component of these devices. The keypad is also the most configurable and least expensive component of the mobile telephone. Preferred embodiments separate the keypad from the rest of the mobile telephone components and provide a flexible, functional, and configurable modular communication device called "POD" that can fully and affordably address a user's desire for greater customization and optimization.

POD is composed of an information delivery module, called "puck" because of the physical appearance of its preferred embodiments, and an information input module, such as a keypad. The information delivery and information input modules are matable to each other. The puck is a single base unit that can work with a touchscreen keypad or a number of modular keypad or other information input attachments. The puck can receive information through the information input module as well. With the puck, POD addresses different use modes and aesthetic sensibilities of its users. This enables the user to change the look of the product according to personal taste and enhances the functionality of the device to fit the exact occasion and mode of use. The puck preferably contains communication and display signal processing circuitry and associated components of the POD, including a display screen of interactive (e.g., touch screen) or noninteractive type, energy supply (battery), and video camera. Communication signal connectors or other devices are placed on the outside ring or rear surface of the puck. The puck acts on its own as the navigation key and provides on its screen menu (including an on-screen touch sensing keypad) user access to all functionality including telephone, PDA (personal digital assistant), camera, clock, and MP3 music player. Navigation key actuators include mechanical keys or, more preferably, touchscreen function actuation areas. User-controlled navigation takes place on or in the vicinity of the display screen, whether by hard or soft key actuation.

Functionality can be expanded by placement of the puck into other devices or by the use of input modules such as a keypad module that enables the POD to be used as a conventional mobile telephone, PDA, MP3 player, and gaming device. For example, using common flex-circuit technology, interchangeable keypads can be encased and manufactured inexpensively in many different shapes, finishes, and materials such as leather, fabrics, silicon rubbers, plastics, and metals. In certain embodiments, use in the puck of an on-screen touch sensing keypad enhances POD design flexibility by enabling use of fewer (by elimination of the keypad module) or different functional controls in the information input module. Moreover, accent covers fitted over the back surface of the POD provide another opportunity to readily customize its appearance.

The modular design approach implements a compact, affordable, customizable, and highly functional solution that transcends use and user differences while creating an iconic device.

Preferred embodiments of the POD transform the mobile telephone, text message, photographic or video image acquisition, music listening, video watching, or video game experience by offering a modular multi-function communication device that can be easily and affordably customized to meet users' exact needs and desires through a variety of interchangeable attachments. POD is a flexible system based on a shared information delivery module or puck 20, a personable, compact embodiment of which is shown in FIGS. 1A, 1B, 1C, and 1D. Puck 20 preferably embodies a minimal, elegant shape (e.g., round, square, or rectangular) and fits comfortably in hand on its own, can be worn as a fashion statement through jewelry such as a necklace (FIG. 5A) or wrist watch (FIG. 3A), or can be transformed by a number of other information input, keypad, or docking modules (FIGS. 2A, 6A, 7A, 8A, 9A, 10A, 11, 14, 15, 16, 17, 25, 27, 29, 34, and 43) in many different forms, materials, finishes, and colors.

With reference to FIGS. 1A, 1B, 1C, and 1D, puck 20 is an information delivery module that includes on its front side a display screen 22, on its rear side an image camera 24, and in its interior a power source (not shown), such as a battery, and associated internal electronic circuitry (not shown) that provides signals for delivery of information to a user without user stimulus, with user stimulus, or both. Internal electronic circuitry includes communication signal processing circuitry for receiving, transmitting, or receiving and transmitting one or more of cellular telephone, image camera, FM radio, paging, personal digital assistant (PDA), MP3, global positioning system (GPS), and electronic message signals; image display symbology and patterns; calendar information; or other communication signals presenting visual or audible information to a user. The receipt of cellular telephone, video, and e-mail message signals and the display of image patterns (e.g., time of day) are typically accomplished without coincident user stimulus. Control buttons 30 positioned on a top annular rim 34 at a periphery 36 of puck 20 may be actuated by a user to set a display mode (e.g., clock face or decorative pattern), enable or disable certain functions (e.g., transfer cellular telephone call to voice message), or control certain operating conditions (e.g., control navigation through menu structure). Alternatively and more preferably, the user-controlled actions described above are accomplished by providing a touchscreen (implemented with currently available touch sensing technology) as display screen 22 and touching by the user of function actuation areas of the touchscreen to select the desired functional operation.

Figure 1B:
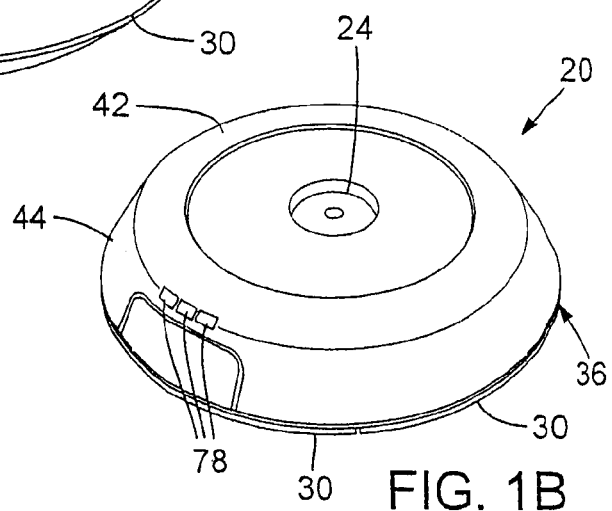
Figure 1C:
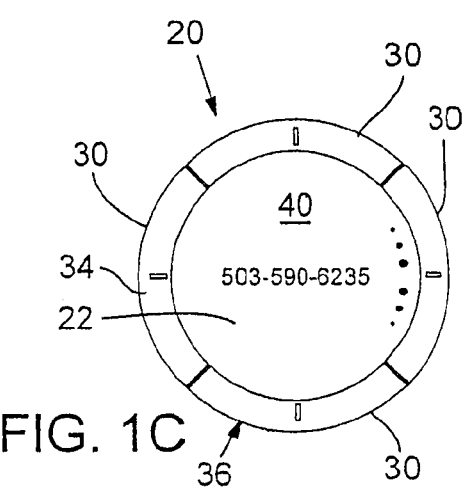
Figure 1D:
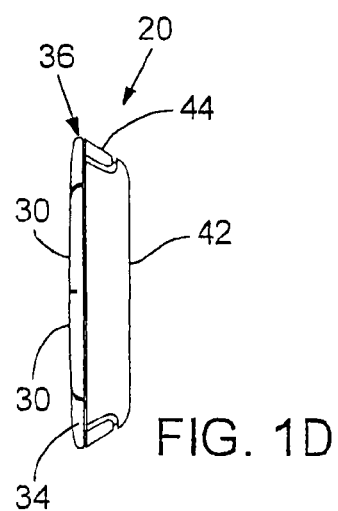

FIGS. 1A, 1B, and 1D show puck 20 in the form of a disk having a generally flat front surface 40 and a generally flat rear surface 42. Front surface 40 is of greater area than that of rear surface 42. A beveled peripheral side margin 44 interconnecting front and rear surfaces 40 and 42 is sized to mate with a complementary depthwise tapered side surface of any one of many information input module embodiments, several examples of which are described in detail below.

Figure 2A:
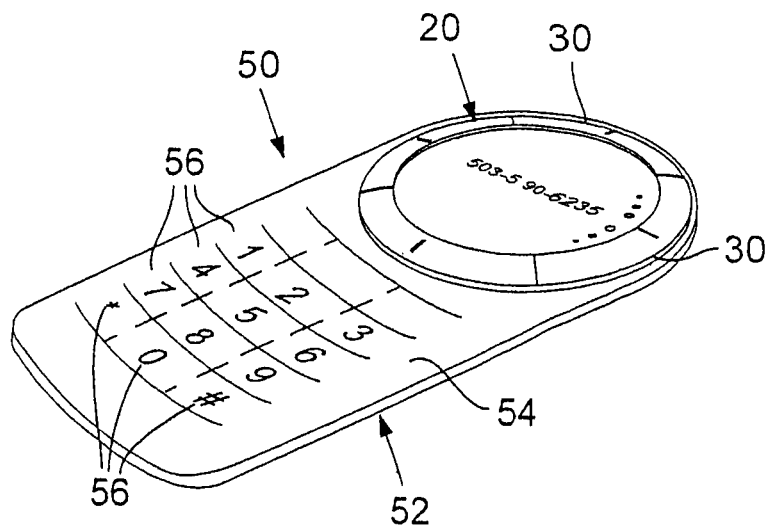
FIGS. 2A, 2B, and 2C are perspective views of a modular multi-function communication device shown, respectively, completely assembled, partly exploded to illustrate a telephone input module embodied as a conventional mobile telephone form factor keypad having a circular, depthwise tapered opening sized to receive the information delivery module of FIGS. 1A-1D; and held in the palm of a user's right hand.
Figure 2B:
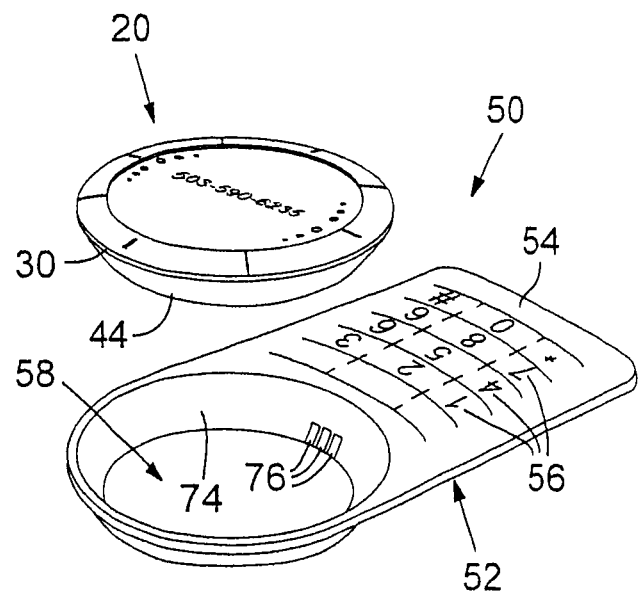
Figure 2C:
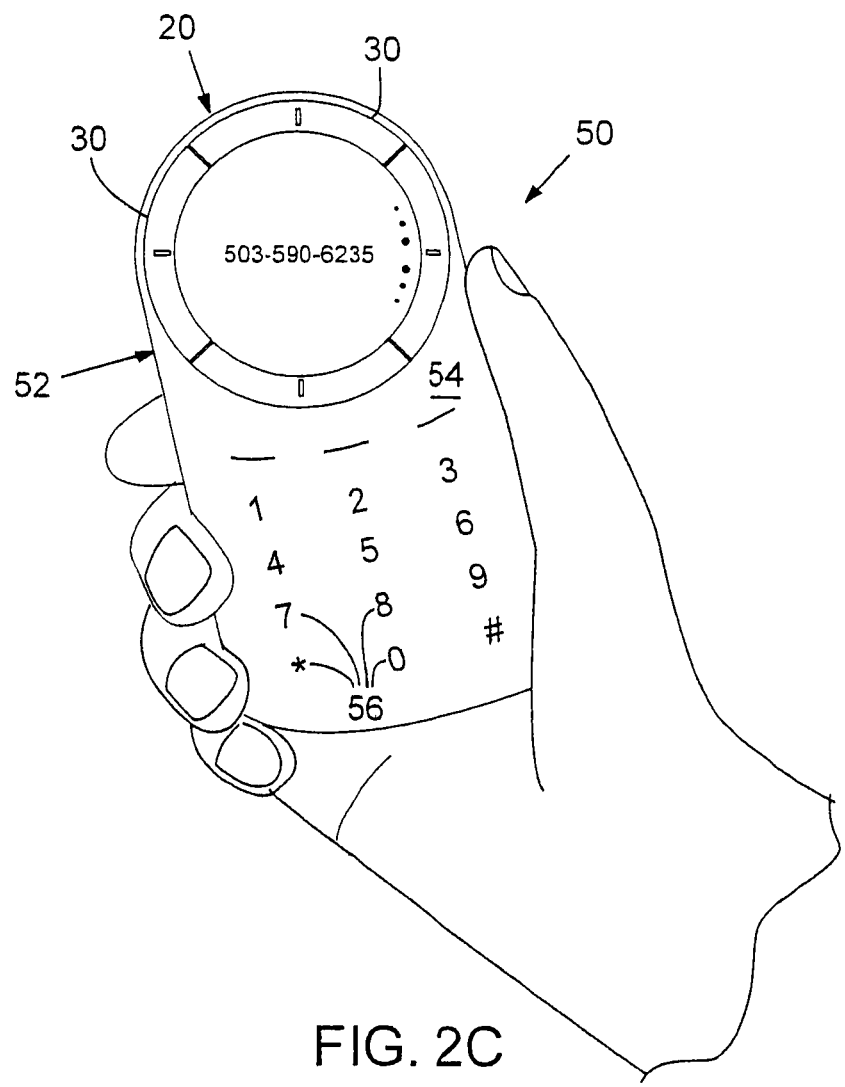

FIGS. 2A, 2B, and 2C show a modular communication device 50 that includes an information input module styled as a conventional mobile telephone form factor keypad 52. Keypad 52 exhibits on its upper surface 54 a conventional set of keypad buttons 56 and receives puck 20 in a circular aperture 58, as shown in FIG. 2B.

Figure 3A:
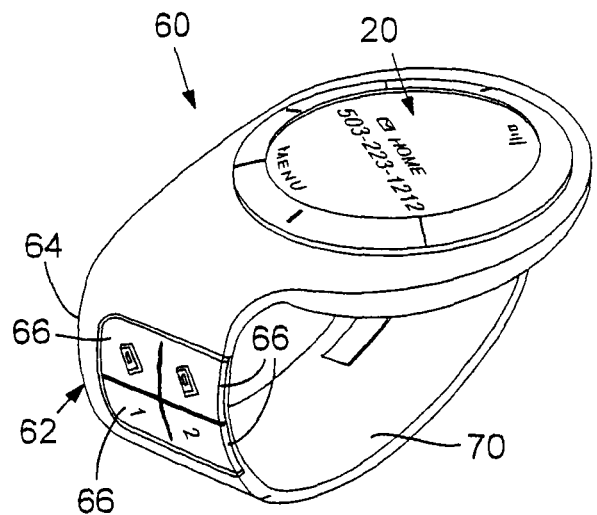
FIGS. 3A, 3B, and 3C are perspective views of a modular multi-function communication device shown, respectively, completely assembled; partly exploded to illustrate a telephone input module embodied as a wrist watch keypad having a circular, depthwise tapered opening sized to receive the information delivery module of FIGS. 1A-1D; and worn on a user's left wrist.
Figure 3B:
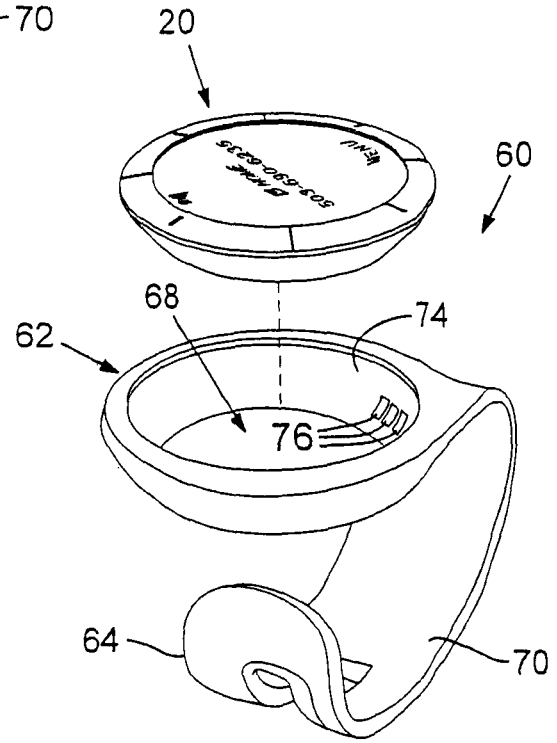
Figure 3C:
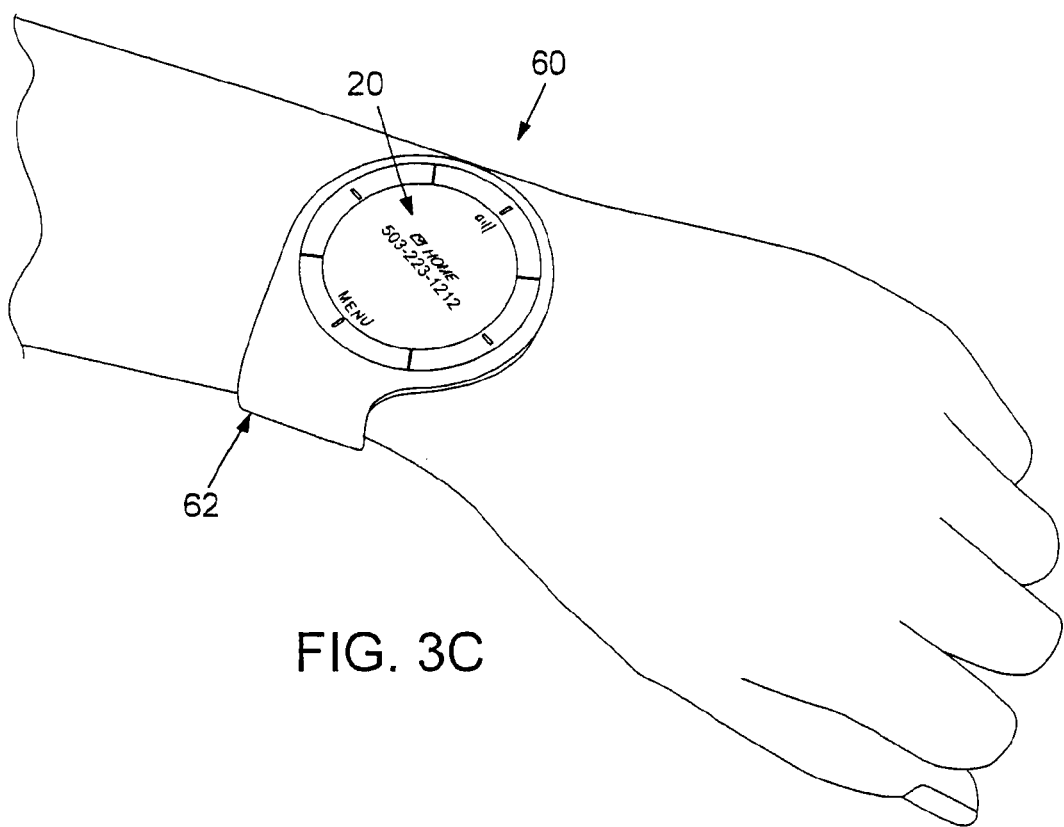
Figure 4A:
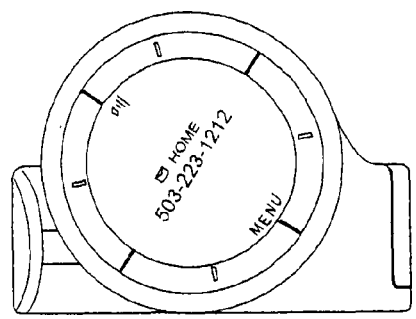
FIGS. 4A, 4B, and 4C are respective top plan, side surface elevation, and side profile elevation views of the wrist watch of FIGS. 3A-3C in a folded state.
Figure 4B:
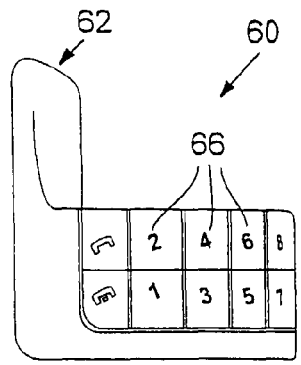
Figure 4C:
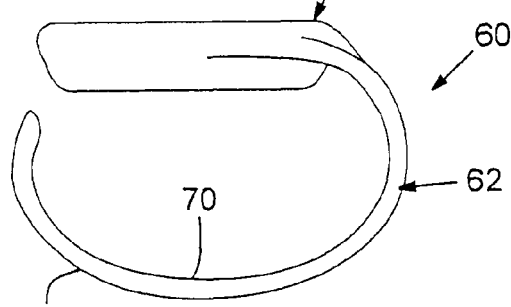
Figures 4D, 4E:
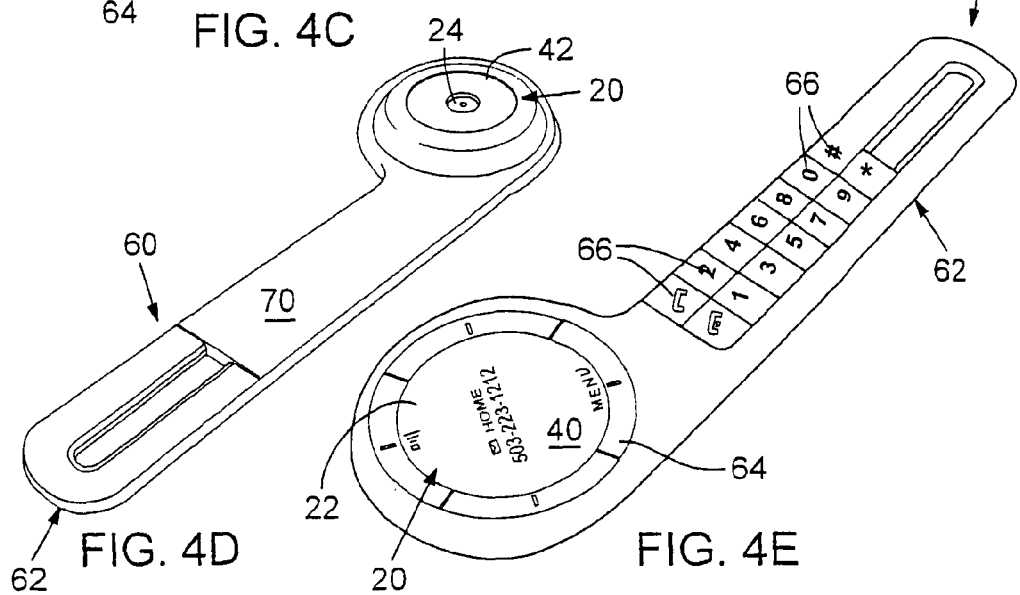
FIGS. 4D and 4E are respective inside and outside surface perspective views of the wrist watch of FIGS. 3A-3C in an unfolded state.

FIGS. 3A, 3B, and 3C show a modular communication device 60 that includes an information input module embodied as a keypad styled as a wrist watch band 62. Wrist watch band 62 is made of a flexible, resilient electronic circuit board substrate material, such as Kapton™ polyimide film manufactured by DuPont, which a user can configure to a desired shape and exhibits memory properties that retain the user-configured shape. Watch band 62 exhibits on its outside surface 64 a conventional set of keypad buttons 66 and receives puck 20 in a circular aperture 68, as shown in FIG. 3B. FIGS. 4A, 4B, and 4C show watch band 62 in a folded state representing the shape assumed when a user wears wrist watch modular communication device 60. FIGS. 4D and 4E show watch band 62 in an unfolded, flat state, illustrating, respectively, its inside surface 70 and image camera 24 of puck 20, and its outside surface 64 with keypad buttons 66 and display surface 22 of puck 20.

With reference to FIGS. 2B and 3B, each of circular aperture 58 of keypad 52 and circular aperture 68 of watch band 62 has an inner side surface 74 of complementary beveled shape to that of beveled peripheral side margin 44 of puck 20. Electrical contacts 76 positioned on inner side surface 74 provide an interface to deliver signals to and receive signals from corresponding electrical contacts 78 on peripheral side margin 44 (FIG. 1B) of puck 20 when it is installed in aperture 58 or 68. Substituting infrared light, RF, or Bluetooth transmitter and sensor devices for electrical contacts 76 and 78 provides an alternative communication link interface for delivering signals to and receiving signals from puck 20 when it is installed in an information input module. FIGS. 2A and 3A show puck 20 installed in keypad 52 and wrist watch band 62 to form, respectively, conventional mobile telephone form factor modular communication device 50 and wrist watch modular communication device 60. FIGS. 2C and 3C show, respectively, conventional mobile telephone form factor modular communication device 50 held in a user's hand and wrist watch modular communication device 60 worn on a user's wrist.

Figure 5D:
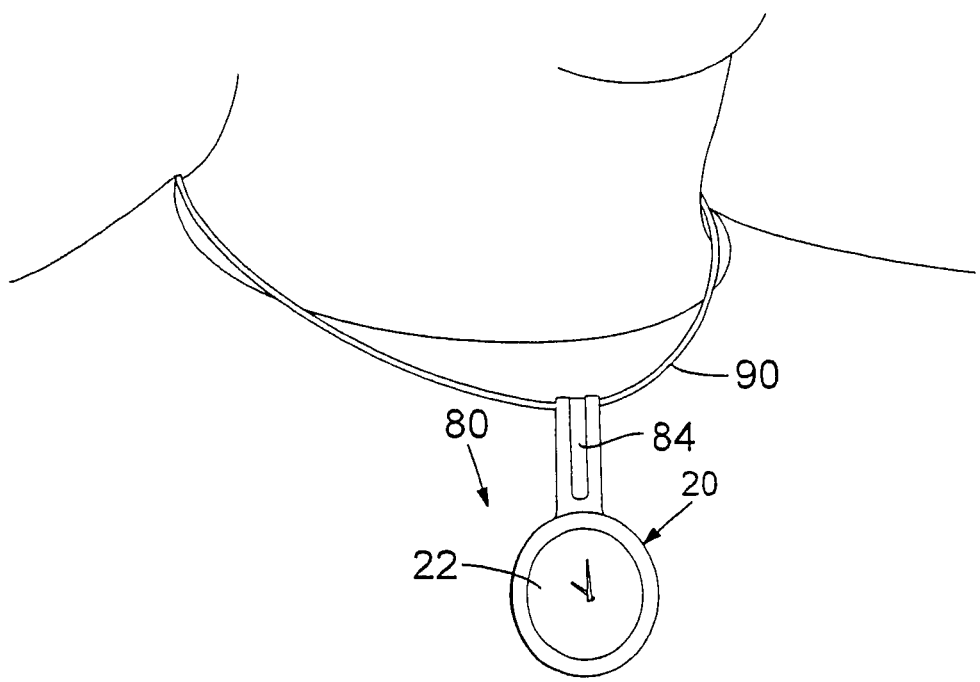
FIG. 5D is a frontal view of a user wearing the necklace pendant around her neck.
Figure 6B:
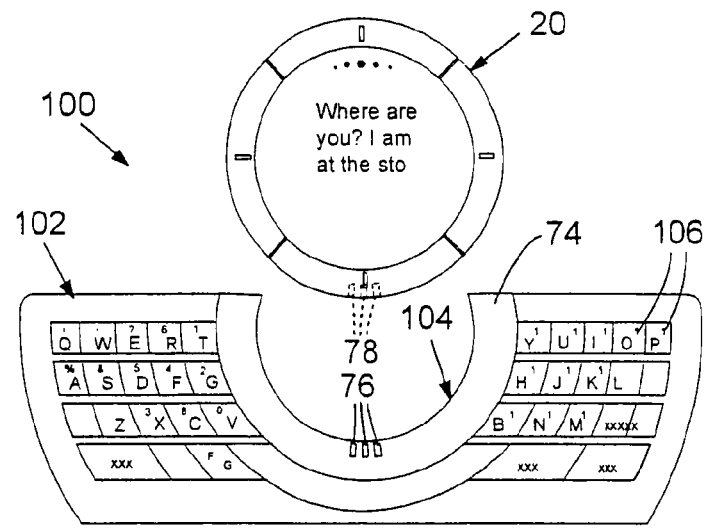
FIGS. 6A and 6B are top plan views of a modular multi-function communication device shown, respectively, completely assembled and partly exploded to illustrate a personal digital assistant (PDA) or text messaging input module embodied as a keypad configured for two-hand operation and having an arcuate, depthwise tapered opening sized to receive the delivery module of FIGS. 1A-1D.
Figures 6A, 6D:
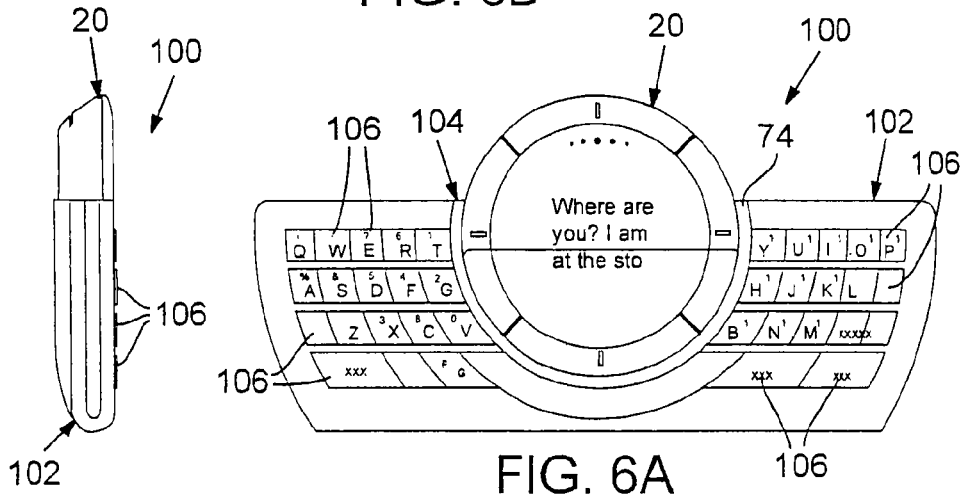
FIGS. 6C and 6D are respective front side elevation and left-hand side elevation views of the modular multi-function communication device of FIG. 6A.
Figure 6C:
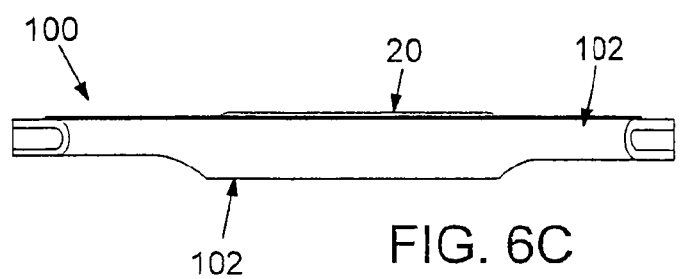
Figure 6E:
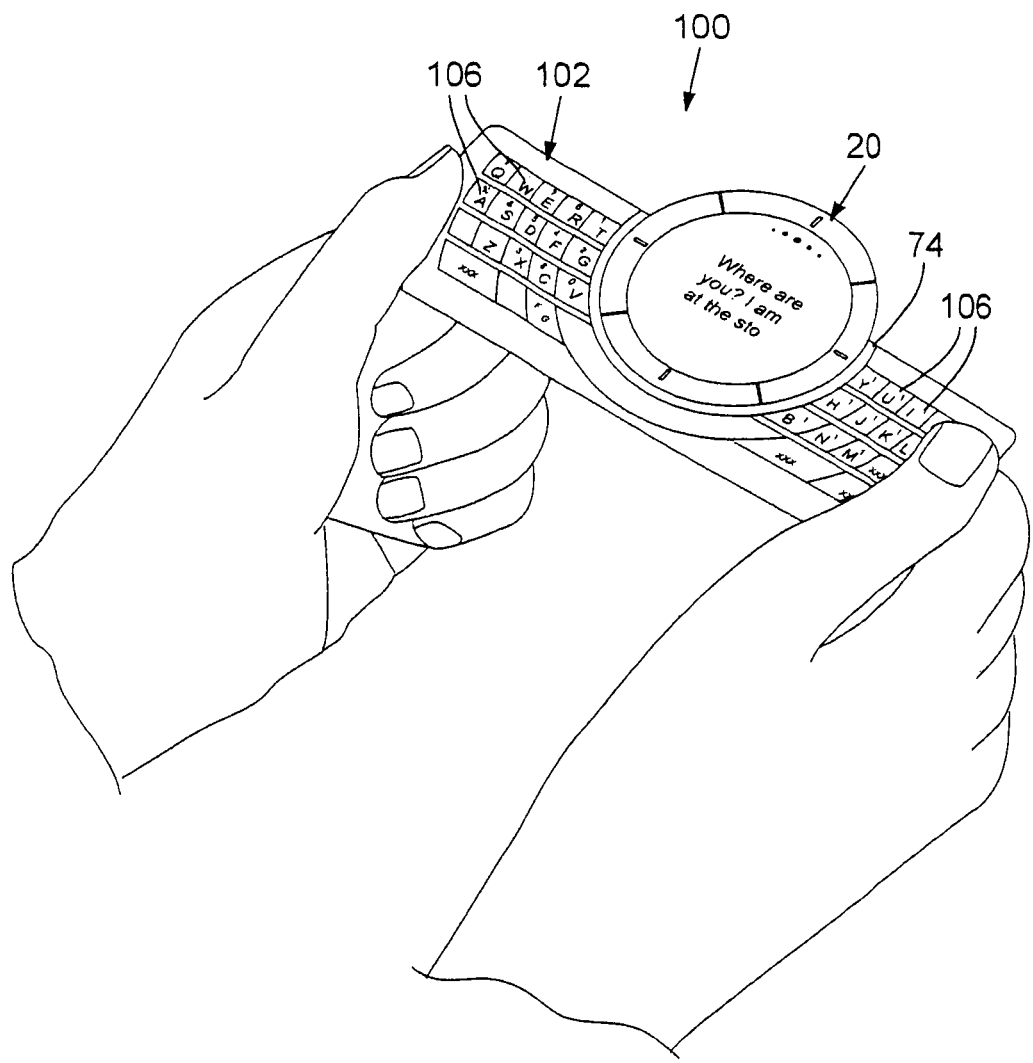
FIG. 6E is a perspective view of the modular multi-function communication device of FIG. 6A shown with the keyboard held by a user for two-hand operation.

FIGS. 5A, 5B, 5C, and 5D show an information delivery module adapted to be worn as a necklace pendant 80. Necklace pendant 80 includes puck 20 with a recess 82 formed in its peripheral side margin 44 to receive and lock in place an ornamental stem 84. Stem 84 has a free end 86 in which an aperture 88 is formed and sized to receive a necklace 90. FIG. 5A shows a telephone number appearing on display screen 22 of necklace pendant 80 to indicate the identity of the source of an incoming call to puck 20 configured to operate as a cellular telephone. FIG. 5B shows the rear side of puck 20 where the aperture of image camera 24 is located. FIG. 5D shows a clock face appearing on display screen 22 of necklace pendant 80 to represent one possible user selectable steady-state display pattern and source of time of day information. Withdrawing stem 84 from recess 82 is one of many ways of enabling installation of puck 20 in, for example, keypad 52 or wrist watch band 62 to enable a user to use puck 20 in a different mode in accordance with the keypad module selected.

FIGS. 6A, 6B, 6C, 6D, and 6E show a hand-held modular communication device 100 that includes a small-scale, full-function keyboard 102 having in its top side margin a centrally located arcuate cutout 104, into which puck 20 can be inserted, and a set of keys 106. In this embodiment, electrical contacts 78 on peripheral side margin 44 of puck 20 are positioned to align with electrical contacts 76 on open-ended inner side surface 74. Full-function keyboard 102 is especially suited for use with puck 20 configured for use in response to two-hand user operation as a personal digital assistant (PDA) or text messaging module.

Figure 7A:
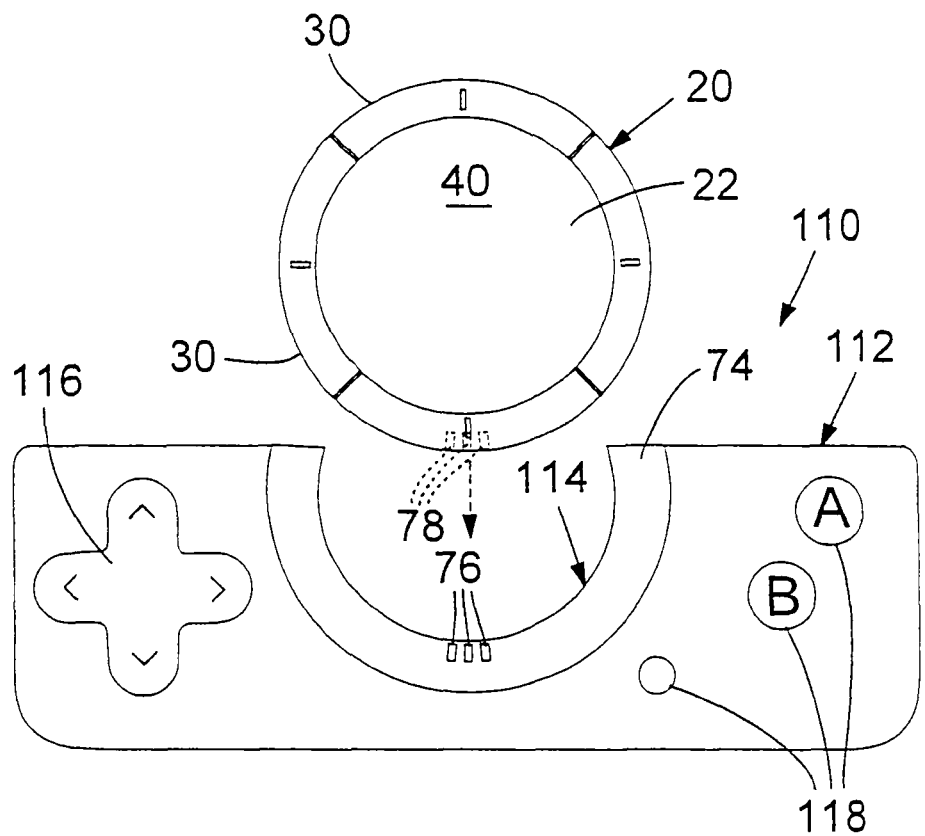
FIGS. 7A and 7B are top plan and perspective views of a modular multi-function communication device shown, respectively, partly exploded to illustrate a game pad input module configured for two-hand operation and with an arcuate, depthwise tapered opening sized to receive the information delivery module of FIGS. 1A-1D, and completely assembled and held by a user performing two-hand operation of joystick/navigation keys and gaming buttons.
Figure 7B:
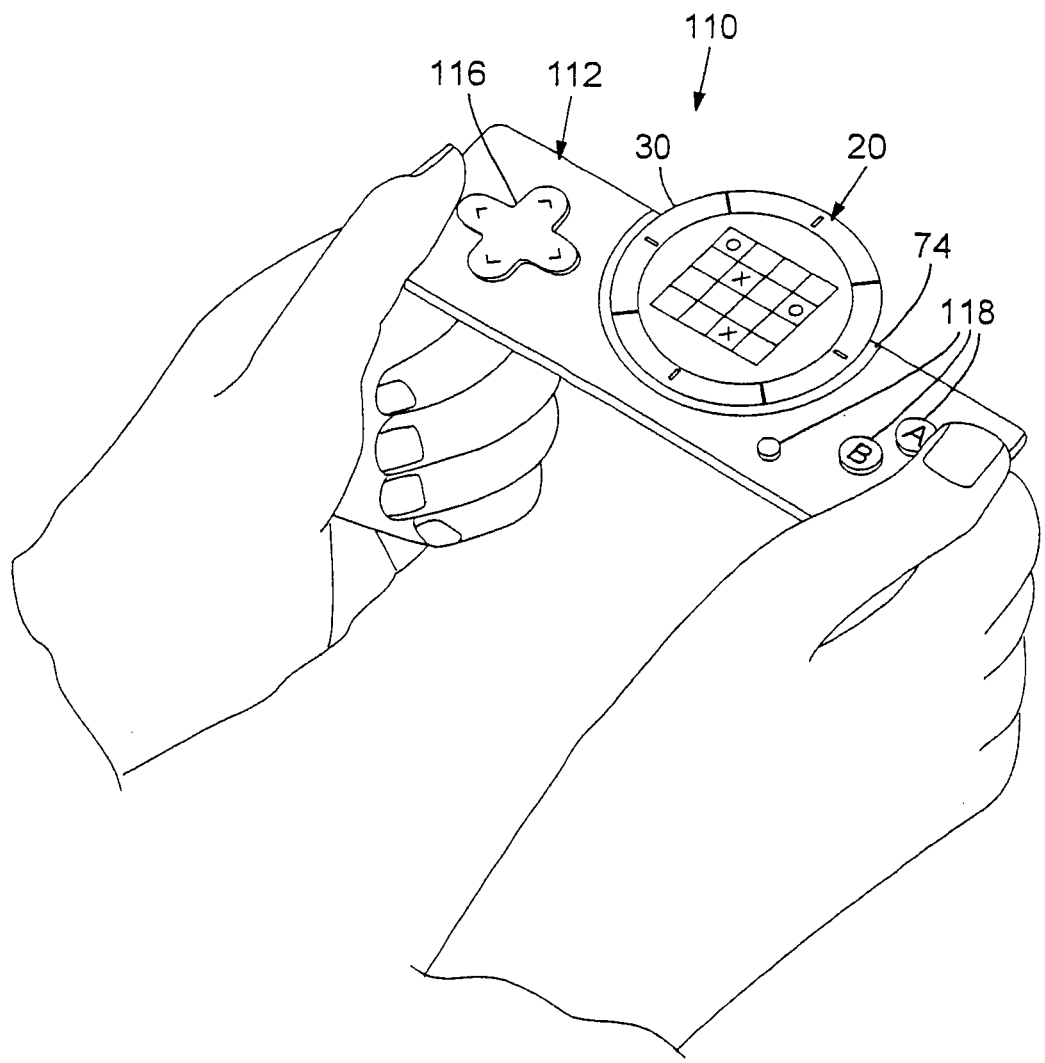

FIGS. 7A and 7B show a hand-held modular communication device 110 that includes a game pad module 112 having in its top side margin a centrally located arcuate cutout 114, into which puck 20 can be inserted, and two sets of game control actuators 116 and 118. Game control actuators 116 and 118 represent, respectively, joystick/navigation keys and gaming buttons. Game pad module 112 may also include a graphics chip and storage for video data. Communication device 110 is of similar construction to that of communication device 100 in that electrical contacts 78 on peripheral side margin 44 of puck 20 are positioned to align with electrical contacts 76 on open-ended inner side surface 74. Placement of puck 20 in game pad module 112 and programming of puck 20 causes communication device 110 to operate in a gaming mode. Puck 20 can be programmed to perform other functions, such as receive cellular telephone calls, while operating in gaming mode.

Figure 8A:
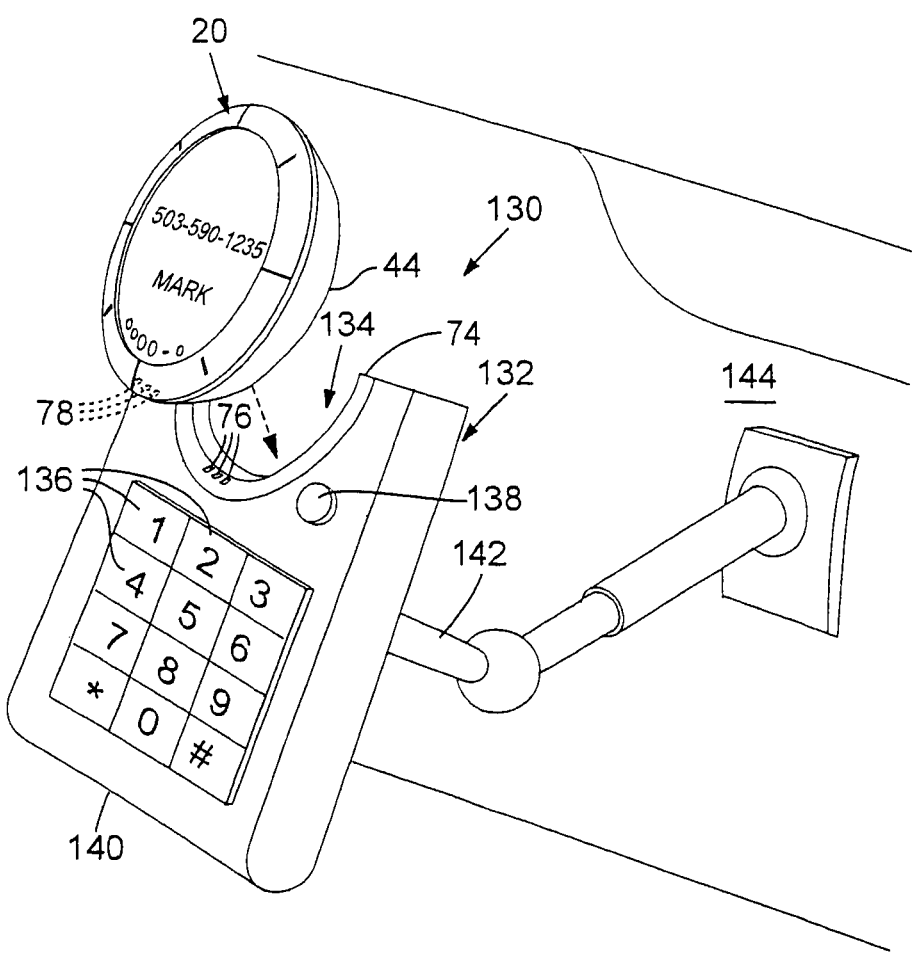
FIGS. 8A and 8B are perspective views of a modular multi-function communication device shown, respectively, partly exploded to illustrate a telephone input module embodied as a vehicle dock equipped with a speaker and configured with a circular, depthwise tapered opening sized to receive the information delivery module of FIGS. 1A-1D, and completely assembled and supported by an articulating attachment arm fixed to and extending from a vehicle dashboard.
Figure 8B:
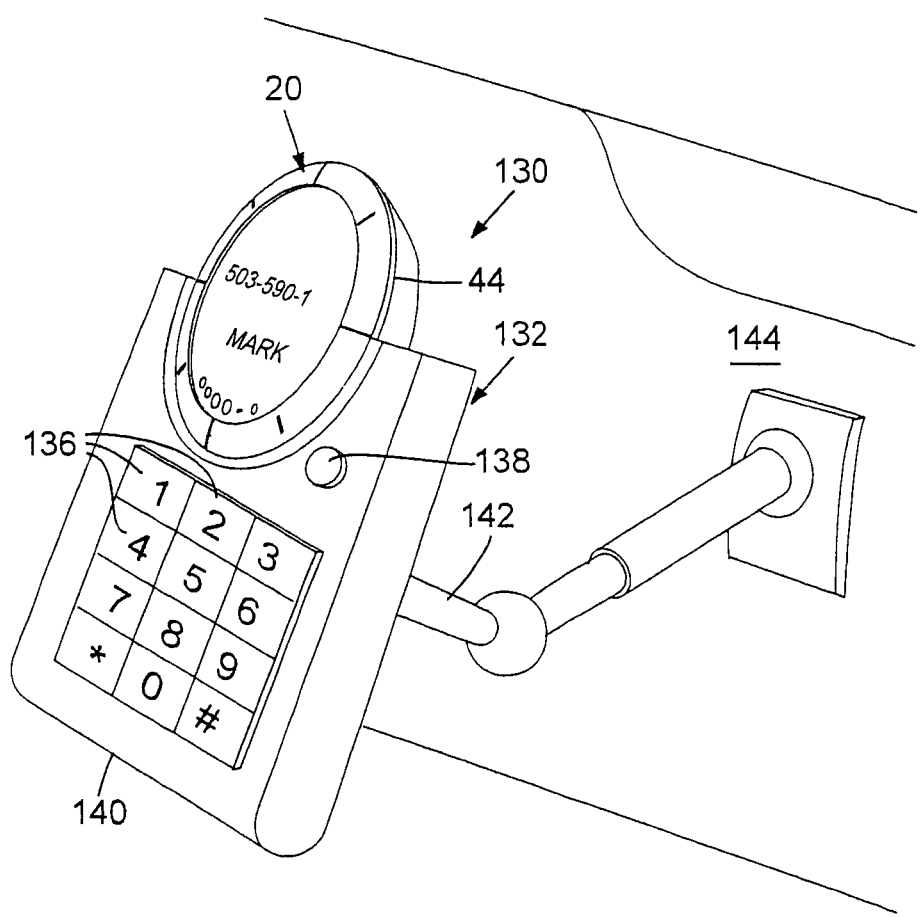

FIGS. 8A and 8B show a modular communication device 130 embodied as a vehicle dock input module 132 having in its top side margin a centrally located arcuate cutout 134 into which puck 20 can be inserted. Electrical contacts 78 on peripheral side margin 44 of puck 20 are positioned to align with electrical contacts 76 on open-ended inner side surface 74. Vehicle dock input module 132 includes a keypad composed of keys 136 and a separate pickup/hangup button 138, all of which are sufficiently large to accommodate easy activation and numeric entry by a user during vehicle operation. Vehicle dock input module 132 is equipped with a speaker 140 to permit hands-free operation upon initial placement or receipt of a telephone call. Vehicle dock input module 132 may also be implemented with GPS functionality and music transmission and storage capability. An articulating attachment arm 142 secured to the rear surface of vehicle dock input module 132 extends from and is fixed to a vehicle dashboard 144, such as that of an automobile, to allow user positioning of communication device 130. Vehicle dock input module 132 could also be installed into vehicle dashboard 144.

Figure 9C:
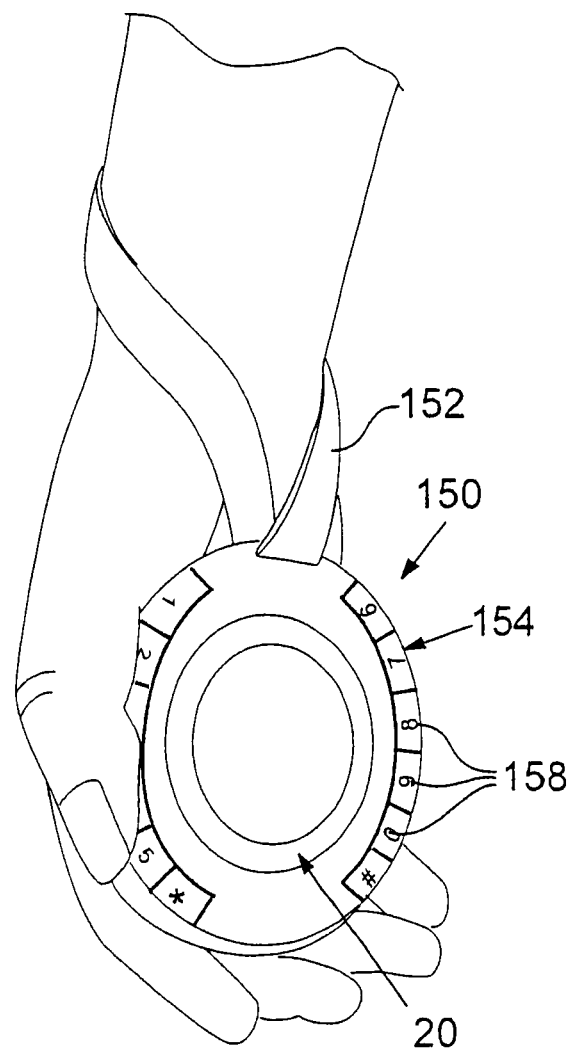

FIGS. 9A, 9B, and 9C show a hand-held modular communication device 150 configured as a medallion that is sized to fit in the palm of a user's hand and secured by a strap 152 around the user's wrist. An annular information input module 154 includes distributed around its periphery 156 individual numeric keypads 158 that are readily accessible to a user. Annular information input module 154 has a central circular aperture 160 into which puck 20 can be inserted so that electrical contacts 78 on peripheral side margin 44 of puck 20 are positioned to align with electrical contacts 76 on open-ended inner side surface 74. Modulator communication device 150 is especially suited for use as a cellular telephone.

Figure 10B:
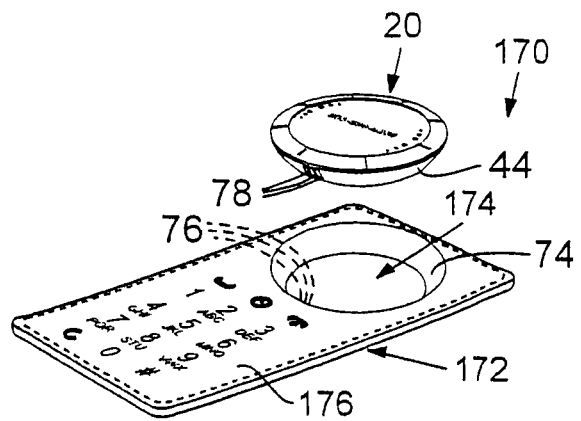
FIGS. 10A, 10B, and 10C are perspective views of the inside surface of a foldable modular multi-function communication device shown, respectively, completely assembled in an unfolded state, partly exploded in an unfolded state to illustrate a telephone input module embodied as a flexible keypad having a circular, depthwise tapered opening sized to receive the information delivery module of FIGS. 1A-1D, and partly closed in a direction to fold the inside surface on itself.
Figure 10A:
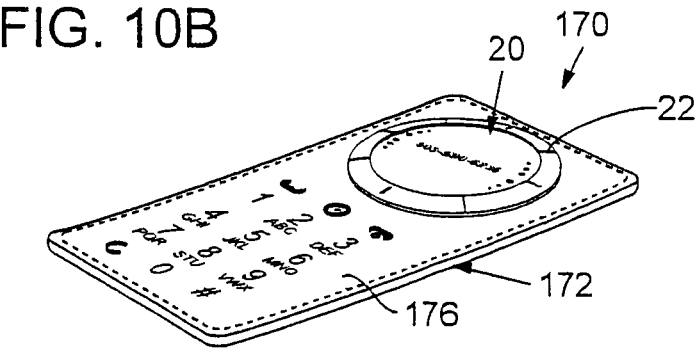
Figure 10C:
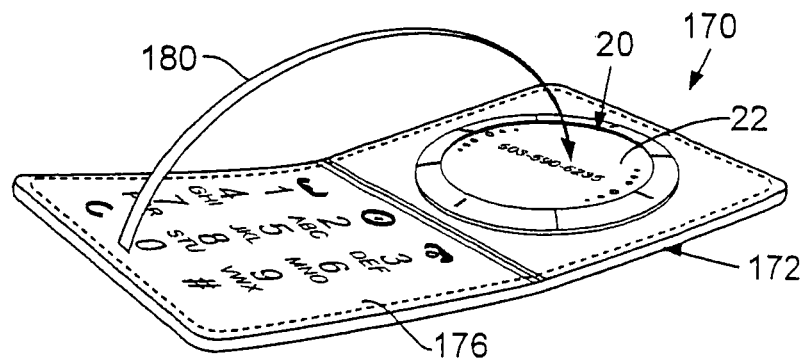
Figure 10D:
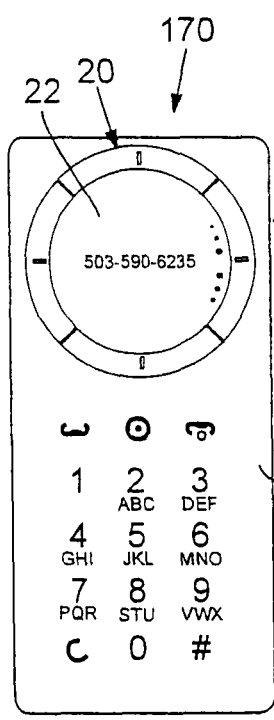
FIGS. 10D and 10E are respective inside surface and outside surface elevation views and FIG. 10F is a side profile elevation view of the modular multi-function communication device of FIGS. 10A-10C.
Figure 10E:
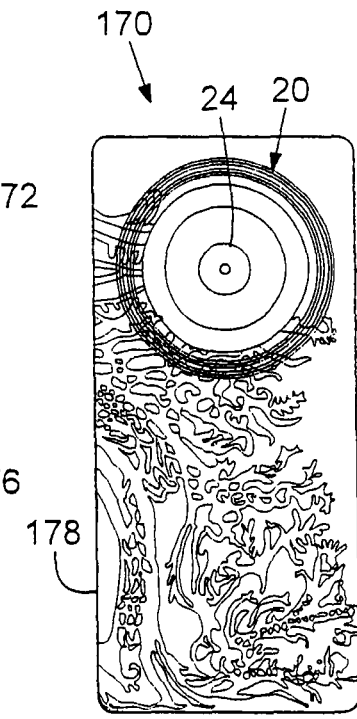
Figure 10F:
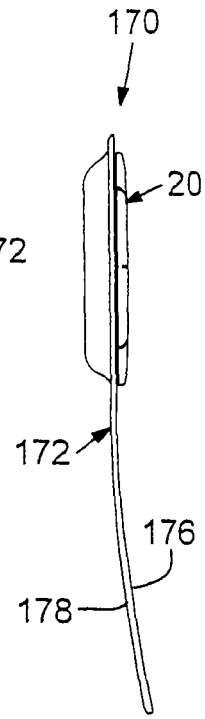

FIGS. 10A, 10B, 10C, 10D, 10E, 10F, 10G, and 10H show a modular communication device 170 that folds to the shape of a wallet and includes a keypad and input module 172 having a circular aperture 174 into which puck 20 can be installed. Input module 172 could also be of rectangular or square shape. Communication device 170 exhibits a display screen layout similar to that of FIG. 2A with puck 20 installed, but input module 172 is made of the same flexible, resilient electronic circuit board material as that of which wrist watch band 62 is made. Electrical contacts 78 on peripheral side margin 44 of puck 20 are positioned to align with electrical contacts 76 on inner side surface 74 of circular aperture 174, as shown in FIG. 10B. FIG. 10D shows display screen 22 of puck 20 and FIG. 10E shows image camera 24 of puck 20 on an inside surface 176 and an outside surface 178, respectively, of modular communication device 170.

Figure 10G:
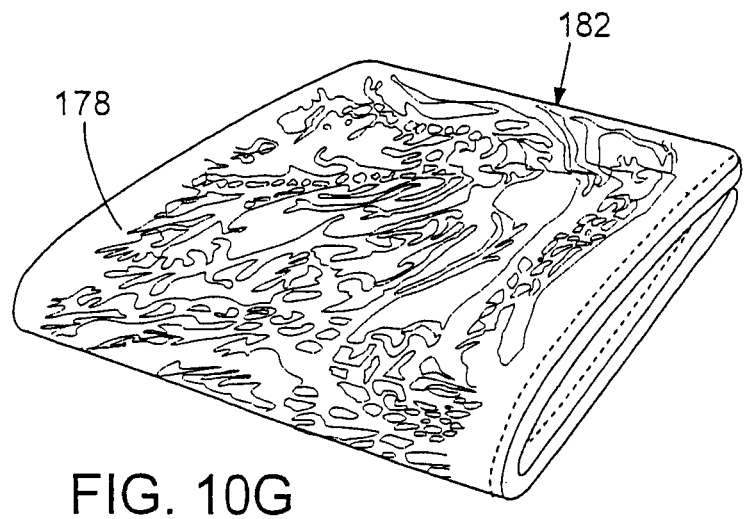
FIGS. 10G and 10H show, respectively, the design pattern and image camera portions of the outside surface of the modulator multi-function communication device of FIG. 10E completely closed with the inside surface completely folded on itself.
Figure 10H:
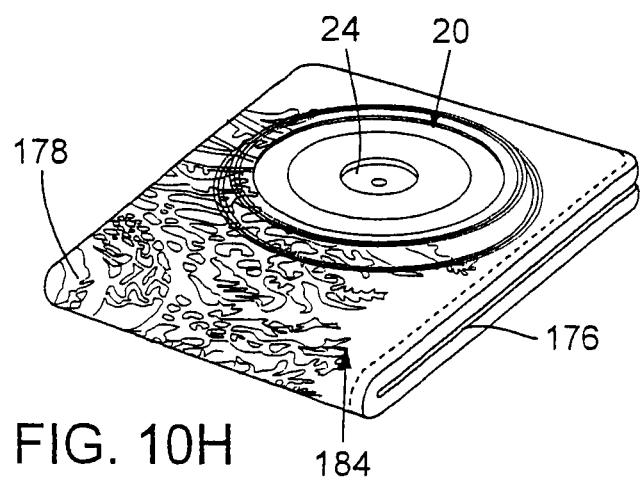

FIG. 10C shows a curved direction arrow 180 indicating the folding direction of input module 172 to completely close inside surface 176 on itself and thereby cause modular communication device 170 to appear as shown in FIGS. 10G and 10H. FIG. 10G shows a design pattern portion 182 of outside surface 178, and FIG. 10H shows an image camera portion 184 of outside surface 178.

Figure 11:
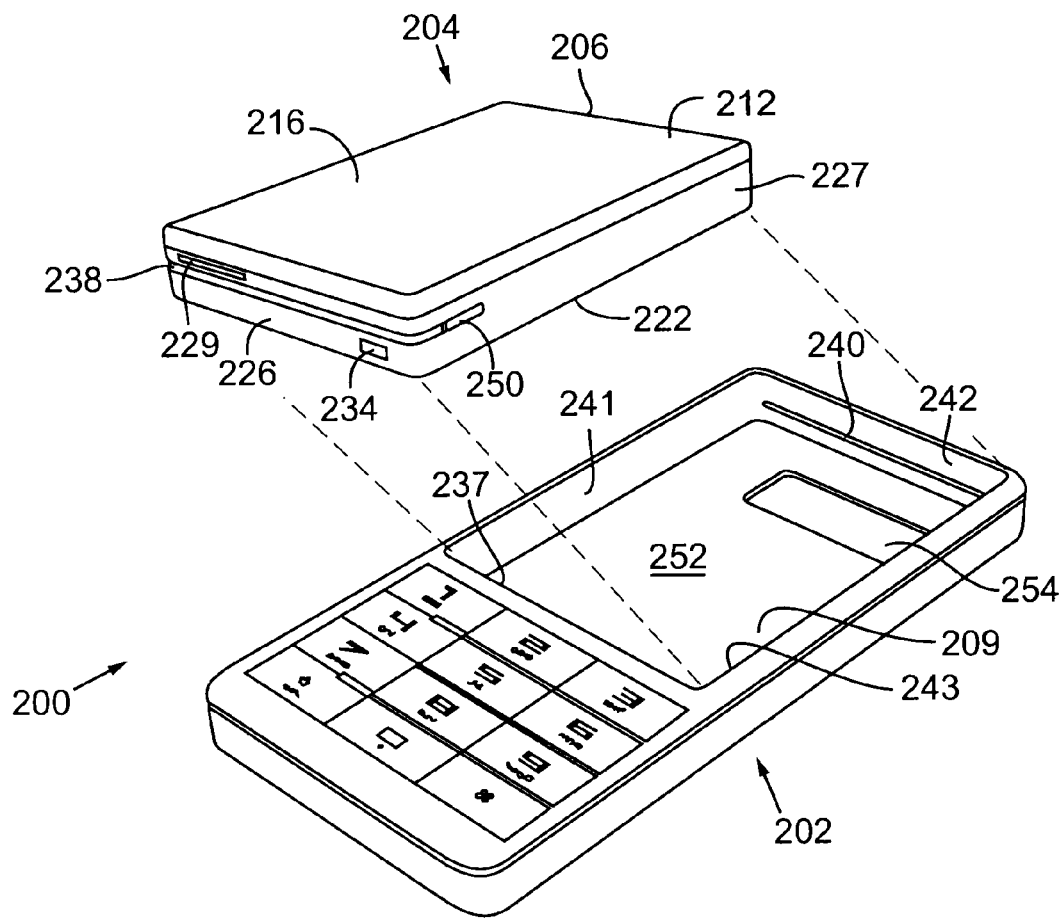
FIG. 11 is a perspective view of a modular multi-function communication device shown partly exploded to illustrate a mobile telephone keypad configured to receive an information delivery module of rectangular shape and implemented with touchscreen display technology.

FIG. 11 is a partly exploded perspective view of a hand-held modular communication device 200 that includes an information input module 202 with a numerical keypad and a puck 204 equipped with a cellular telephone, a flash camera, a microphone, and an audio speaker. FIG. 11 is shown partly exploded to illustrate, with reference also to FIGS. 12B and 12D (described below), the matability of puck 204 with information input module 202, which has a rectangular opening 209 that receives puck 204. Information input module 202 and puck 204 are each of rectangular shape. Puck 204 includes a peripheral side margin that is segmented into four side margins—a top side margin 206, a bottom side margin 226, a right side margin 227, and a left side margin 231 (shown in FIG. 12A). Opening 209 is defined by an inner boundary (provided by side walls 237, 241, 242, and 243) that is entirely closed and encompasses the peripheral side margin of puck 204. In other words, side walls 237, 241, 242, and 243 frame the peripheral side margin of puck 204 when it is placed in opening 209.

FIGS. 12A, 12B, 12C, and 12D show multiple views of puck 204 having a thin, rectangular body with generally planar opposite major surfaces. Puck 204 has near its top side margin 206 a cellular telephone antenna 208 and a Bluetooth short range radio link antenna 210. Puck 204 has on its front surface 212 a touchscreen display surface 216 that is implemented with capacitive touch sensing technology, such as TouchPad™ capacitive technology of Synaptics Inc., Santa Clara, Calif. For aesthetic and functional reasons, display surface 216 preferably occupies as much as possible of the area of front surface 212 of puck 204. Electronic circuitry, including signal control and processing circuitry and operational memory circuitry, contained within puck 204 enables cellular telephone operation in association with antenna 208 and an audio speaker 220 exposed in an opening in a back surface 222, near top side margin 206 of puck 204. A microphone 224 is placed at a bottom side margin 226 of puck 204. Display surface 216 and audio speaker 220 located on opposite surfaces 212 and 222, respectively, of puck 204 promote the cleanliness of display surface 216. Such placement of display surface 216 and audio speaker 220, as compared with a side-by-side arrangement of them along either front surface 212 or back surface 222, affords a reduction in overall length or width of puck 204. Reducing the length or width of puck 204 makes it more compact and thereby facilitates coverage by display surface 216 of as much as possible the area of front surface 212 of puck 204. The electronic circuitry of puck 204 provides operational function actuation areas on touchscreen display surface 216. The electronic circuitry is also capable of providing a keypad image on touchscreen display surface 216 to enable separate cellular telephone use from information input module 202, if desired. Puck 204 holds a SIM memory card 228 for storing telephone numbers and personal settings and a vibrating alarm 230 functioning as a silent telephone ringing device. SIM memory card 228 is positioned behind a battery 232 and is user-accessible from outside of puck 204 through a slot 229 in bottom side margin 226, and vibrating alarm 230 is positioned near top side margin 206. The presence of Bluetooth radio link antenna 210 enables use of a remote, user-worn microphone.

To accommodate placement in information input modules configured with different communication signal device locations, puck 204 is equipped with two sets of redundant, simultaneously operating infrared (IR) communication emitters and detectors, one of which sets associated with an IR link window 234 located in bottom side margin 226 of puck 204 and the other of which sets associated with an IR link window 236 in back surface 222 of puck 204. The redundant IR links ensure compatible communication links between puck 204 and different information input modules, because the shape and style of each of them can necessitate placement of the communication link window of an information input module in one of multiple established locations. In the case of information input module 202 of FIG. 11, IR link window 234 of puck 204 is spatially aligned with its corresponding IR link window in a bottom side wall 237 of opening 209 in information input module 202. In the case of an information input module that is configured to mate with puck 204 but leave open its bottom side margin 226, IR link window 236 on back surface 222 provides the communication link. Examples of a puck module in which a back surface IR link window would be spatially aligned with an IR link window on a flat surface region of an information input module include a jewelry piece and a wallet of the types shown in FIGS. 5A and 10A, respectively.

FIGS. 12B and 12D show shallow grooves 238 extending along the lengths of and located generally centrally in top side margin 206 and bottom side margin 226 of puck 204. Each of the grooves 238 supports on its bottom surface a linear electrical conductor. The electrical conductors supported in the two grooves 238 of each puck 204 preferably function as positive and negative electrodes for delivery of electrical power to puck 204. Electrical power is delivered to puck 204 by electrically conductive rods 240 (only one shown) fitted along opposite side walls 237 and 242 of opening 209 in information input module 202. Rods 240 are positioned on side walls 237 and 242 of opening 209 to provide a positive, releasable snap fit into their corresponding grooves 238 of puck 204 when it is mated with information input module 202. In this configuration, information input module 202 functions as a battery charger or a conduit for charging current for battery 232 in puck 204. Rods 240 may also be adapted to function as an alternative data and control communication link between puck 204 and information input module 202. Rod 240 positioned along side wall 237 is configured to move relative to side wall 237 in a direction transverse to the face of side wall 237. Rod 240 moves relative to side wall 237 in response to an urging force applied to it from bottom side margin 226 of puck 204 when puck 204 is being placed in opening 209. For example, rod 240 positioned along side wall 237 may be spring-biased (i.e., spring-loaded) or may be designed to inherently have some give. Rod 240 positioned along side wall 237 is resilient such that, when it and its corresponding groove 238 are spatially aligned, rod 240 snaps into groove 238. Rod 240 positioned along side wall 242 may also be configured to move relative to side wall 242 or may be stationary relative to side wall 242.

FIG. 12C shows a camera 246 and its associated flash assembly 248 housed in locations for operation through corresponding openings in back surface 222 of puck 204.

A recessed on-off button 250 in puck 204 makes it compatible with the matable connection in opening 209 of information input module 202. Information input module 202 has a floor 252 with an opening 254 for one or both of passage of sound emissions from audio speaker 220 and image acquisition by camera 246 and its associated flash assembly 248. Skilled persons will appreciate that pod 204 can perform certain functions separately from information input module 202. For example, if puck 204 is programmed such that touchscreen display surface 216 presents an operational dial touchpad, certain mobile telephone functions can be performed by puck 204 apart from information input device 202. There are many possible operational functions and design configurations, as indicated by the exemplary embodiments described.

Figure 13:
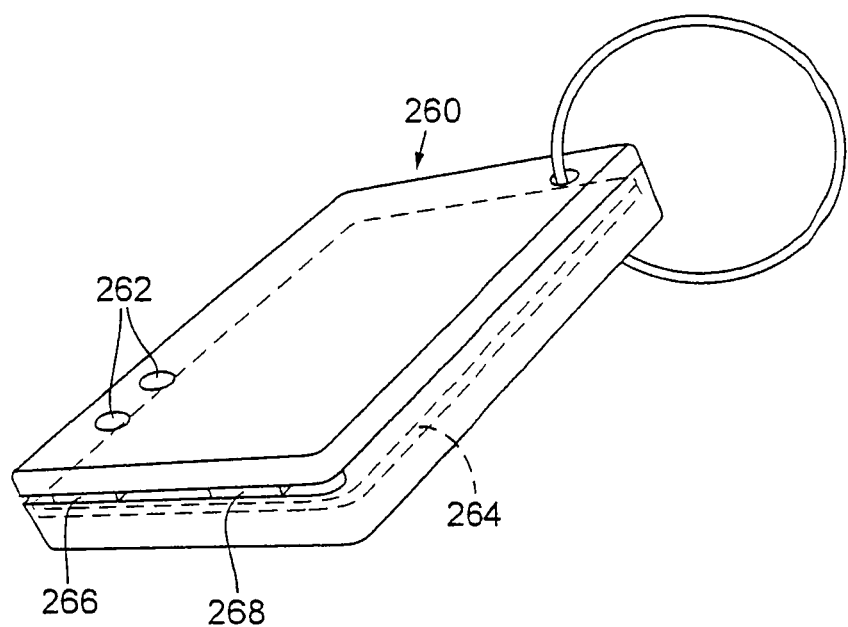
FIG. 13 is a perspective view of a key-fob that cooperates with the information delivery module of FIGS. 12A-12D to provide it with a loss prevention feature.

Bluetooth radio link antenna 210 also enables implementation of a loss prevention feature in puck 204. The electronic circuitry of puck 204 transmits a continuous signal that is received by a Bluetooth radio link enabled key-fob 260 attached to a user's keychain, purse, pocket, or other personal item. FIG. 13 is a simplified block diagram of key-fob 260, which is a battery-operated device equipped with one or more light emitting diodes (LEDs) 262, functioning as a visual indicator, and an audible alarm. Electrical circuitry 264 allows a user to turn on or off electrical power to key-fob 260, adjust a distance control 266 to select the strength of the Bluetooth signal to correspond to a set threshold distance from puck 204, and adjust a volume control 268 to select the audible tone volume. (Adjustments of signal strength and tone volume may also be performed at puck 204.) Whenever the distance between key-fob 260 and puck 204 (either alone or mated with information input module 202) exceeds the user-set threshold distance, key-fob 260 generates one or both of an audible tone with the alarm or a visual signal with LEDs 262. In an alternative embodiment of the prevention feature, the electronic circuitry can be placed in key-fob 260 causing transmission of a continuous signal that is received by a Bluetooth radio link enabled puck 204.

Figure 14:
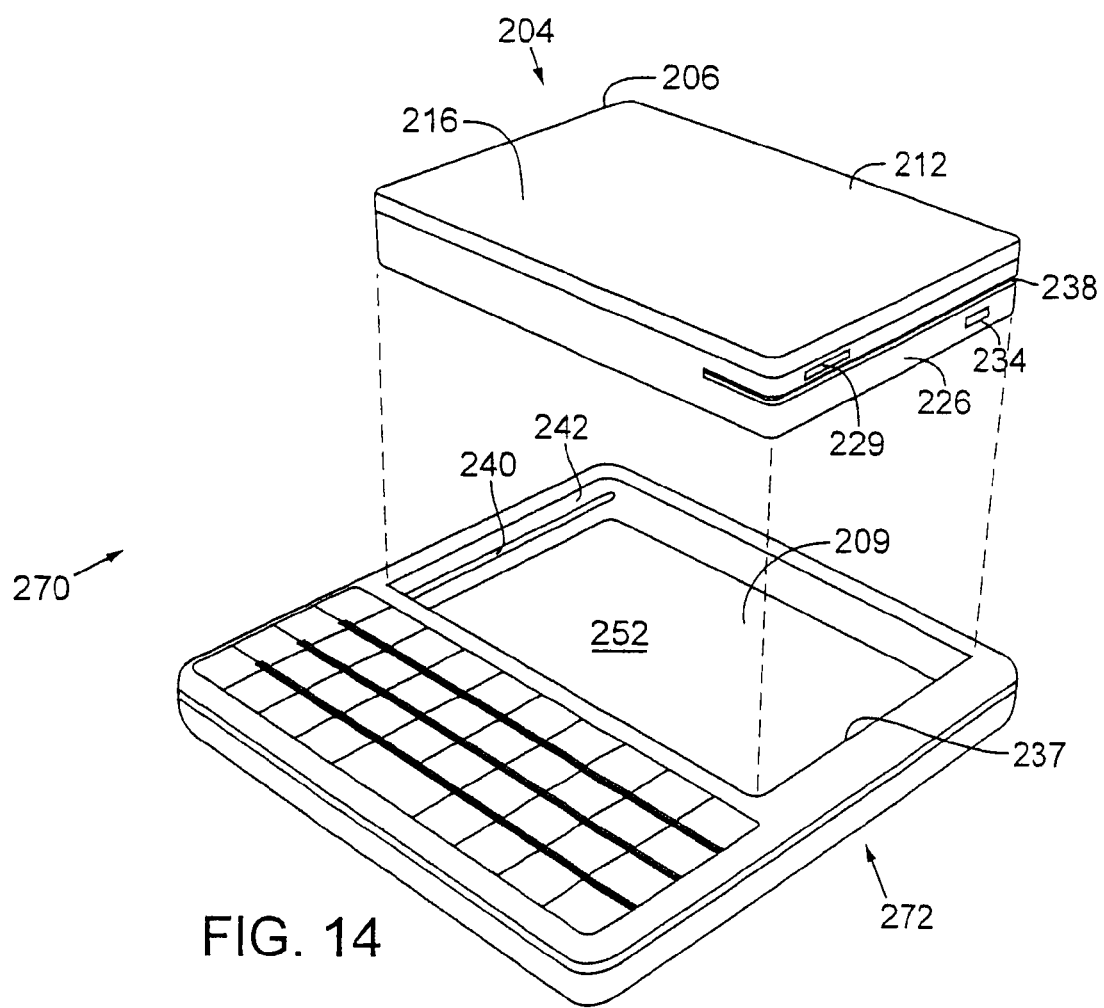
FIG. 14 is a perspective view of a modular multi-function communication device shown partly exploded to illustrate a personal digital assistant (PDA) configured to receive the information delivery module of FIGS. 12A-12D.

FIG. 14 is a partly exploded perspective view of a handheld modular communication device 270 that includes an information input module 272 with an alphanumeric keypad and puck 204 programmed to operate as a PDA. Information input module 272 has its opening 209 sized to receive puck 204 by a snap fit into grooves 238 and deliver electrical power and data and control information to puck 204 by electrically conductive rods 240. To accommodate placement in information input modules of different orientations (e.g., portrait orientation, landscape orientation), the electronic circuitry of puck 204 is implemented with image display control including image rotation to provide portrait or landscape image presentation. Such image rotation enables puck 204 to display information with its longer dimension in the vertical direction (e.g., FIG. 11) and with its longer dimension in the horizontal direction (e.g., FIG. 14), as dictated by nominal usage of the information input module with which puck 204 is mated. A signal delivered from the IR link window in bottom side wall 237 of information input module 272 to IR link window 234 of puck 204 provides an image rotation command that sets the image orientation. This function may also be accomplished by way of electrically conductive rods 240.

Figure 15:
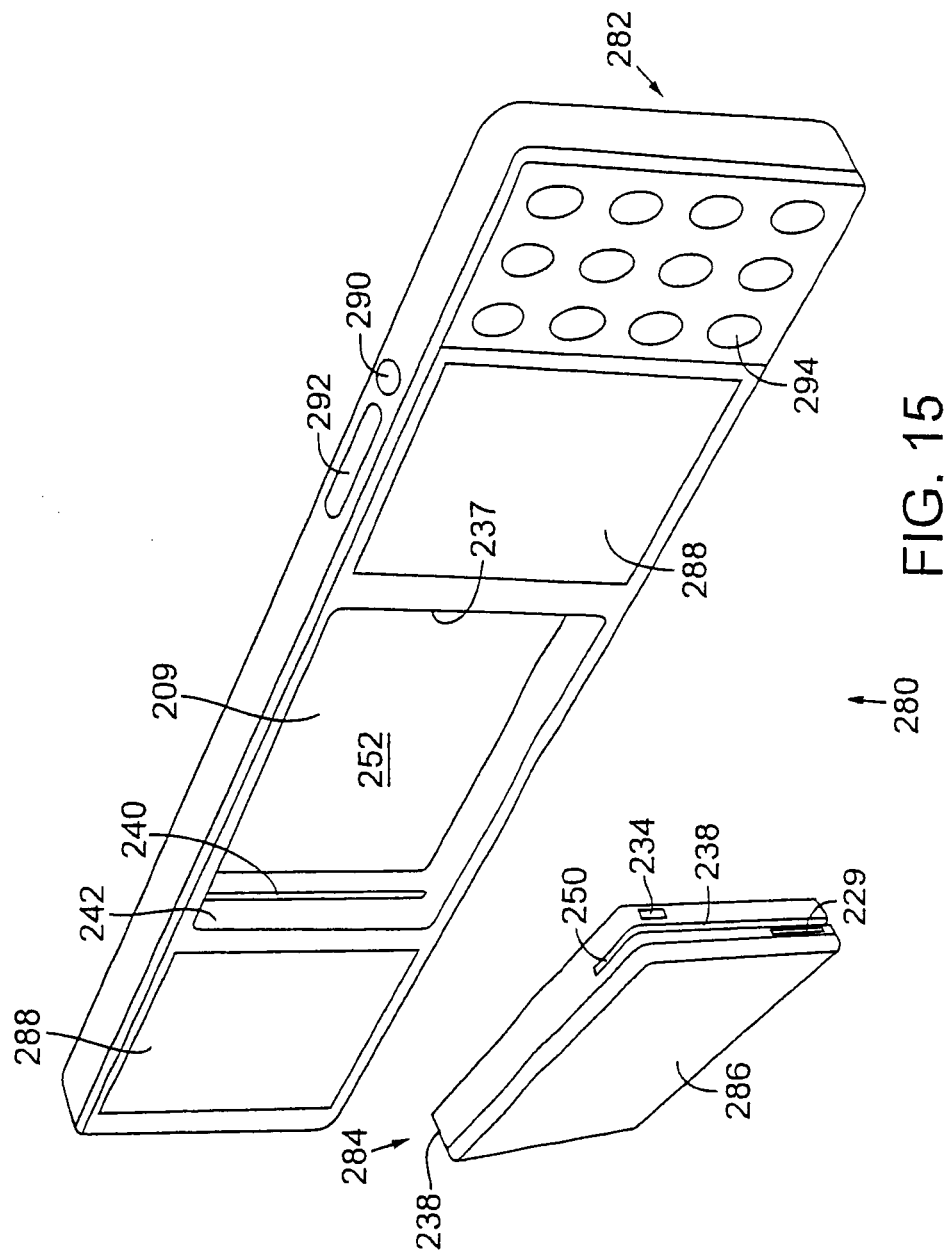
FIG. 15 is a perspective view of a modular multi-function communication device shown partly exploded to illustrate a multi-purpose audio player configured to receive an information delivery module of a type similar to that of FIGS. 12A-12D.

FIG. 15 is a partly exploded perspective view of a handheld modular communication device 280 that functions as a multi-purpose audio player. Audio player 280 includes an information input module 282 that is adapted to receive a puck 284 of the same size and shape as that of puck 204 with a touchscreen display surface 286 and configured to operate as a mobile telephone or a music player. Information input module 282 has its opening 209 sized to receive puck 284 by a snap fit into grooves 238 and deliver data and control information and electrical power to puck 284 by electrically conductive rods 240. Puck 284 includes electronic circuitry producing audio signals that are transmitted through a suitable communication link to information input module 282, which houses audio speakers 288. A user touches touchscreen display surface 286 for music selection and actuation of other user-performed operational controls. Information input module 282 includes certain user-controlled command inputs, such as, for example, an electrical power switch 290, a volume control 292, and a digital touchpad 294 to enable operation of communication device 280 as a speaker phone.

Figure 16:
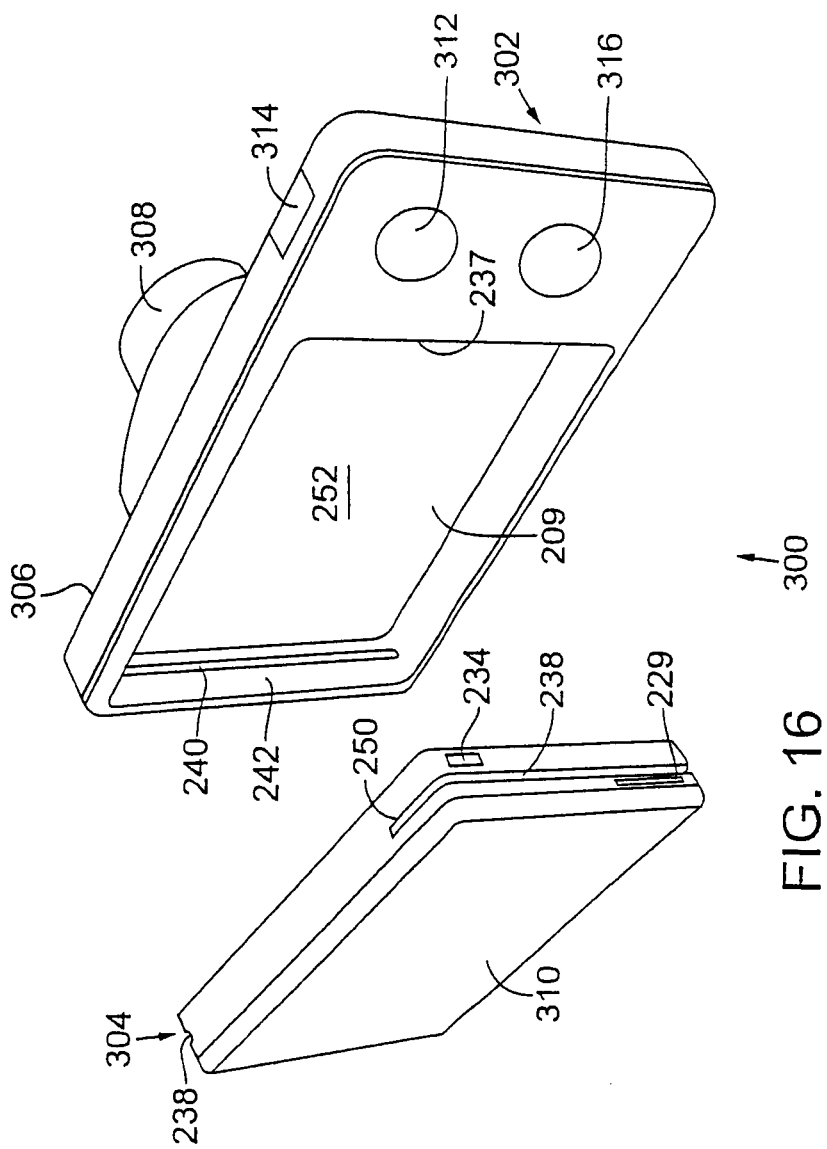
FIG. 16 is a perspective view of a modular multi-function communication device shown partly exploded to illustrate an image camera with image transmission capability and configured to receive an information delivery module of a type similar to that of FIGS. 12A-12D.

FIG. 16 is a partly exploded perspective view of a handheld modular communication device 300 that functions as an image camera with acquired image transmission capability. Communication device 300 includes an information input module 302 that is adapted to receive a puck 304 of the same length and width dimensions as those of puck 204. Information input module 302 has fitted to its back surface 306 a lens assembly 308, and puck 304 is configured to operate as a digital camera presenting on its display surface 310 an image to be acquired and stored. Information input module 302 has its opening 209 sized to receive puck 304 by a snap fit into grooves 238 and deliver electrical power to puck 304 by electrically conductive rods 240 as described above. Information input module 302 includes certain user-controlled command inputs, such as, for example, an electrical power switch 312, camera shutter actuator 314, and lens adjustment control 316. IR link window 234 of puck 304 is spatially aligned with a corresponding IR link window of information input module 302 to deliver the user-controlled commands to puck 304 and deliver the acquired image data to information input module 302 for storage or transmission elsewhere. The delivery of the commands and acquired image data may also be accomplished by way of electrically conductive rods 240.

Figure 17:
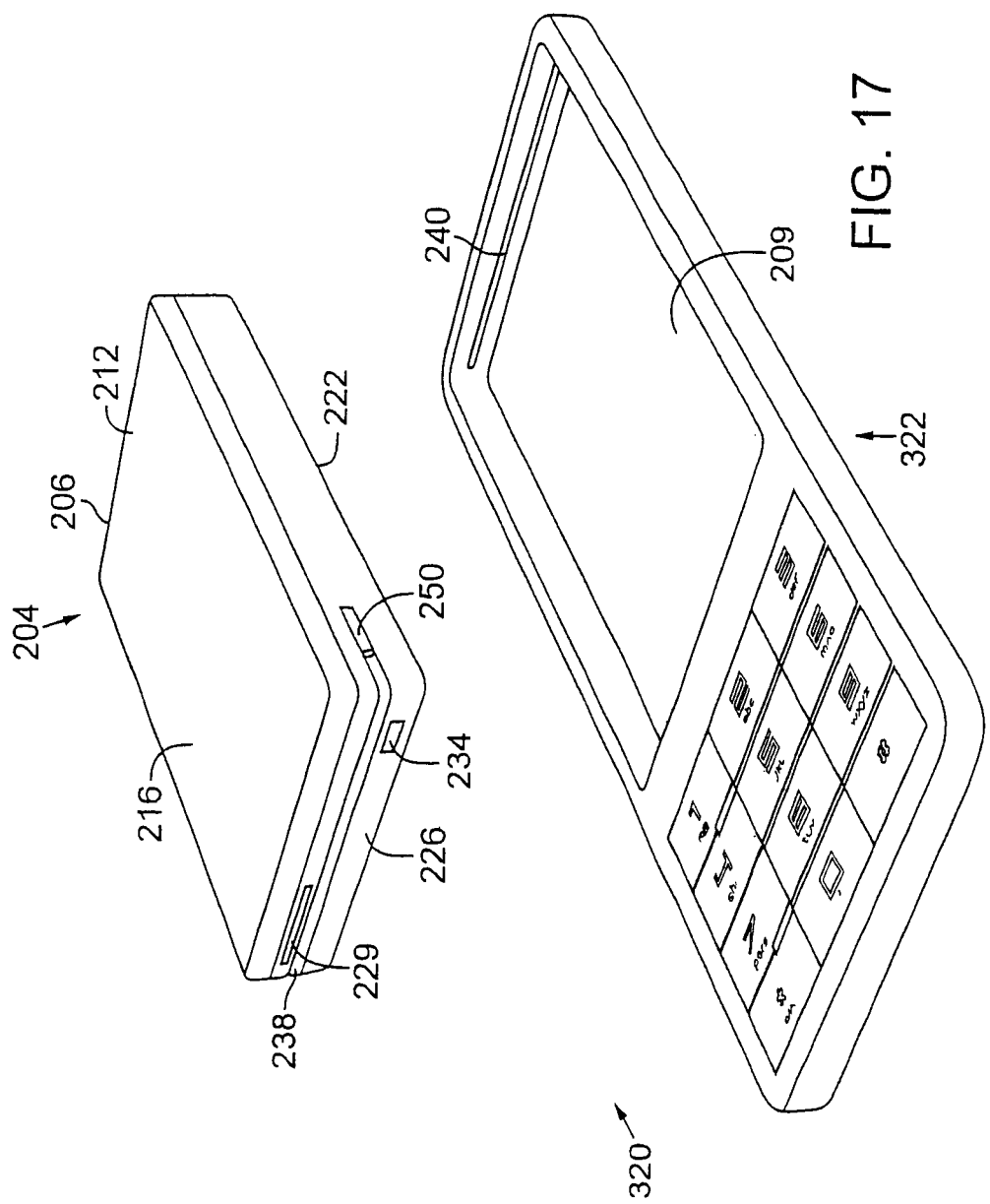
FIG. 17 is a perspective view of a modular multi-function communication device shown partly exploded to illustrate an ultra-thin mobile telephone keypad configured to receive the information delivery module of FIGS. 12A-12D.

FIG. 17 is a partly exploded perspective view of a modular communication device 320 in which puck 204 configured to function as described with reference to FIG. 11 is mated with an ultra-thin information input module 322 in the form of a keypad. Ultra-thin keypad 322 can be made of transparent, translucent, or opaque material to customize its appearance. Although it is about one-half the thickness of puck 204, ultra-thin keypad 322 has its opening 209 sized to receive puck 204 by a snap fit into grooves 238 and deliver data and control information and electrical power to puck 204 by electrically conductive rods 240. There is no floor closing the bottom portion of opening 209. Keypad 322 holds puck 204 such that its front surface 212 and back surface 222 extend beyond the major surfaces of keypad 322 to provide user access to the functions on both the front and back of puck 204.

Figure 18:
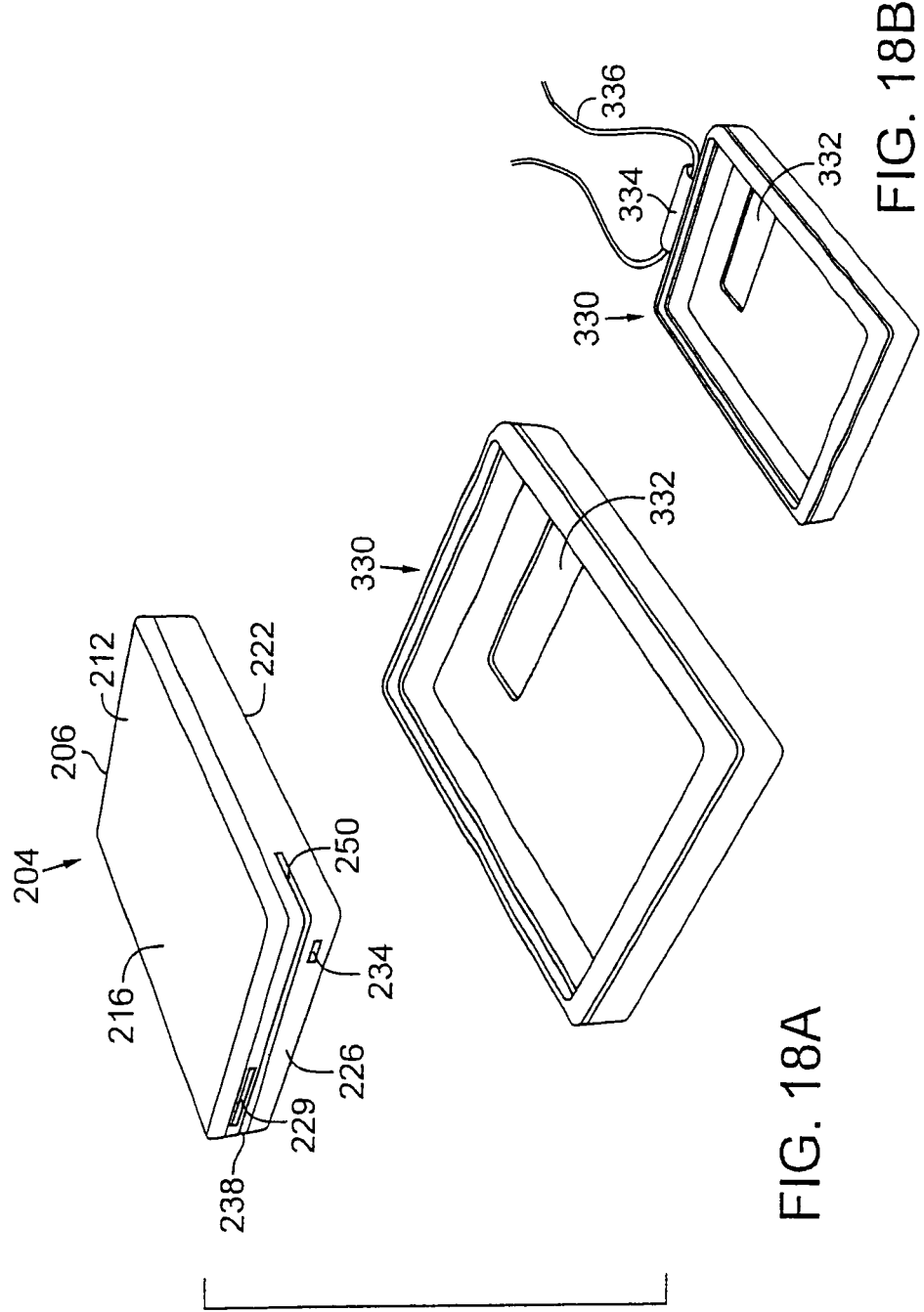
FIGS. 18A and 18B are perspective views of an accent cover for the information delivery module of FIG. 11 shown, respectively, partly exploded to illustrate how the accent cover fits over the back surface and side margins of the information delivery module and separately to illustrate the accent cover fitted with an open loop through which a cord is laced to enable a user to wear the information delivery module as a custom-styled fashion accessory.

FIG. 18A is a partly exploded perspective view of puck 204 and an accent cover 330 made of fabric or other material to illustrate another opportunity to customize the appearance of puck 204, when it is used separately from an information input module. Accent cover 330 is in the form of a shallow, open-top container in which puck 204 is inserted with its four side margins and back surface 222 covered, except for an opening 332 for passage of sound emissions from audio speaker 220 and image acquisition by camera 246 and its associated flash assembly 248. FIG. 18B shows accent cover 330 fitted with a loop 334 of open ring or elastomeric type that receives a cord 336 a user can place around his or her neck to wear pod 204 as a custom-styled fashion accessory.

Figure 21:
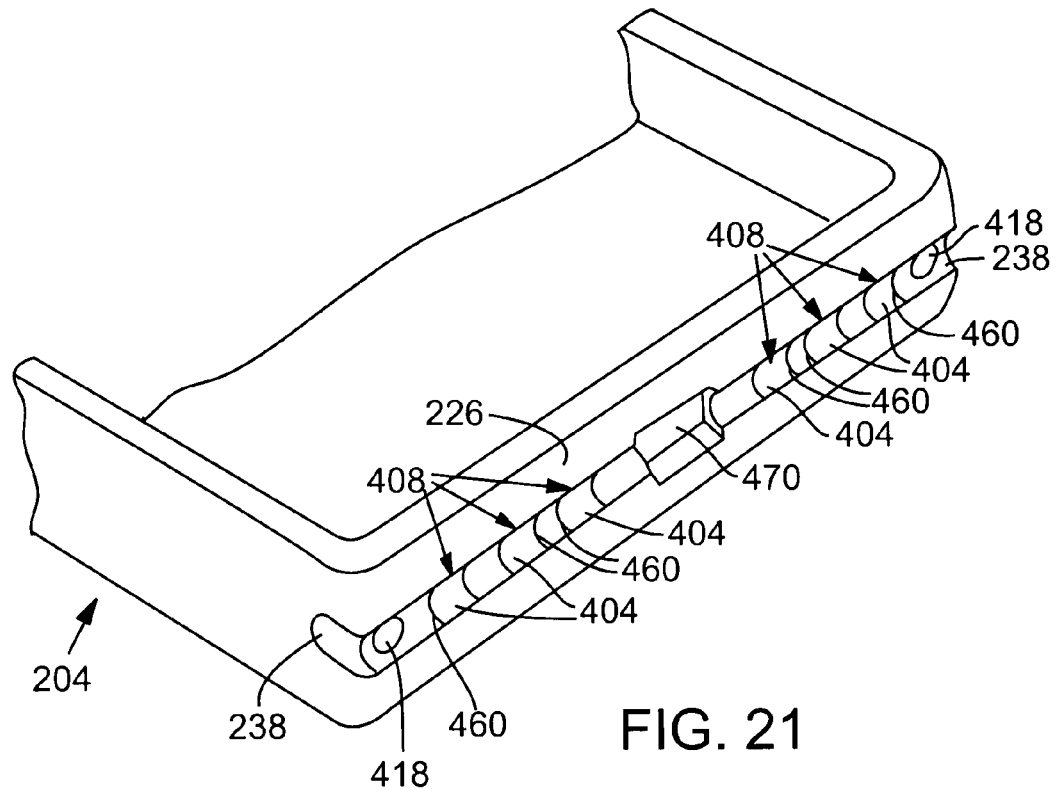

FIGS. 19, 20, 21, 22, 23, and 24 show, as an alternative to rods 240 of information input module 202, segmented, spring-biased electrical contact sets 400 that provide a data and control communication link and electrical power to puck 204. Contact sets 400 also provide a positive, releasable snap fit into corresponding grooves 238 of puck 204 when it is mated with information input module 202. FIG. 19 is a cross-sectional view of information input module 202 and puck 204 shown in the confronting relationship they assume when mated together. FIG. 19 shows the complementary shapes of contact surfaces 402 and 404 of one spatially aligned pair of, respectively, an electrical contact member 406 of information input module 202 and an electrical contact member 408 of puck 204. (Contact surfaces 402 and 404 are spaced apart (i.e., noncontacting) in FIG. 19 for purposes of clarity only.) FIGS. 20 and 21 are fragmentary isometric views of, respectively, information input module 202 and puck 204 showing that each contact set 400 includes six inherently spring-biased contact members 406 and each groove 238 includes six concave contact members 408. Contact surfaces 402 and 404 of their respective contact members 406 and 408 are of complementary shapes. Contact members 406 and 408 are mutually spaced apart along, respectively, sidewall 237 and groove 238 so that contact surfaces 402 and 404 of corresponding pairs of contacts 406 and 408 are spatially aligned and achieve a conformal fit when information input module 202 and puck 204 are snap fit together. Contact members 406 and 408 preferably carry standard USB (universal serial bus) signals.

A recessed slider switch 410 (only one shown in FIG. 20) positioned in each side surface of information input module 202 has an inwardly extending tab portion 412 (FIG. 19) to which a locking pin 414 is mounted to slide through an aperture 416 in side wall 237. Bidirectional movement of slider switch 410 along the length of information input module 202 pushes locking pin 414 into and out of opening 209. Puck 204 is provided with locking holes 418 in the groove 238 facing side wall 237 of information input module 202 when puck 204 and information input module 202 are mated together. Locking holes 418 are located near the ends of groove 238 and positioned in axial alignment with locking pins 414 so that slider switches 410 push locking pins 414 into their respective aligned locking holes 418 when information input module 202 and puck 204 are mated together. Locking pins 414 fitted into locking holes 418 ensure that puck 204 does not inadvertently pop out of opening 209 of information input module 202 in the event of a user dropping or other imposition of mechanical shock to the assembly.

With reference to FIGS. 19 and 20, information input module 202 includes first and second housing sections 420 and 422 that when assembled provide an interior space 424 in which a printed circuit board 426 is housed. Circuit board 426 is used to receive keypad or other information input signals depending on the functionality specified. Contact member 406 is secured to circuit board 426 at its side margin 428 in a manner described in detail below such that a finger portion 430 on which contact surface 402 is located extends through an aperture 432 in sidewall 237 and into opening 209 of information input module 202. FIG. 20 shows that contact members 406 of electrical contacts 400 are arranged in two subsets of three contact members 406 each that project through different ones of two apertures 432 in sidewall 237. Apertures 432 are spaced apart in sidewall 237 by a distance that would accommodate placement of a standard miniature USB connector as an auxiliary data and control link.

Figure 22:
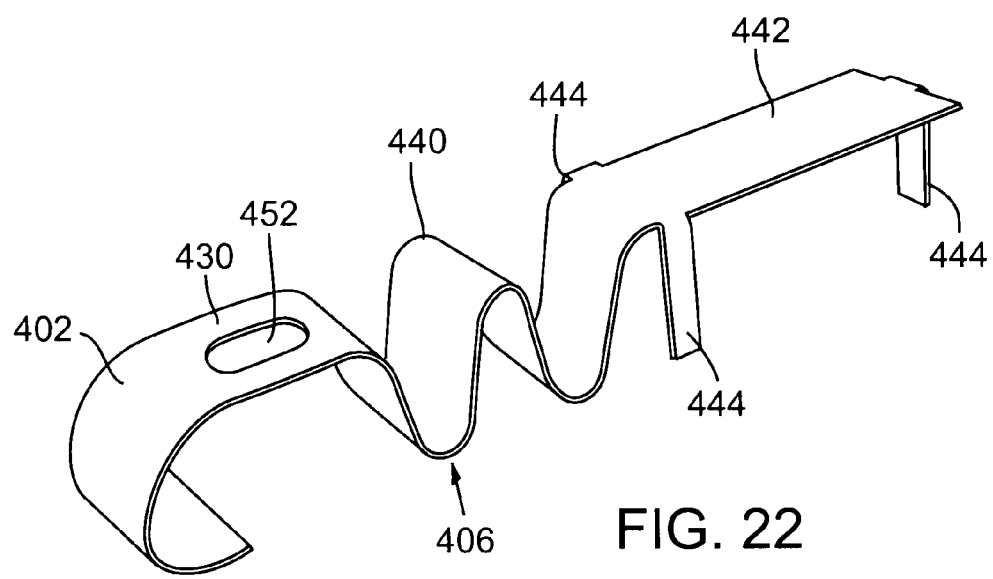
FIG. 22 is an enlarged isometric view of one of the spring-biased contact members of FIG. 20.
Figure 23:
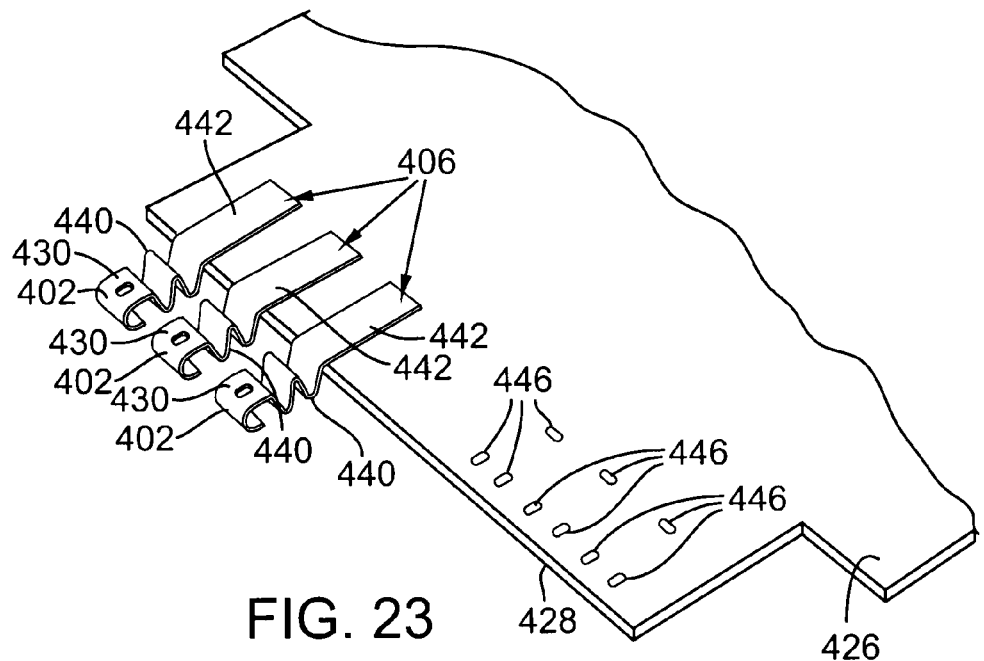
FIG. 23 is a fragmentary isometric view of the contact members of FIG. 20.

FIG. 22 is an enlarged isometric view of one of spring-biased contact members 406, and FIG. 23 is a fragmentary isometric view of three contact members 406 mounted to printed circuit board 426 at its side margin 428. Circuit board 426 set in interior space 424 is rigidly secured to housing section 422 of information input module 202.

With reference to FIGS. 19, 22, and 23, each contact member 406 is a unitary article, preferably made of copper alloy, such as phosphor bronze or beryllium copper, plated with gold over a barrier metal, such as one or both of nickel and palladium. Each contact member 406 is formed in three portions, including finger portion 430, a spring portion 440, and a surface mount portion 442. Surface mount portion 442 has three legs 444 that pass through aligned holes 446 in circuit board 426 and are secured in place by solder joints 448. Because circuit board 426 is secured in place in interior space 424, finger portion 430 is urged inwardly toward interior space 424 in response to contact with contact member 408 when information input module 202 and puck 204 are mated together. Spring portion 440 biases finger portion 430 to apply compression force between contact surfaces 402 and 404 under this condition. A boss 450 depending downwardly from housing section 420 extends through a slot 452 in finger portion 430 to prevent lateral motion of finger portion 430 and limit its travel distance in extension and contraction when puck 204 is, respectively, not mated to and mated to information input module 202.

Figure 24:
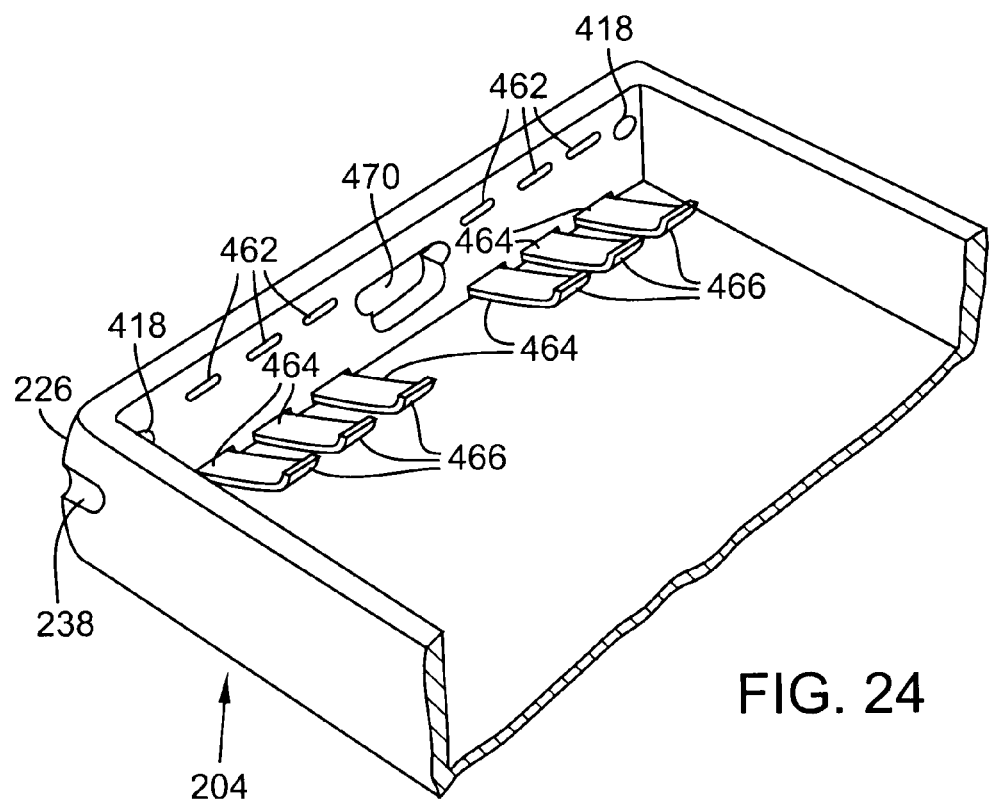
FIG. 24 is a fragmentary isometric view of the interior of the puck of FIG. 19, showing the end portions of the contact members fitted in a groove in the bottom side margin of the puck.

FIG. 24 is a fragmentary isometric view of the interior of puck 204 showing the end portions of contact members 408 fitted in groove 238 in bottom side margin 226. With reference to FIGS. 19, 21, and 24, each contact member 408 is a unitary article made of the material described for contact members 406 and formed in three portions, including a concave contact portion 460 positioned between mounting tab portions 462 and 464 that fit into side margin 226. Mounting tab portion 464 extends through side margin 226 such that a distal end 466 of tab portion 464 forms a spring finger that makes electrical contact with an electrical conductor on the bottom surface of a printed circuit board 468 housed in puck 204. Mounting tab portion 464 is depicted in FIG. 19 in solid and phantom lines to show by a comparative relationship the resilience of distal end 466 when circuit board 468 is, respectively, mounted in (solid lines) and absent from (phantom lines) puck 204.

Contact members 408 are preferably insert molded into groove 238 of side margin 226 to facilitate a possible hermetic seal around the terminal ends of groove 238. An aperture 470 sized and configured to receive a miniature USB connector is formed in side margin 226 to provide puck 204 with "backward capability," i.e., electrical charging as well as other available stand alone operational capability in the absence of information input module 202.

FIG. 25 is a partly exploded perspective view of a hand-held modular communication device 500 of a type similar to that of modular communication device 200, except the former includes an information input module 502 made of elastomeric material that provides a hermetically sealed environment for an embedded numerical keypad 504 and a sealed container for puck 204 when it is installed. FIG. 26A is a sectional view of information input module 502 taken along lines 26A-26A of FIG. 25, showing puck 204 in position for insertion into a rectangular opening 509 that includes a rod 540 positioned on side wall 542 to provide a positive snap fit for puck 204 in information input module 502. Puck 204 has in bottom side margin 226 a connector 256 for use as, for example, an earpiece jack in stand alone operation of puck 204. Segmented, spring-biased electrical contact set 400 shown in FIGS. 19-24 may be implemented in side margin 537 to electrically connect information input module 502 and puck 204 at its bottom side margin 226. FIG. 26B is an enlarged fragmentary cross-sectional view of a portion of information input module 502 holding puck 204 in place against a floor 552 and in sealing relationship within information input module 502. Floor 552 includes a depression 554 that is spatially aligned with audio speaker 220 of puck 204 when it is installed in information input module 502.

With reference to FIGS. 25, 26A, and 26B, a preferred elastomeric material for information input module 502 includes silicone rubber or urethane. The elastomeric material covers numerical keypad 504 in its entirety and thereby embeds it within information input module 502. The elastomeric material also provides a hermetic seal around a connector 560 (e.g., an earpiece jack), which when not in use can be plugged with a cap (not shown) to prevent moisture infiltration into information input module 502. A pliable overlap ridge or lip seal 562 extending inwardly and around a rectangular opening 564 at the top surface of information input module 502 contacts the perimeter of display surface 216 to secure and seal puck 204 upon its mating with information input module 502. Only display surface 216 of puck 204 is exposed after mating. A thin or insert molded section 566 of depression 554 in floor 552 in a location corresponding to that of aperture 254 of modular communication device 200 allows transmission of sound emissions from audio speaker 220 of puck 204 to a user's ear while ensuring that the hermetic seal remains intact around puck 204.

Figure 27:
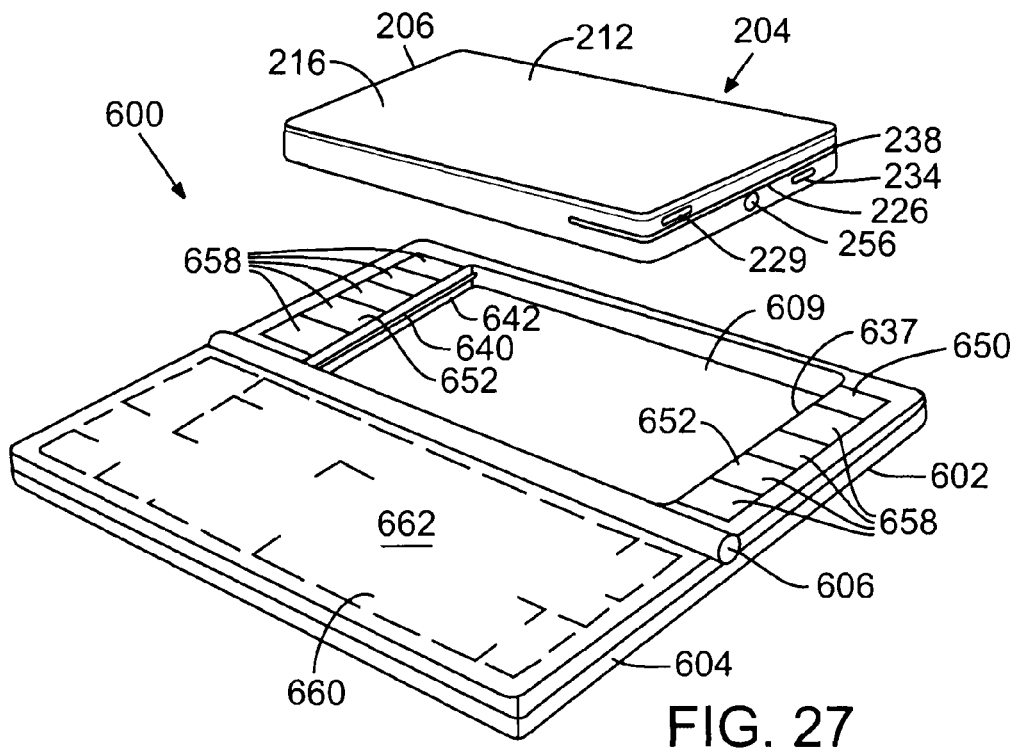
FIGS. 27 and 28 are perspective views of a hand-held, foldable modular communication device configured as a bimodal operation "smart" telephone.
Figure 28:
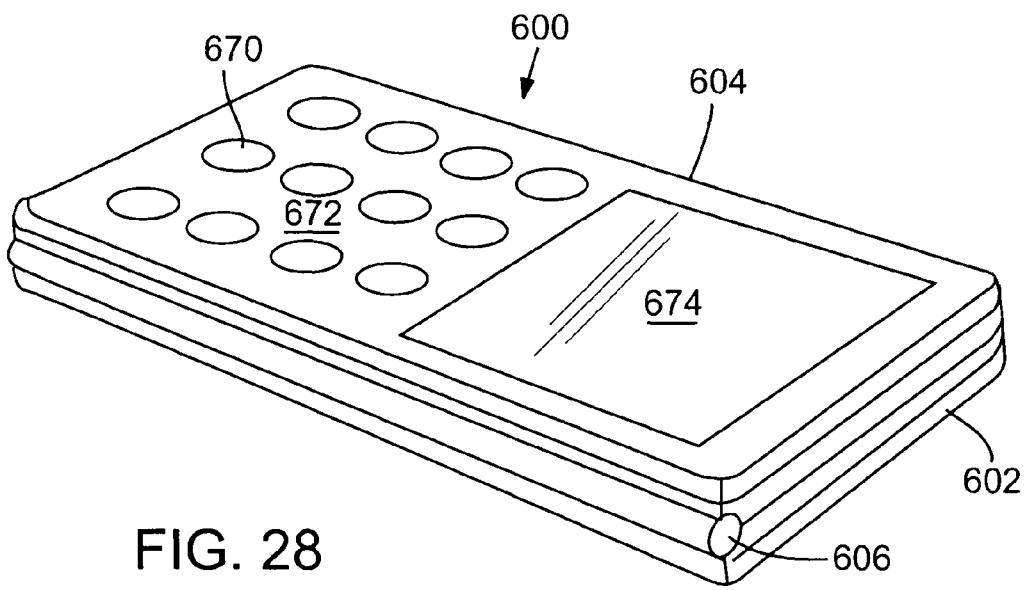

FIGS. 27 and 28 are perspective views of a hand-held, foldable modular communication device 600 configured as a bimodal operation "smart" telephone. For example, bimodal use of smart telephone 600 includes full PDA functionality in an open configuration and simple cellular telephone operation in a folded configuration.

Smart telephone 600 includes a first module section 602 and a second module section 604 that are pivotally connected to each other along their lengths by a hinge 606. FIG. 27 depicts smart telephone 600 in its open configuration, which shows puck 204 spatially aligned for insertion into a rectangular opening 609 in module section 602. Opening 609 preferably extends, but need not extend, through the entire thickness of module section 602. Electrical power is delivered to puck 204 by electrically conductive rods 640 (only one shown) fitted along opposite side walls 637 and 642 of opening 609 in module section 602. Rods 640 are positioned on side walls 637 and 642 of opening 609 to provide a positive, releasable snap fit into their corresponding grooves 238 of puck 204 when it is mated with module section 602. Segmented, spring-biased electrical contact set 400 shown in FIGS. 19-24 may be used as an alternative to rod 640 fitted in side wall 637 to electrically connect module section 602 and puck 204 at its side margin 206. Such use of contact set 400 would eliminate a need for rod 640 fitted along side wall 642 to be electrically conductive.

Configurable soft keys or dedicated specialty keys 650 and 658 are positioned adjacent side walls 637 and 642 of opening 609 and, together with display surface 216 of puck 204 when it is mated, form an inner surface 652 of module section 602. Module section 604 supports a full-function (QWERTY) keyboard 660 that cooperates with soft or specialty keys 650 and 658 and puck 204 to provide complete PDA functionality. Keyboard 660 forms an inner surface 662 of module section 604.

FIG. 28 depicts smart telephone 600 in its closed configuration, in which module sections 602 and 604 are folded together about hinge 606 such that their respective inner surfaces 652 and 662 are in confronting relationship. Module section 604 has an outer surface 670 defined by a telephone keypad 672 and an ultra-thin electronic paper display surface 674 manufactured by E ink Corporation, Cambridge, Mass. Telephone keypad 672 and display surface 674 cooperate to provide a simplified user-interface for telephony when smart telephone 600 is being transported in its closed configuration. Electronic circuitry providing telephone signal transmission and reception is preferably provided in puck 204, when it is mated, or alternatively or additionally is housed in module section 604 to enable autonomous telephone operation. It is envisioned that puck 204 would be routinely carried in smart telephone 600 to make available on demand the full functional capability puck 204 affords.

Figure 29:
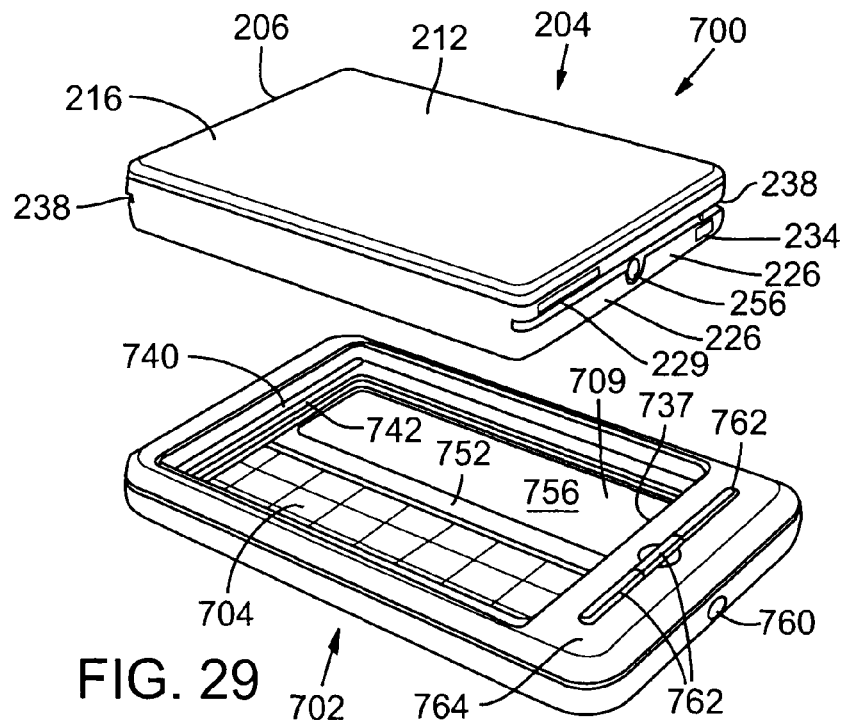
FIG. 29 is a perspective view of a hand-held modular communication device that includes an information input module configured to house an extensible full-function keyboard to enable PDA functionality.

FIGS. 29, 30, 31, 32, and 33 are perspective views of a hand-held modular communication device 700 that includes an information input module 702 configured to house an extensible full-function keyboard 704 to enable PDA functionality. FIG. 29 shows puck 204 spatially aligned for insertion into a rectangular opening 709 in information input module 702. Electrical power is delivered to puck 204 by electrically conductive rods 740 (only one shown) fitted along opposite side walls 737 and 742 of opening 709 in information input module 602. Rods 740 are positioned on side walls 737 and 742 of opening 709 to provide a positive, releasable snap fit into their corresponding grooves 238 of puck 204 when it is mated with information input module 702. Segmented, spring-biased electrical contact set 400 shown in FIGS. 19-24 may be used as an alternative to rod 740 fitted in side wall 737 to electrically connect information input module 702 and puck 204 at its side margin 206. Such use of contact set 400 would eliminate a need for rod 740 fitted along side wall 742 to be electrically conductive.

Opening 709 of information input module 702 has a floor 752 defined by keyboard 704 in its retracted position and a battery 756 supplying electrical power to puck 204 and information input module 702. A connector 760 can be used, for example, as an earpiece jack. Soft keys 762 positioned on an upper surface 764 of information input module 702 enable user control of selected features of puck 204 when keyboard 704 is retracted and thereby concealed in information input module 702.

Figure 30:
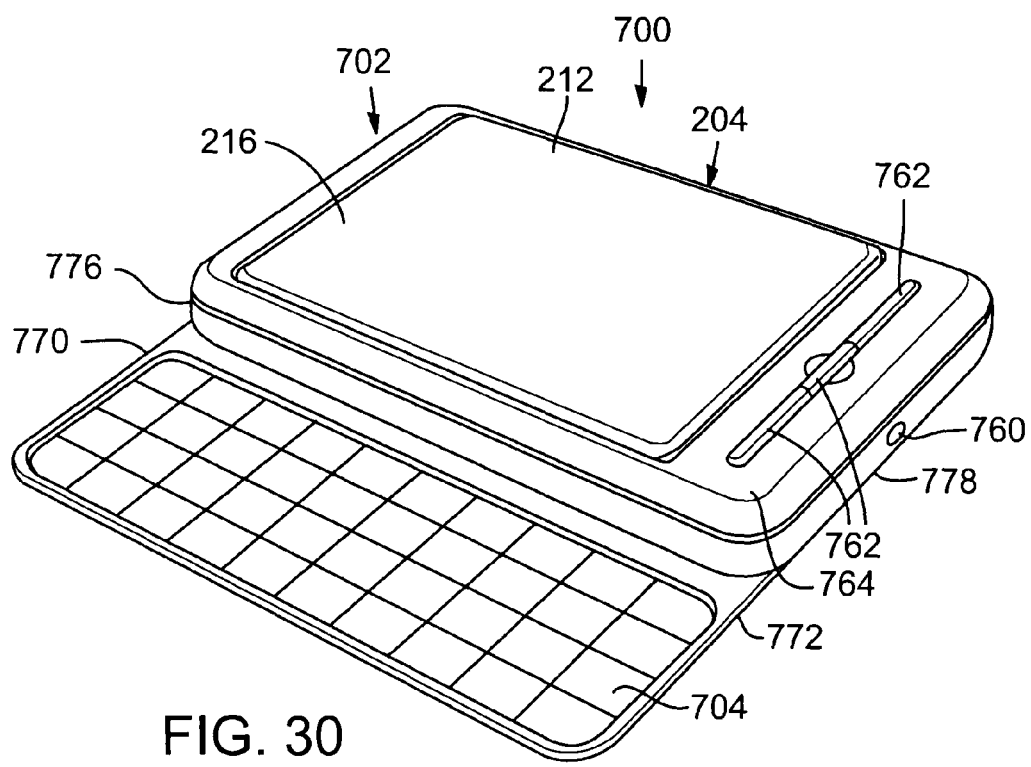
FIGS. 30 and 31 show, respectively, frontal and rear views of the modular communication device of FIG. 29, with the puck mated with the information input module and the keyboard in its extended position.
Figure 31:
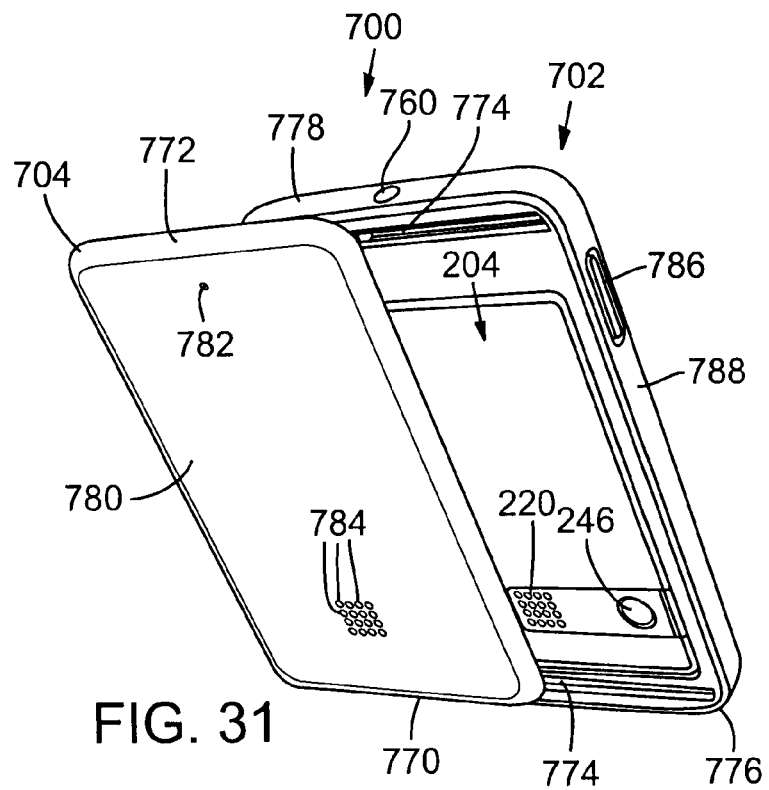

FIGS. 30 and 31 show, respectively, frontal and rear views of modular communication device 700 with puck 204 mated with information input module 702 and keyboard 704 in its extended position. Side margins 770 and 772 of keyboard 704 fit into slots 774 located in respective side margins 776 and 778 of information input device 702 to enable movement of keyboard 704 to its extended, operational position and its retracted, concealed position. The back surface of keyboard 704 functions as a lower surface 780 of information input module 702 covering the lens of camera 246 when keyboard 704 is in its retracted position. A microphone (not shown) and an audio speaker (not shown) are contained within the housing of keyboard 704. Holes 782 and 784 in lower surface 780 allow, respectively, voice transmission to the microphone and sound emission from the audio speaker when keyboard 704 is in its retracted position. Use of an additional microphone and speaker in communication device 700 is necessary because a circuit board forming part of keyboard 704 obstructs passage of sound from puck 204 to lower surface 780.

Figure 32:
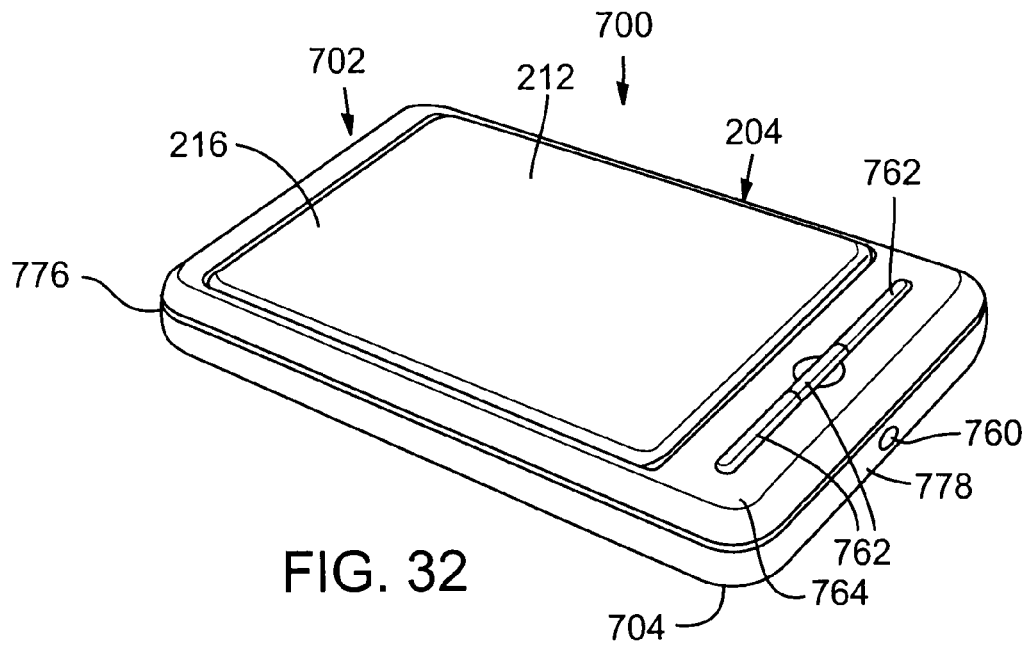
FIGS. 32 and 33 show frontal and rear views, respectively, of the modular communication device of FIG. 29, with the puck mated with the information input module and the keyboard in its retracted position.
Figure 33:
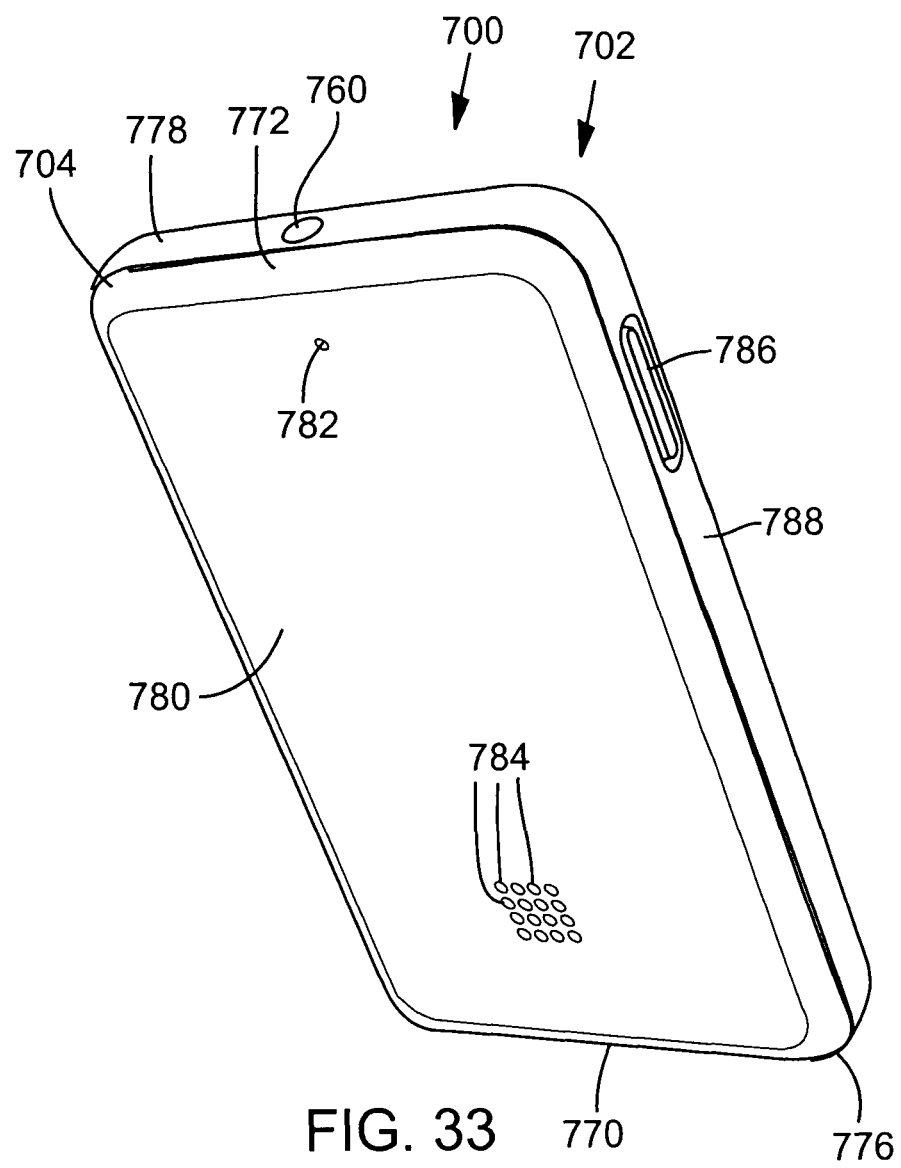

A push button switch 786 located on a side margin 788 of information input module 702 functions as an on-off switch and a camera shutter button when keyboard 704 is in, respectively, its retracted position and its extended position. FIGS. 32 and 33 show frontal and rear views, respectively, of modular communication device 700 with puck 204 mated with information input module 702 and keyboard 704 in its retracted position.

Figure 34:
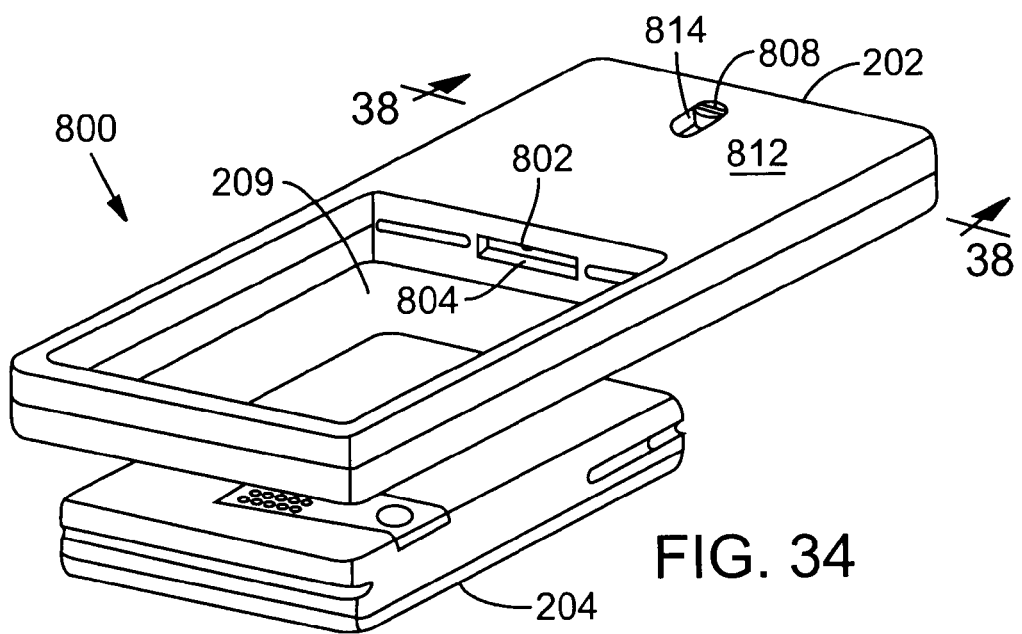
FIGS. 34 and 35 are partly exploded isometric views of, respectively, the lower surface and the upper surface of a modular communication device configured with a slidable printed circuit board (shown in its retracted, unlocking position) that functions as an electro-mechanical connection and a locking mechanism for securing the puck in place when it and the information input module are mated together.
Figure 35:
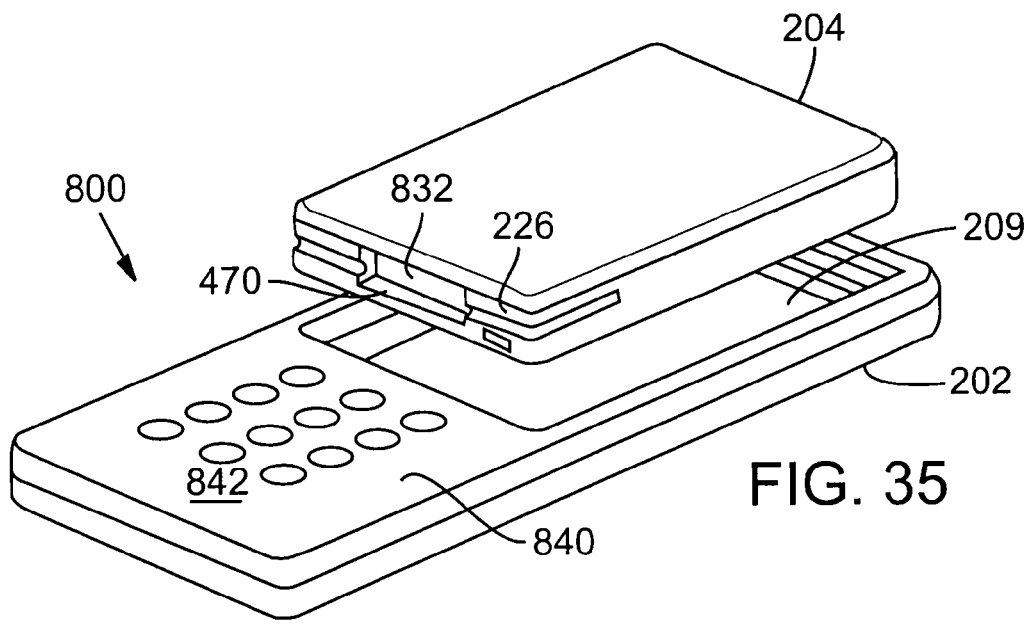
Figure 36:
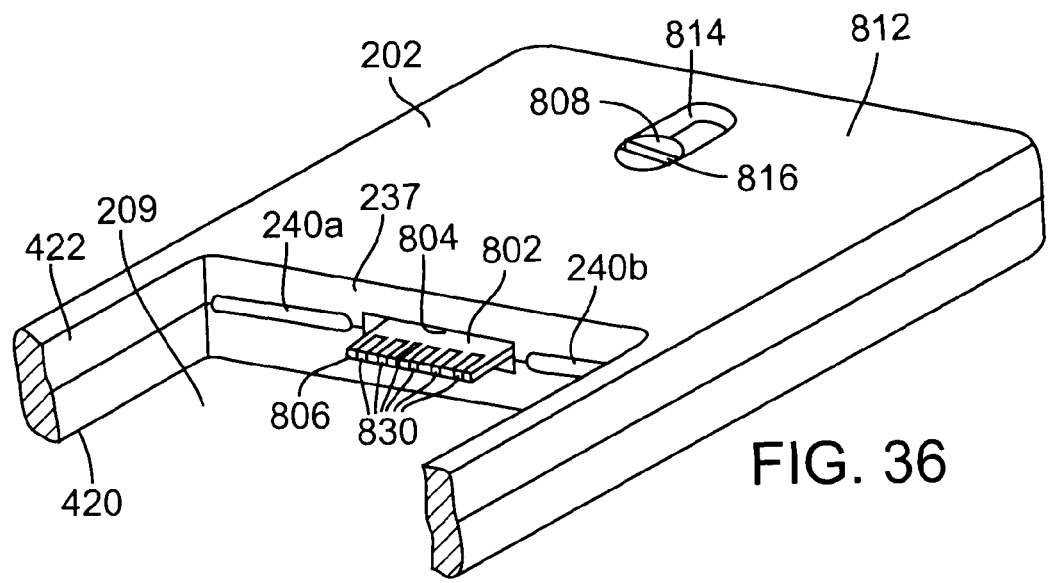
FIGS. 36 and 37 are fragmentary isometric views of the lower surface of the information input module of FIGS. 34 and 35 with the slidable printed circuit board in its extended, locking position and its retracted, unlocking position, respectively.
Figure 37:
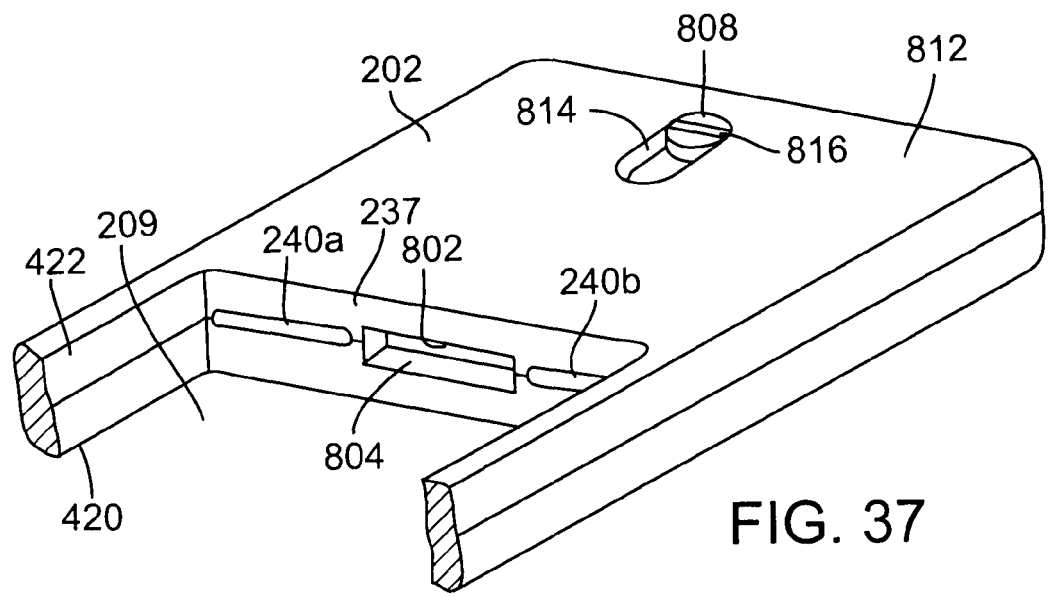

FIGS. 34 and 35 are partly exploded isometric views of, respectively, the lower surface and upper surface of modular communication device 800 configured with a slidable printed circuit board 802 (shown in its retracted, unlocking position) functioning as a locking mechanism for securing puck 204 in place when it and information input module 202 are mated together. FIGS. 36 and 37 are fragmentary isometric views of the lower surface of information input module 202 of FIGS. 34 and 35 with slidable printed circuit board 802 in its extended, locking position and its retracted, unlocking position, respectively. With reference to FIGS. 34, 35, 36, and 37, information input module 202 has fitted along its inner wall 237 rod segments 240a and 240b separated by an aperture 804 sized and configured to allow an electrode-carrying end portion 806 of circuit board 802 to extend into and retract from opening 209. Rod segments 240a and 240b act as a spring to snap and hold puck 204 in place until slidable printed circuit board 802 assumes its extended, locking position. The placement of rod segments 240a and 240b on either side of aperture 804 affords a thinner profile for information input module 202. Rod segments 240a and 240b may be electrically conductive and may carry differential signals or signals with different polarities to provide electrical power to puck 204 and/or perform communication operations. An alternative of using a single continuous rod above or below aperture 804 may be implemented with the consequence of a thicker profile for information input module 202.

A post 808 extending from a surface 810 (FIG. 38) of circuit board 802 and flush mounted relative to lower surface 812 provides user access to move circuit board 802 between its extended, locking and retracted, unlocking positions defined by the ends of a slot 814. Post 808 has in its upper surface a depression 816 sized to receive a coin or other tool to assist a user to lock and unlock puck 204. Alternatively, instead of post 808, any type of switch that provides user access to move circuit board 802 may be implemented. For example, a slidable switch 809 having a tab 811 flush mount relative to lower surface 812 as depicted in FIG. 38A may be used.

Aperture 470 formed in side margin 226 of puck 204 is sized and configured to receive end portion 806 of circuit board 802 in its extended, locking position. When in the extended, locking position with puck 204 mated to information input module 202, contact members 830 make electrical connections with corresponding contact members of a contact electrode receptacle 832 (FIG. 39) positioned at and aligned with aperture 470 of puck 204. The contact members of receptacle 832 function in a manner analogous to contact surfaces 404 of FIG. 21. A snug fit of end portion 806 in receptacle 832 provides, therefore, a positive lock for puck 204 in information input module 202.

Figure 38:
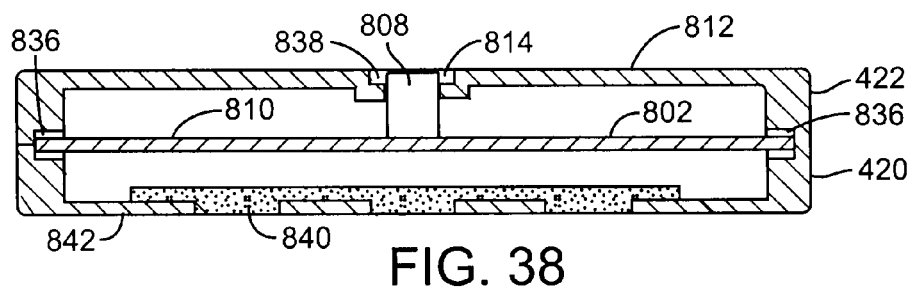
FIG. 38 is a sectional view taken along lines 38-38 of FIG. 34.
Figure 38A:
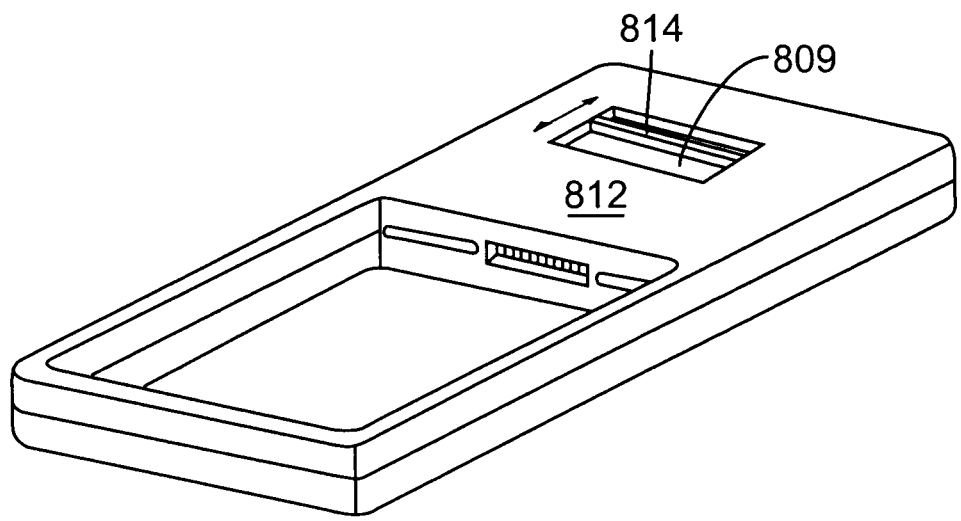
FIG. 38A is an isometric view of the lower surface of the information input module of FIGS. 34 and 35 showing a slider switch for extending and retracting the slidable printed circuit board.

FIG. 38 is a cross-sectional view showing the placement of printed circuit board 802 within the interior of information input module 202. Circuit board 802 rides inside integrated guide rails 836 formed by assembled housing sections 420 and 422. An optional well 838 (shown only in FIG. 38) in slot 814 facilitates access by a user's finger. A numerical key pad 840 fits in an upper surface 842 of information input module 202.

Figure 39:
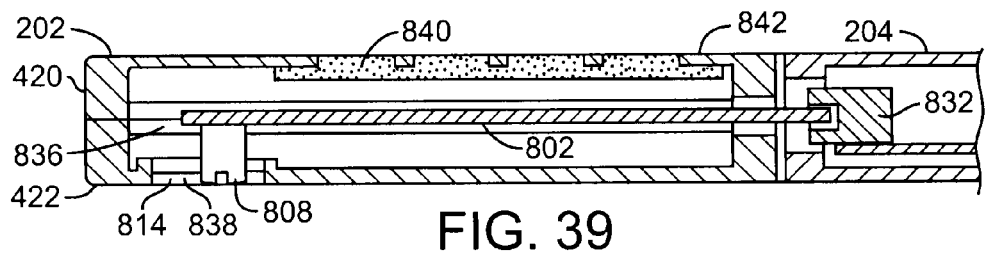
FIGS. 39 and 40 are cross-sectional views of the information input module and puck of FIGS. 34 and 35 shown in the confronting relationship they assume when the printed circuit board is in its extended, locking position and retracted, unlocking position, respectively.
Figure 40:
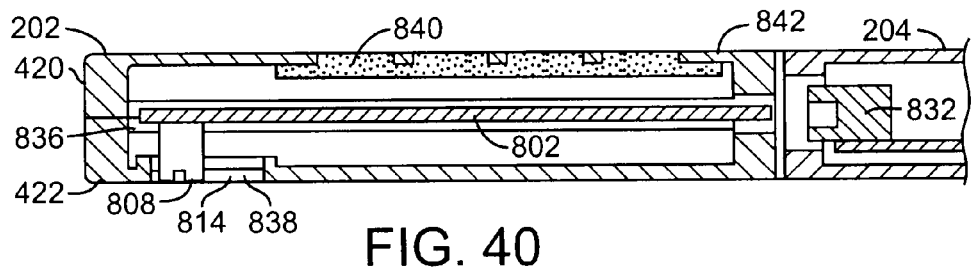

FIGS. 39 and 40 are cross-sectional views of information input module 202 and puck 204 of FIGS. 34 and 35 shown in the confronting relationship they assume when printed circuit board 802 is in its extended, locking position and retracted, unlocking position, respectively.

Figure 41:
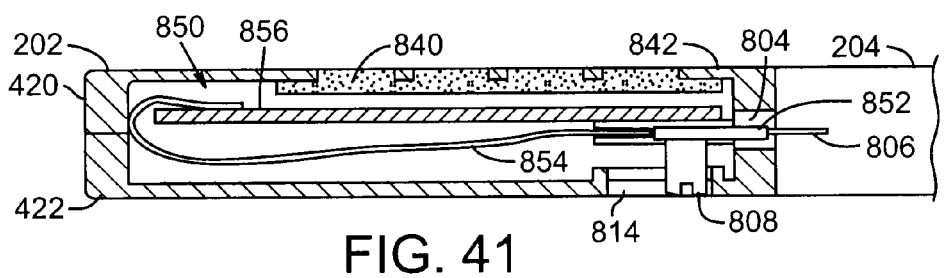
FIG. 41 is a cross-sectional view of the information input module and puck of FIGS. 34 and 35 implemented with an alternative slidable printed circuit board assembly and shown in the confronting relationship the information input module and puck assume when the circuit board assembly is in its extended, locked position.

FIG. 41 is a cross-sectional view of information input module 202 and puck 204 implemented with an alternative slidable printed circuit board assembly 850 and shown in the confronting relationship information input module 202 and puck 204 assume when circuit board assembly 850 is in its extended, locked position. FIG. 42 is a fragmentary view of a flex circuit holder 852, which is the slidable part of circuit board assembly 850, and a flex circuit ribbon 854 that electrically interconnects flex circuit holder 852 to a main circuit board 856 (FIG. 41), which is the stationary part of circuit board assembly 850. Flex circuit ribbon 854 may include a polyimide film such as Kapton™.

With reference to FIGS. 41 and 42, main circuit board 856 is supported adjacent and underneath numerical keypad 840 by housing section 420. Flex circuit holder 852 is supported by and rides inside integrated guide rails 836, as was described for circuit board 802. Flex circuit 854 is attached to an end of flex circuit holder 852 and to an end of main circuit board 856 to electrically interconnect them. Post 808 downwardly depends from flex circuit holder 852 to pass through slot 814 in housing section 422. More specifically, flex circuit holder 852 snaps around flex circuit 854 to provide rigidity and a way to hold flex circuit 854 between guide rails 836 to slide in response to user applied force to attached post 808. Contact members 830 of end portion 806 of flex circuit holder 852 make electrical connections with corresponding contact members of receptacle 832. A user manipulates post 808 to slide end portion 806 in and out of aperture 804 to lock and unlock puck 204 to information input module 202, as was described for circuit board 802.

Figure 42E:
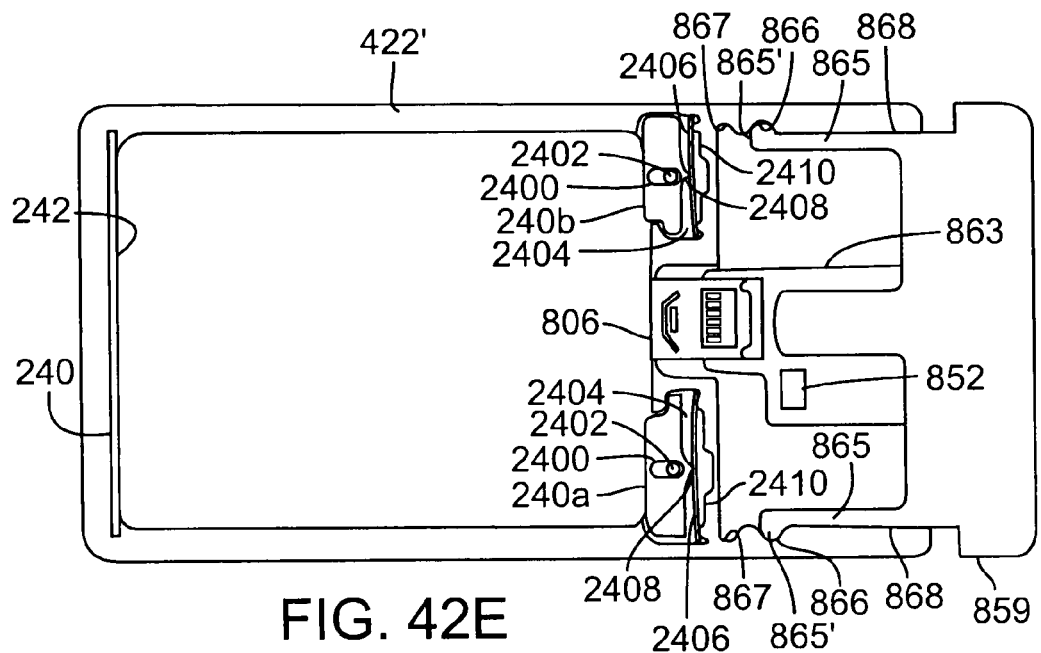
FIGS. 42E and 42F are front views of the information input module of FIG. 42A with a first housing section removed to show the slider switch in, respectively, the unlocking and locking positions.

A second alternative slidable printed circuit board assembly 850' is described with reference to FIGS. 42A-42G. FIG. 42A is an exploded isometric view, and FIGS. 42B-42D are cross-sectional views, of information input module 202 implemented with circuit board assembly 850'. Circuit board assembly 850' includes electrode-carrying end portion 806 mounted on a sliding printed circuit board 857. Also mounted on sliding printed circuit board 857 is flex circuit holder 852 that is electrically connected to electrode-carrying end portion 806. One end of flex circuit 854 is attached to flex circuit holder 852, and the other end is attached to main circuit board 856 via a connector 856' to electrically interconnect main circuit board 856 and electrode carrying end portion 806. Main circuit board 856 is stationary relative to information input module 202 and may include capacitive touch pads 858.

Printed circuit board assembly 850' includes a slider switch 859 to which sliding printed circuit board 857 is attached. Slider switch 859 is provided adjacent to an edge 860 of a second housing section 422'. The length of second housing section 422' is less than the length of first housing section 420 so that when slider switch 859 is in a locking position as shown in FIGS. 42B and 42C, a first edge 859' of slider switch 859 abuts edge 860 of second housing section 422' and a second edge 859" of slider switch 859 is spatially aligned with an edge 861 of first housing section 420. When slider switch 859 is in an unlocking position as shown in FIG. 42D, second edge 859" of slider switch extends beyond edge 861 of first housing section 420. As shown in FIGS. 42C and 42D, slider switch 859 includes a tab portion 862 that fits through a hole 863 in sliding printed circuit board 857 (shown in FIG. 42A) and rides inside a guide rail 864 formed on second housing section 422'.

Figure 42F:
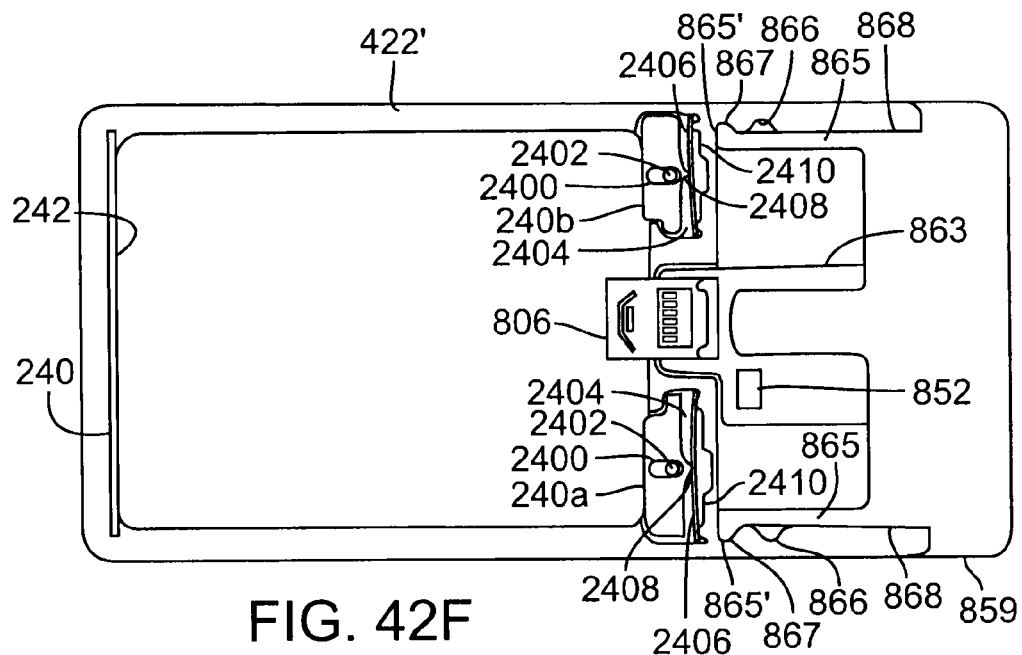

FIGS. 42E and 42F depict information input module 202 without first housing section 420, main circuit board 856, and flex circuit 854. Slider switch 859 includes two finger portions 865 having knobs 865' that engage with complementary rounded portions 866 and 867 of inner walls 868 of second housing section 422'. Knobs 865' engage with rounded portions 866 to help secure slider switch 859 in an unlocking position (shown in FIG. 42E), and knobs 865' engage with rounded portions 867 to help secure slider switch 859 in a locking position (shown in FIG. 42F).

Figure 42G:
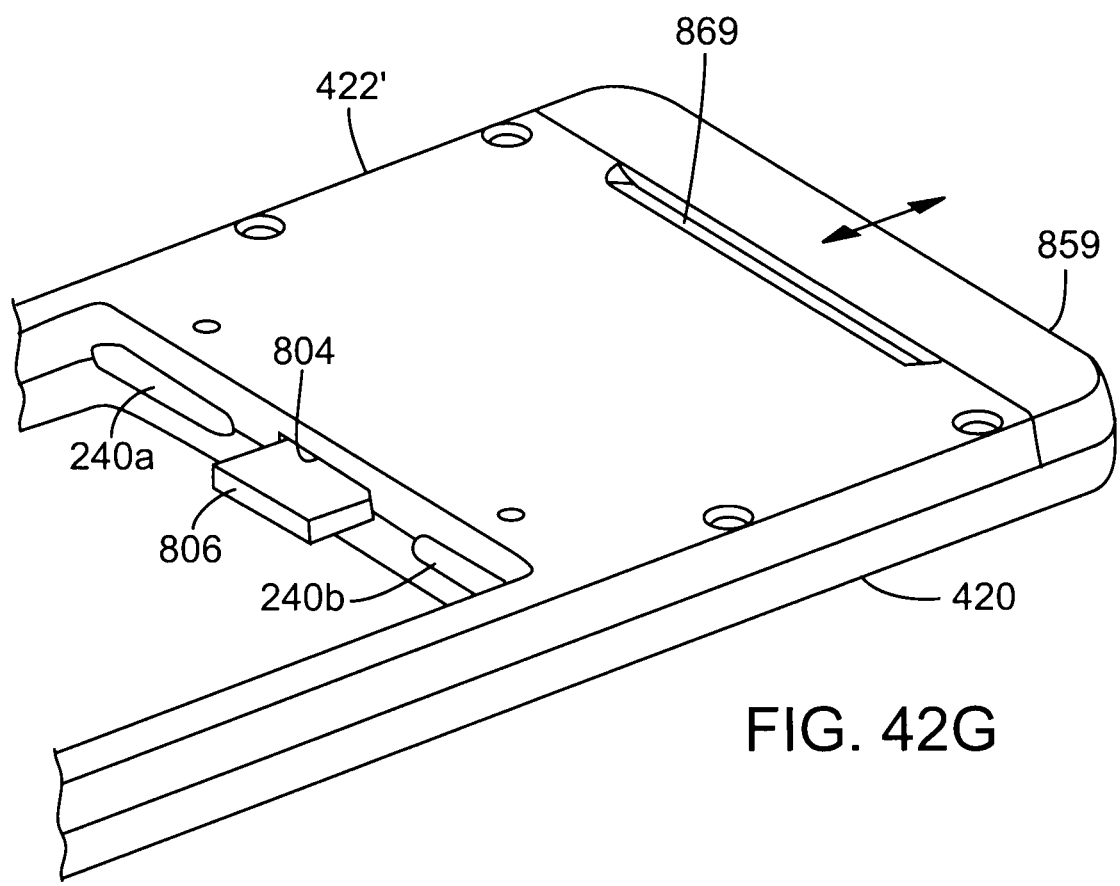
FIG. 42G is a fragmentary isometric view of the lower surface of the information input module of FIG. 42A with the slider switch in a locking position.

FIG. 42G is a fragmentary isometric view of the lower surface of information input module 202 with slider switch in the locking position. As depicted in FIG. 42G, second housing section 422' includes a beveled portion 869 (i.e., a finger grip area) to assist a user to move slider switch 859 from the locking position to the unlocking position. A user manipulates slider switch 859 to slide end portion 806 in and out of aperture 804 to lock and unlock puck 204 to information input module 202, as was described for circuit board 802.

Alternatives to moving printed circuit board 802 into and out of its locking position in receptacle 832 include, for example, a parallel orientation (side surface) slider post using either side cam action or rotary cam action to move printed circuit board 802.

Skilled persons will appreciate that the slider switch 410 and locking pin 414 assembly and slidable printed circuit board assembly 850 are two examples of many techniques for locking puck 204 and information input module 202 together.

FIGS. 42A, 42E, and 42F also show rods 240a and 240b in more detail. The term "rod" identifying the embodiment of the components 240a and 240b configured as shown in FIGS. 42A, 42E, and 42F refers to the outer edge surface resembling that of a rod. Rods 240a and 240b include slots 2400 sized to receive guide pins 2402. Guide pins 2402 are secured to first and second housing sections 420 and 422' and allow rods 240a and 240b to move relative to first and second housing sections 420 and 422' in cavities 2404. Leaf springs 2406 are provided that engage with projection portions 2408 of rods 240a and 240b so that rods 240a and 240b are spring-biased to make their edge surfaces flexible. Leaf springs 2406 may be made from any type of material such as, but not limited to, steel, rubber, foam, or plastic. The ends of leaf springs 2406 contact bottom walls 2410 of cavities 2404. As puck 204 is being inserted into opening 209, rods 240a and 240b are pressed against leaf springs 2406 causing leaf springs 2406 to bend near their centers. Leaf springs 2406 provide resistive forces that cause rods 240a and 240b snap into groove 238 of puck when groove 238 is spatially aligned with rods 240a and 240b. Rod 240 provided on side wall 242 opposite from rods 240a and 240b may be fixed relative to housing sections 420 and 422' or may be spring-biased as was described for rods 240a and 240b.

FIG. 43 is a partly exploded perspective view of a handheld modular communication device 870 in the form of a telephone handset similar to that of modular communication device 200, except that the former includes an information input module 872 configured to rest in a dock opening 874 in a charging station 876 and equipped to receive updated information for storage in solid state memory 878 residing in charging station 876. An assembled handset of puck 204 and information input module 872 placed in charging station 876, in addition to receiving electrical charge, downloads to memory 878 information acquired by and stored in puck 204 during a time after handset 870 was last docked in charging station 876. FIG. 44 is a rear perspective view of information input module 872 having in its bottom surface sound emission holes 880 that pass sound emitted by audio speaker 220 in puck 204 and in its bottom side margin a connection link window 882 that provides an information download communication link to memory 878. A preferred implementation of link window 882 is a set of, for example, six to eight electrical contacts that correspond to the same number of spatially aligned electrical contacts of a set in dock opening 874. When handset 870 is placed in dock opening 874, the sets of electrical contacts allow electrical charging and information transfer between the assembled handset 870, charging station 876, and memory 878, in a manner similar to that performed in common wireless house phones. Another preferred implementation of link window 882 is a combination of IR link and metal contacts for electrical charging and information transfer that provides an information download communication link to memory 878.

When it is docked in charging station 876, handset 870 typically functions as a clock-telephone that, when the telephone is not in use, presents on display surface 216 a seven-digit display of the time of day or similar information. Charging station 876 includes a snooze function button 884, which is akin to the snooze button found on a clock-radio, that enables a user to disable an alarm function after a pre-selected time has elapsed.

Figure 45:
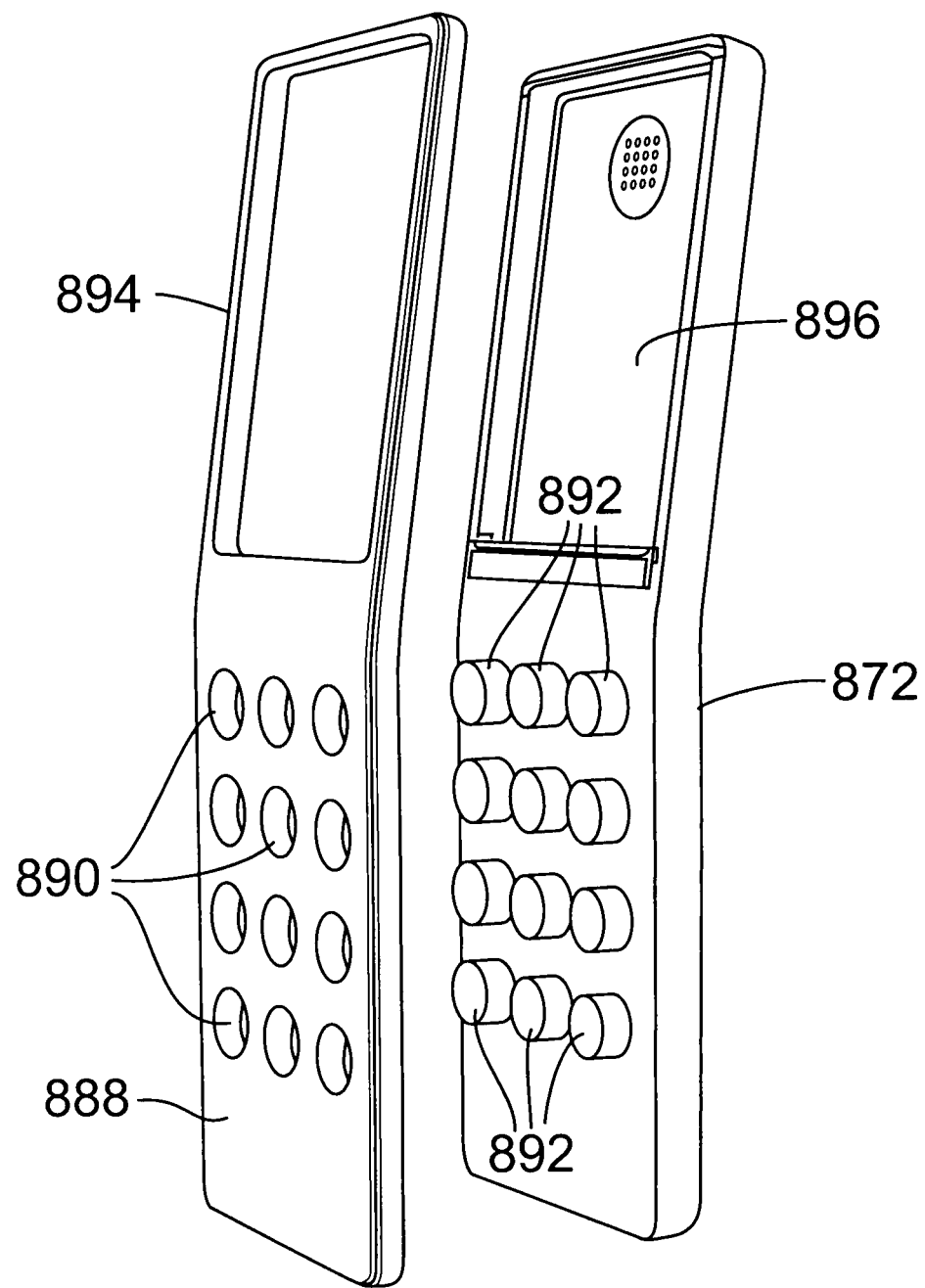
FIG. 45 shows an exploded view of the information input module of FIG. 43 and a changeable face plate that enables color or exterior design change to facilitate quick customization of the overall look of modular communication device.

FIG. 45 shows an exploded view of information input module 872 and a changeable face plate 888 with holes 890 that fit over spatially aligned keypad buttons 892 and a frame portion 894 that fits over an opening 896 for receiving puck 204. Changeable face plate 888 facilitates color or exterior design change to facilitate quick customization of the overall look of modular communication device 870.

Figure 45A:
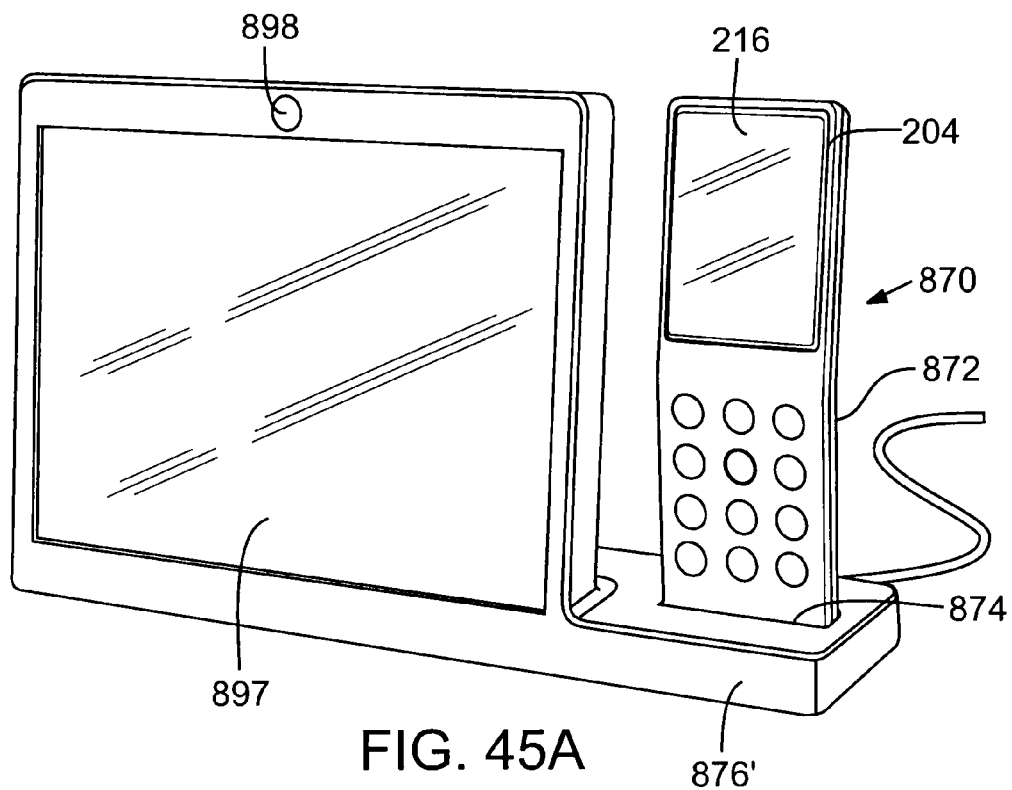
FIG. 45A is a perspective view of the information input module of FIGS. 43-45 resting in a dock opening of a charging station that includes a display screen and a video camera for video telecommunication.

FIG. 45A is a perspective view of information input module 872 resting in dock opening 874 of a charging station 876' that enables video telecommunication. Charging station 876' includes all the features of charging station 876 described above, as well as a display screen 897 and a video camera 898. Display screen 897 may be a flat screen display such as a liquid crystal display (LCD). Electrical contacts in dock opening 874 are spatially aligned with electrical contacts of information input module 872 when it is resting in dock opening 874 to provide information transfer between charging station 876' and information input module 872. Video camera 898 captures video images of a user and transmits via a communication link established by hand-held modular communication device 870 information representing the video images to a third-party for display on a display screen of the third-party. The video images captured by video camera 898 may also be displayed on display surface 216 of puck 204 so that the user can see images of himself/herself. Information representing video images of the third-party may be communicated to the hand-held modular communication device 870 via the communication link, and the video images of the third-party may be displayed on display screen 897. Information other than video images of the third-party may also be displayed on display screen 897.

Skilled persons will appreciate that segmented, spring-biased electrical contact set 400 shown in FIGS. 19-24 may be used as an alternative to the electrically conductive rod functioning as a data and control communication link and an electrical power connection in any of the other embodiments described in this patent application.

Skilled persons will also appreciate that, in each of the embodiments described, the information input module provides a frame structure (either open or closed) into which the puck is inserted with a secure fit and from which the puck is removed. The puck and information input modules can communicate through IR, Bluetooth, and electromechanical connection, or any combination of them. Moreover, the puck can add wireless communication capability to any information or media device to which the puck docks or attaches.

Embodiments of the information delivery module could be equipped with voice recognition capability to respond to voice commands, enable hands-free communication, or both. Embodiments of the information input module may contain additional power supply and processing circuitry to enable the modular communication device to perform or function in a desired manner. Moreover, providing additional simulation circuitry in the information input module could enable it to perform multiple task modes (e.g., game mode and text messaging mode).

The visual appearances of the various, indefinite number of possible embodiments of the modular multi-function device or POD humanize the interaction between technology and the user. By recognizing that mobile telephones and other portable communication devices are increasingly influenced by fashion trends, applicant created POD modules in a range of shape, color, material, and finish choices that allow users to express their individual styles and fit into users' everyday environments. POD adapts to a user's lifestyle rather than requiring the user to adapt to the limitations or unappealing look of technology. The modular design approach creates a recognizable look and a trademark, while accommodating the user's desire for customization.

In a world in which face-to-face human interactions are being increasingly replaced by technology, a modular multi-function communication device that enables an inviting, compelling, and personal experience can make a profound difference in the user's everyday life. POD achieves exactly that profound difference. Unlike mobile telephones that confine the customer to one look, limited configurations, and finite functionality, the customizability of POD allows optimum personalization, configuration, and functionality for different users and use scenarios. A user can take his or her POD anywhere—from gym, to fancy dress party, to home, to office—and have it fit into each environment with ease. By combining in one device all the user's technological needs, including telephone, PDA, camera, music files, clock, and games, POD simplifies the vast realm of technology options used in everyday life with one consistent interface. At the same time, POD becomes wearable technology that enables a user to make a unique fashion statement and express personal style.

The POD design solution is more versatile and much less expensive than any other currently available customization solution, resulting in an affordable, multi-function mobile telephone or other communication device that precisely fits the individual user's needs, desires, and aesthetic sensibilities.

Figure 46:
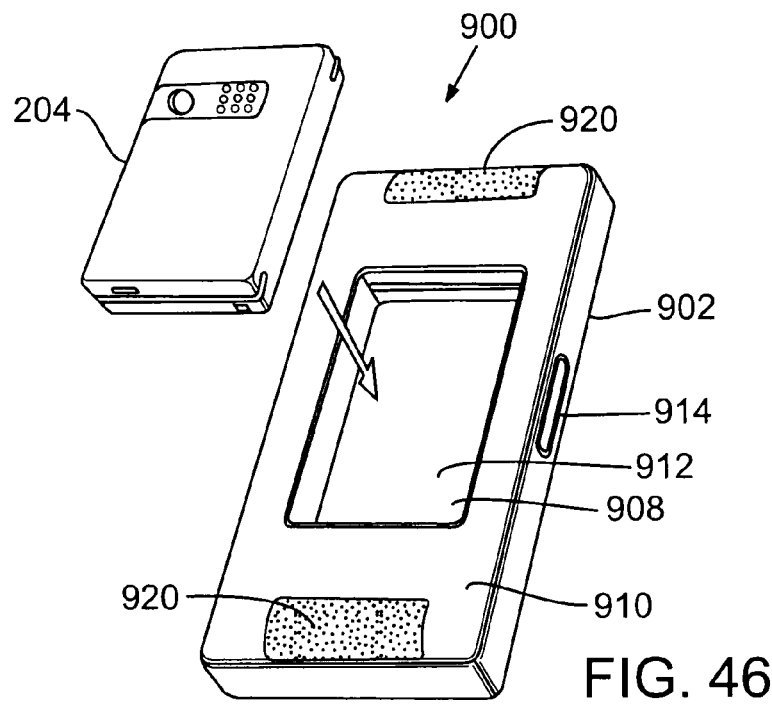
FIG. 46 is a partly exploded rear perspective view of an information input module in the form of an image viewing device configured to receive an information delivery module of a type similar to that of FIGS. 12A-12D.
Figure 47:
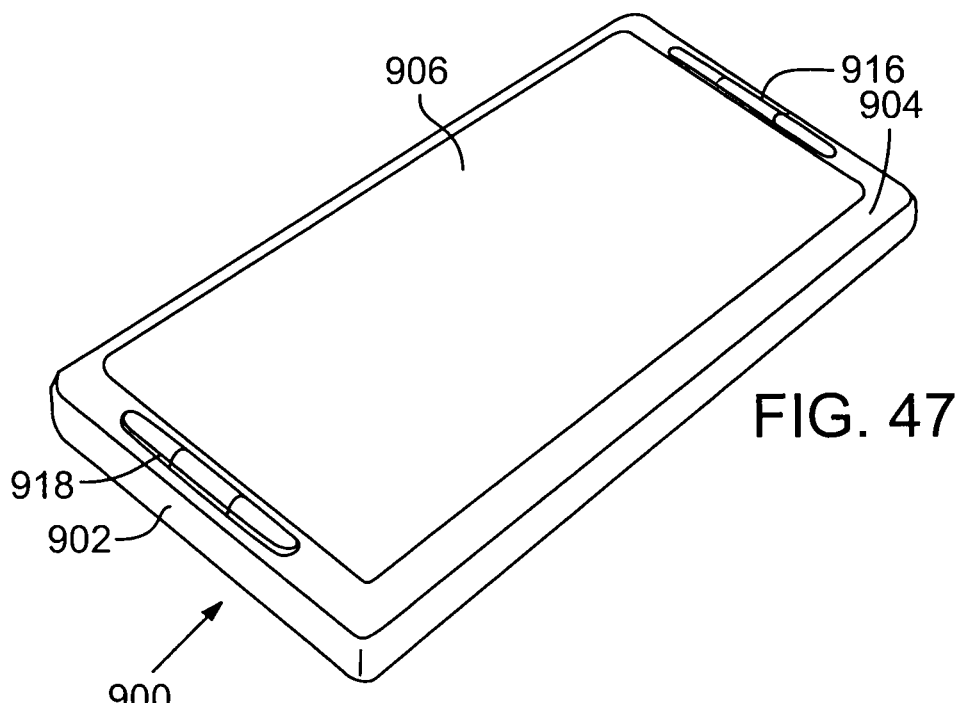
FIG. 47 is a front perspective view of the image viewing device of FIG. 46 having on its front surface a display screen.

FIGS. 46 and 47 are perspective views of a modular communication device 900 that includes an image viewing device 902 as an information input module. Image viewing device 902 includes on a front surface 904 a display screen 906. Display screen 906 may be a liquid crystal display or other type of display known in the art. Display screen 906 may also be a touchscreen that is implemented with capacitive touch sensing technology. FIG. 46 shows puck 204 spatially aligned for insertion into a rectangular opening 908 in a back surface 910 of image viewing device 902. In rectangular opening 908, image viewing device 902 includes a floor 912 that covers display surface 216 of puck 204 when puck 204 is inserted into opening 908. Image viewing device 902 may include conductive rods or segmented, spring-biased electrical contact sets, and puck 204 may include corresponding grooves as previously described. Image viewing device 902 may also include a locking mechanism or locking pin for puck 204 as previously described. Image viewing device 902 includes a button 914 and button sets 916 and 918 that allow a user to control various features, such as power on/off, volume control, brightness and contrast adjustment, and navigation between images. Image viewing device 902 also includes on back surface 910 pads 920 that provide a grip surface for user handling.

During operation, puck 204 communicates display information to image viewing device 902 so that one or more images appear on display screen 906. For example, puck 204 communicates picture or video information to image viewing device 902 so that a still picture or video images appear on display screen 906. Because display surface 216 of puck 204 is not visible to a user when puck 204 is inserted into opening 908, puck 204 communicates signals that would have been used to display information on display surface 216 to image viewing device 902 so that the information is displayed on display screen 906. In other words, display screen 906 displays information in lieu of display surface 216 when puck 204 is mated with image viewing device 902. Display screen 906 has a larger display than display surface 216 so that images appearing on display screen 906 are larger, and, thus, easier to see than they otherwise would be if displayed on display surface 216. Image viewing device 902, therefore, may enhance a user's viewing experience of graphical information such as pictures and video.

Figure 48:
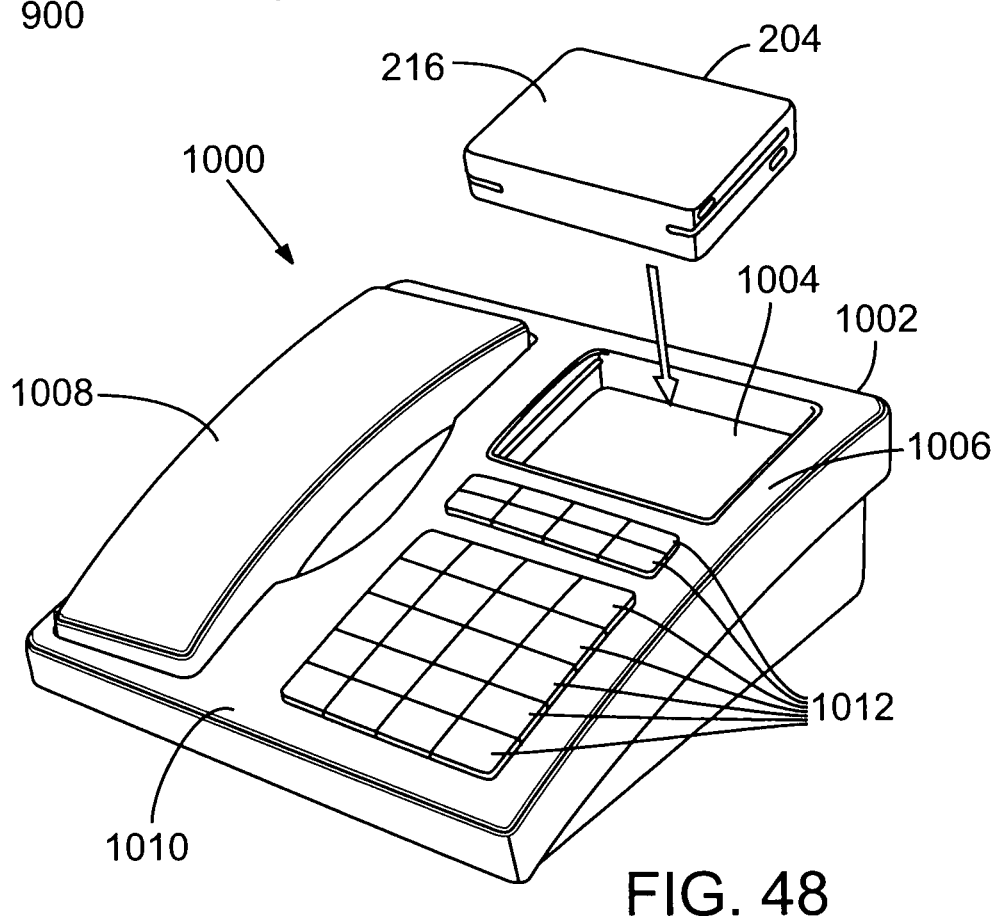
FIG. 48 is a partly exploded perspective view of an information input module in the form of a business phone dock configured to receive an information delivery module of a type similar to that of FIGS. 12A-12D.

FIG. 48 is a partly exploded perspective view of a modular communication device 1000 that includes a business phone dock 1002 as an information input module. FIG. 48 shows puck 204 spatially aligned with an opening 1004 on a front surface 1006. Business phone dock 1002 includes a handset 1008 and a base unit 1010 that includes a conventional set of buttons 1012, which enable a user to perform a number of functions typical to a land line business telephone such as, but not limited to, number dialing, call forward, conference call, and hold. Information may be communicated between handset 1008 and base unit 1010 through a phone cord (not shown) or through wireless communication. During operation, display surface 216 of puck 204 may display various information, such as a number of an outgoing call or the name and number of an incoming call.

When puck 204 is placed in opening 1004, the cellular telephone capabilities of puck 204 establish a communications link between device 1000 and the outside world—a land line is not necessary for communication. Thus, when puck 204 is mated with business phone dock 1002, device 1000 becomes a fully functional business phone that uses cellular telephone communication, rather than typical land line communication. Business phone dock 1002 may replace a conventional business phone handset and the multiple trunk lines associated with it.

Figure 49A:
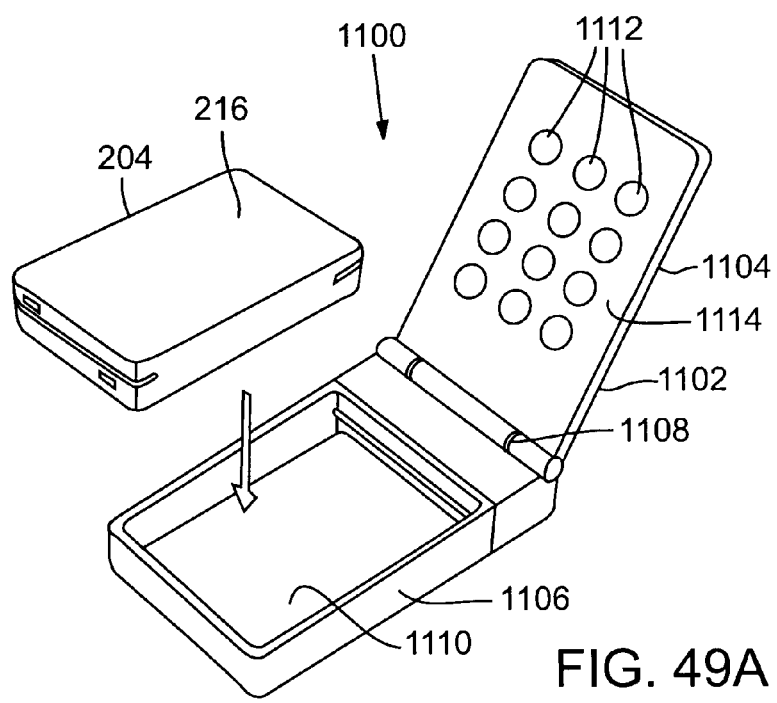
FIGS. 49A and 49B are, respectively, partly exploded perspective and side elevation views of an information input module in the form of a hand-held, foldable, or flip, phone configured to receive an information delivery module of a type similar to that of FIGS. 12A-12D.
Figure 49B:
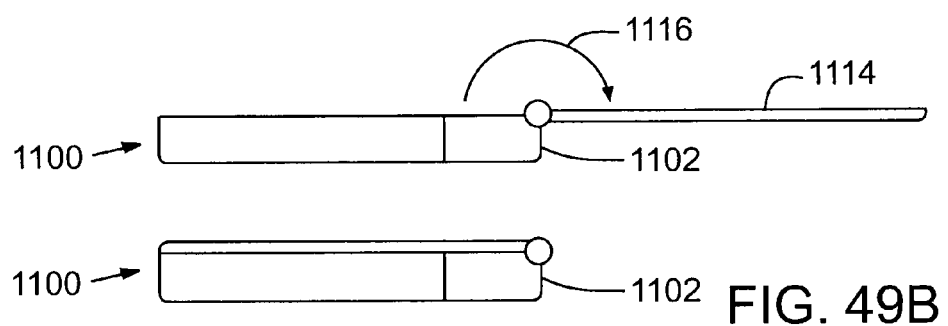

FIGS. 49A and 49B show a modular communication device 1100 that includes a foldable, or flip, phone 1102 as an information input module. Phone 1102 includes a first section 1104 and a second section 1106 that are pivotally connected to each other along their widths by a hinge 1108. FIG. 49A and the top portion of FIG. 49B show phone 1102 in its open configuration. FIG. 49A shows puck 204 spatially aligned for insertion into an opening 1110 in second section 1106. A set of buttons 1112 is provided on an inner surface 1114 of first section 1104 so that when puck 204 is inserted into opening 1110 and phone 1102 is in a closed configuration (bottom portion of FIG. 49B), buttons 1112 are in a confronting relationship with display surface 216 of puck 204. When phone 1102 is in the closed configuration, display surface 216 may be powered down, and when phone 1102 is unfolded (represented by arrow 1116) display surface 216 may be automatically powered on to display various information. Phone 1102 may include conductive rods or segmented, spring-biased electrical contact sets, and puck 204 may include corresponding grooves as previously described. Phone 1102 may also include a locking mechanism or locking pin for puck 204 as previously described.

FIGS. 50A, 50B, 50C, and 50D show a modular communication device 1200 that includes a health module 1202 as an information input module. Health module 1202 includes an upper portion 1204 fitted with a cord 1206 that a user can place around his or her neck as shown in FIG. 50D. Health module 1202 also includes on a front surface 1208 an opening 1210 sized to receive puck 204. FIG. 50A shows puck 204 spatially aligned for insertion into opening 1210. Device 1200 uses wireless communication, such as Bluetooth communication, to receive information from, and transmit information to, one or more monitors 1212 worn by a user. Monitors 1212 measure various vital signs of the user, such as heart rate and breathing rate, and may measure other metrics such as horizontal and/or vertical distance traveled. Monitors 1212 communicate information to device 1200, where the information can be processed, stored, displayed on display surface 216, and/or communicated to another device through cellular telephone communication. Health module 1202 may include conductive rods or segmented, spring-biased electrical contact sets, and puck 204 may include corresponding grooves as previously described. Health module 1202 may also include a locking mechanism or locking pin for puck 204 as previously described.

Figure 51:
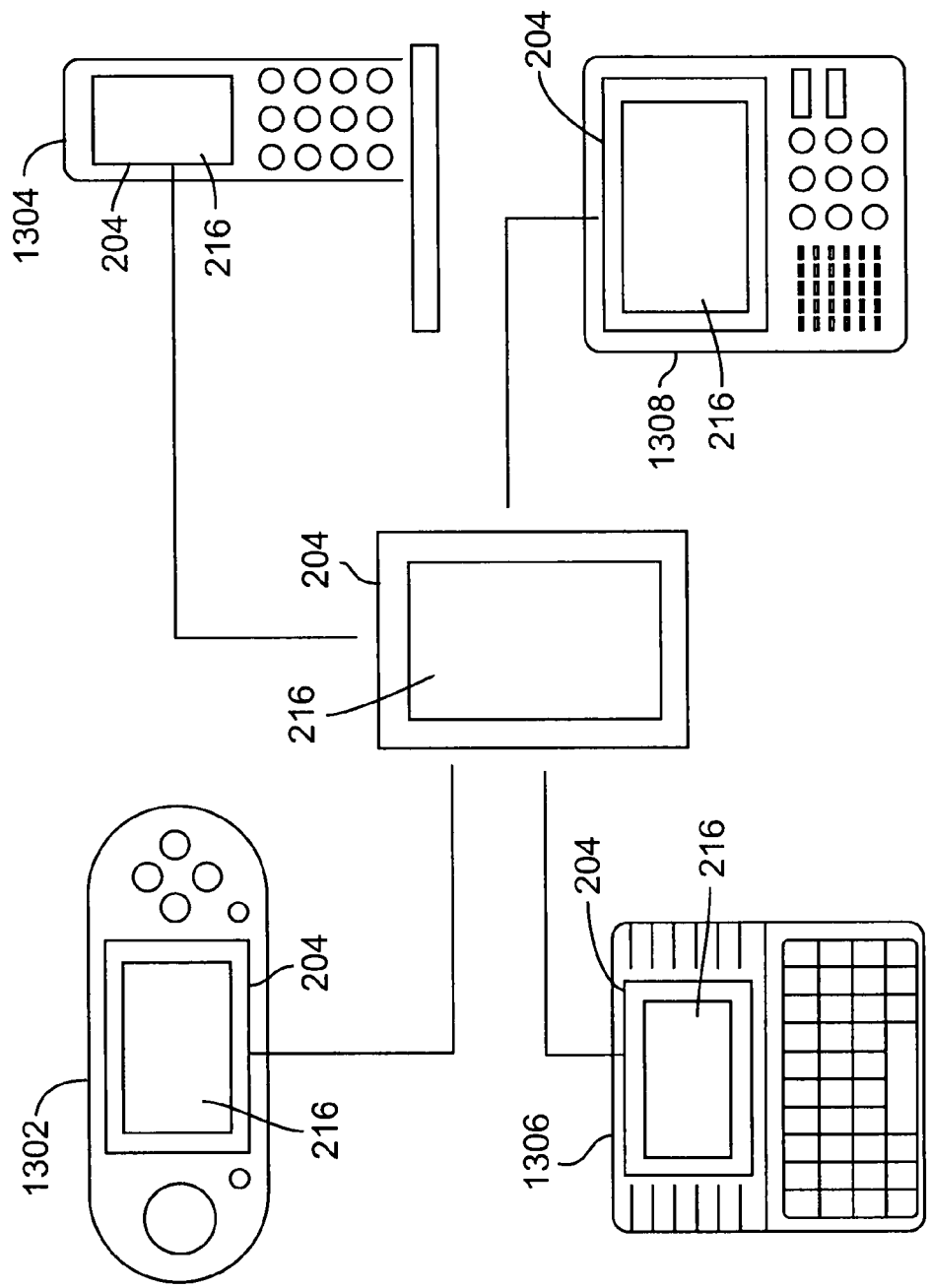
FIG. 51 is a diagram of an information delivery module of a type similar to that of FIGS. 12A-12D, and various information input modules to illustrate a modular universal interface feature in which the graphical interface of the information delivery module is dictated by the functions of the information input module with which the information delivery module is mated.

FIG. 51 depicts puck 204 mated with various different types of information input modules 1302, 1304, 1306, and 1308 to illustrate a modular universal interface feature of puck 204 when mated with different information input modules. Each information input module 1302, 1304, 1306, and 1308 includes specific applications that relate to its unique functions. When puck 204 is inserted into an information input module, information is communicated between puck 204 and the information input module so that puck 204 can recognize the type of information input module with which puck 204 is mated. After puck 204 identifies the type of information input module, puck 204 displays a graphical interface on display surface 216 that is dictated by the core functions of the information input module in which puck 204 is installed. For example, puck 204 can automatically orient display graphics in a landscape orientation for information input modules 1302, 1306, and 1308 and automatically orient display graphics in a portrait orientation for information input module 1304. Also, puck 204 may automatically display graphics unique to the functions of the information input module. Puck 204 may display multiple icons representing menu items and may include a lensing feature, in which an icon that is selected by a user appears larger than non-selected icons. A user may navigate between icons to change a non-selected icon to a selected icon. Through open source software, new interfaces can be created for different types of information input modules. Thus, by automatically displaying a graphical interface unique to the functions of the information input module, a seamless and holistic user experience is created.

It will be obvious to those having skill in the art that many changes may be made to the details of the above-described embodiments without departing from the underlying principles of the invention. The scope of the present invention should, therefore, be determined only by the following claims.

The invention claimed is:

1. A game controller accessory that is matable with a smartphone to provide a handheld electronic video gaming console, the smartphone including generally planar opposing major surfaces that define a multiple-sided perimeter, a display integral to one of the generally planar opposing major surfaces, information delivery circuitry in communication with the display, and a receptacle having a set of spaced-apart electrical conductors for communication with the information delivery circuitry to present for a user a video game on the display, the game controller accessory comprising:

a housing having an interior and containing information input circuitry that facilitates communication of information between the game controller accessory and the smartphone, the housing including opposing front and back major surfaces, the front major surface including an opening that is sized to accept placement of the smartphone, the opening defined by an inner boundary formed of a pair of sidewalls and a pair of endwalls, the pair of sidewalls including a first sidewall and a second sidewall located opposite the first sidewall, the pair of endwalls including a first endwall and a second endwall located opposite the first endwall, each of the first and second sidewalls and the first and second endwalls confronting a different one of the sides of the multiple-sided perimeter of the smartphone so as to inhibit lateral movement of the smartphone when the user places it in the opening and thereby causes the user removing the smartphone from the housing to lift the smartphone outwardly away from the inner boundary of the opening and through a plane defined by the front major surface;

a first input device supported by the housing proximal the first endwall and configured for communication with the information input circuitry, the first input device being operable to generate first game control signals for transmission to the smartphone when it is placed in the opening;

a second input device supported by the housing proximal the second endwall and configured for communication with the information input circuitry, the second input device being operable to generate second game control signals for transmission to the smartphone when it is placed in the opening; and a connecting member having a set of spaced-apart electrical contact members, the connecting member being moveable, relative to the opening, to align and mate with the receptacle when the smartphone is placed in the opening so that the electrical contact members establish electrical contact with corresponding ones of the electrical conductors of the receptacle to thereby facilitate transmission of the first and second game control signals from the game controller accessory to the smartphone for user control of the video game presented on the display.

2. The game controller accessory of claim 1, in which the connecting member mates with the receptacle of the smartphone by movement of the connecting member from a first position partly within the interior of the housing to a second position within a region encompassed by the opening.

3. The game controller accessory of claim 1, in which the connecting member is part of a moveable circuit board that is extendable and retractable.

4. The game controller accessory of claim 1, in which the set of spaced-apart electrical contact members facilitates transmission of electrical battery-charging power from the game controller accessory to the smartphone for charging a battery of the smartphone when the connecting member is mated with the receptacle.

5. The game controller accessory of claim 1, further comprising one or both of data storage for storing video data and a graphics chip.

6. The game controller accessory of claim 1, in which the smartphone is operable to function as a cellular telephone, and in which placement of the smartphone in the opening of the game controller accessory causes the smartphone to operate in a gaming mode.

7. The game controller accessory of claim 1, in which the set of spaced-apart electrical contact members provide a data bus.

8. The game controller accessory of claim 7, in which the data bus is a universal serial bus (USB).

9. The game controller accessory of claim 1, in which the smartphone includes a speaker, and in which the housing includes an aperture through at least one of the opposing major surfaces of the housing to direct sound emitted by the speaker away from the opening and outwardly from the at least one of the opposing major surfaces of the housing.

10. The game controller accessory of claim 1, in which the first input device includes a game control buttons.

11. The game controller accessory of claim 1, in which the second input device includes a group of game control multi-directional pad.

12. The game controller accessory of claim 1, in which the housing is configured for two-hand operation and is supported by a right hand of the user when the user operates the first input device with fingers of the right hand, and is supported by a left hand of the user when the user operates the second input device with fingers of the left hand.

13. The game controller accessory of claim 1, in which the one of the generally planar opposing major surfaces of the smartphone comprises a front-side surface and the other one of the generally planar opposing major surfaces of the smartphone comprises a back-side surface, and in which the housing includes an aperture extending from the opening to the back major surface of the housing so that the aperture reveals a portion of a back-side surface of the smartphone when it is placed in the opening.

14. The game controller accessory of claim 1, further comprising a textured-grip surface opposite the first and second input devices.

15. The game controller accessory of claim 1, in which the inner boundary is generally rectangular in shape.

16. The game controller accessory of claim 15, in which the inner boundary includes a lip seal protruding from the first and second sidewalls and the first and second endwalls, extending inwardly and around the rectangular inner boundary to contact the multiple-sided perimeter of the smartphone near a periphery of the display and thereby secure and seal the smartphone upon its mating with the game controller accessory.

17. The game controller accessory of claim 1, further comprising an aperture sized to receive an earpiece connector.

18. The game controller accessory of claim 1, further comprising multiple resilient elastomeric contact members at locations on the inner boundary, the multiple resilient elastomeric contact members contacting the multiple-sided perimeter of the smartphone to retain the smartphone when it is placed in the opening.

19. The game controller accessory of claim 1, further comprising an aperture through at least one of the opposing major surfaces of the housing, the aperture positioned for conveying voice command sound waves arriving at the at least one of the opposing major surfaces of the housing to a surface defining the opening so as to provide the voice command sound waves to a microphone of the smartphone when the smartphone is placed within the opening with the microphone confronting the aperture.

20. The game controller accessory of claim 1, further comprising a charging receptacle for receiving electrical power used to charge a battery of the smartphone.

* * * * *